(12) United States Patent
Lipton et al.

(10) Patent No.: US 12,242,706 B2
(45) Date of Patent: Mar. 4, 2025

(54) DEVICES, METHODS AND GRAPHICAL USER INTERFACES FOR THREE-DIMENSIONAL PREVIEW OF OBJECTS

(71) Applicant: Apple Inc., Cupertino, CA (US)

(72) Inventors: David A. Lipton, San Mateo, CA (US); Ryan S. Burgoyne, Lyons, CO (US); Michelle Chua, Seattle, WA (US); Zachary Z. Becker, Kirkland, WA (US); Karen N. Wong, Sunnyvale, CA (US); Eric G. Thivierge, Merchantville, NJ (US); Mahdi Nabiyouni, Emeryville, CA (US); Eric Chiu, San Jose, CA (US); Tyler L. Casella, Martinez, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/812,965

(22) Filed: Jul. 15, 2022

(65) Prior Publication Data
US 2023/0031832 A1 Feb. 2, 2023

Related U.S. Application Data

(60) Provisional application No. 63/226,724, filed on Jul. 28, 2021.

(51) Int. Cl.
*G06F 3/04815* (2022.01)
*G02B 27/01* (2006.01)
*G06F 3/01* (2006.01)

(52) U.S. Cl.
CPC ....... *G06F 3/04815* (2013.01); *G02B 27/017* (2013.01); *G06F 3/013* (2013.01)

(58) Field of Classification Search
CPC .......... G06F 17/40; G06F 3/011; G06F 3/017; G06F 3/012; G06F 3/013; G06F 3/04815;
(Continued)

(56) References Cited

U.S. PATENT DOCUMENTS

| 5,015,188 A | 5/1991 | Pellosie et al. |
| 5,809,267 A | 9/1998 | Moran et al. |

(Continued)

FOREIGN PATENT DOCUMENTS

| EP | 3118722 A1 | 1/2017 |
| GB | 2540791 A | 2/2017 |

(Continued)

OTHER PUBLICATIONS

Search Report received for United Kingdom Patent Application No. GB2210885.6, mailed on Jan. 27, 2023, 1 page.
(Continued)

*Primary Examiner* — Rayeez R Chowdhury
(74) *Attorney, Agent, or Firm* — Kubota & Basol LLP

(57) ABSTRACT

A three-dimensional preview of content can be generated and presented at an electronic device in a three-dimensional environment. The three-dimensional preview of content can be presented concurrently with a two-dimensional representation of the content in a content generation environment presented in the three-dimensional environment. While the three-dimensional preview of content is presented in the three-dimensional environment, one or more affordances can be provided for interacting with the one or more computer-generated virtual objects of the three-dimensional preview. The one or more affordances may be displayed with the three-dimensional preview of content in the three-dimensional environment. The three-dimensional preview of content may be presented on a three-dimensional tray and the one or more affordances may be presented in a control (Continued)

bar or other grouping of controls outside the perimeter of the tray and/or along the perimeter of the tray.

30 Claims, 22 Drawing Sheets

(58) Field of Classification Search
CPC .. G06F 3/0482; G06F 3/0346; G06F 3/04845; G06F 3/0485; G06F 3/0304; G06F 3/147; G06F 2203/012; G06F 2203/04802; G06F 3/04812; G06F 3/04842; G06V 20/66; G06V 40/1324; G06V 20/69; G06V 20/695; G07F 11/24; G07F 11/38; G07F 11/44; G07F 11/62; G07F 17/0092; G07F 9/026; A61J 1/03; A61J 2205/30; A61J 7/0076; A61J 7/0084; G16H 40/67; G16H 20/13; G16H 10/40; G16H 30/40

See application file for complete search history.

(56) References Cited

U.S. PATENT DOCUMENTS

| | | | |
|---|---|---|---|
| 6,167,433 | A | 12/2000 | Maples et al. |
| 6,295,069 | B1 | 9/2001 | Shirur |
| 6,426,745 | B1 | 7/2002 | Isaacs et al. |
| 6,750,873 | B1 | 6/2004 | Bernardini et al. |
| 7,298,370 | B1 | 11/2007 | Middler et al. |
| 9,294,757 | B1 | 3/2016 | Lewis et al. |
| 9,298,334 | B1 | 3/2016 | Zimmerman et al. |
| 9,383,189 | B2 | 7/2016 | Bridges et al. |
| 9,396,580 | B1 | 7/2016 | Nowrouzezahrai et al. |
| 9,519,371 | B2 | 12/2016 | Nishida |
| 10,488,941 | B2 | 11/2019 | Lam et al. |
| 10,642,368 | B2 | 5/2020 | Chen |
| 10,664,043 | B2 | 5/2020 | Ikuta et al. |
| 10,671,241 | B1 | 6/2020 | Jia et al. |
| 10,691,216 | B2 | 6/2020 | Geisner et al. |
| 10,762,716 | B1 | 9/2020 | Paul et al. |
| 10,846,864 | B2 | 11/2020 | Kim et al. |
| 11,138,798 | B2 | 10/2021 | Paul et al. |
| 11,204,678 | B1 | 12/2021 | Baker et al. |
| 11,249,556 | B1 | 2/2022 | Schwarz et al. |
| 11,262,885 | B1 | 3/2022 | Burckel |
| 11,340,756 | B2 | 5/2022 | Faulkner et al. |
| 11,347,319 | B2 | 5/2022 | Goel et al. |
| 11,409,363 | B2 | 8/2022 | Chen et al. |
| 11,416,080 | B2 | 8/2022 | Heo et al. |
| 11,531,402 | B1 | 12/2022 | Stolzenberg |
| 11,531,459 | B2 | 12/2022 | Poupyrev et al. |
| 11,557,102 | B2 | 1/2023 | Palangie et al. |
| 11,615,596 | B2 | 3/2023 | Faulkner et al. |
| 11,641,460 | B1 | 5/2023 | Geusz et al. |
| 11,669,155 | B2 | 6/2023 | Bowman et al. |
| 11,762,473 | B2 | 9/2023 | Cipoletta et al. |
| 11,768,544 | B2 | 9/2023 | Schwarz et al. |
| 11,847,748 | B2 | 12/2023 | Liu et al. |
| 11,886,643 | B2 | 1/2024 | Irie et al. |
| 11,899,845 | B2 | 2/2024 | Chung et al. |
| 11,909,453 | B2 | 2/2024 | Javaudin et al. |
| 11,914,759 | B2 | 2/2024 | Klein et al. |
| 11,928,263 | B2 | 3/2024 | Jung et al. |
| 11,983,326 | B2 | 5/2024 | Lacey |
| 11,989,965 | B2 | 5/2024 | Tarighat Mehrabani |
| 12,032,803 | B2 | 7/2024 | Pastrana Vicente et al. |
| 2002/0030692 | A1 | 3/2002 | Griesert |
| 2005/0062738 | A1 | 3/2005 | Handley et al. |
| 2005/0248299 | A1 | 11/2005 | Chemel et al. |
| 2010/0302245 | A1 | 12/2010 | Best |
| 2011/0142321 | A1 | 6/2011 | Huffman |
| 2012/0113223 | A1 | 5/2012 | Hilliges et al. |
| 2012/0170089 | A1* | 7/2012 | Kim ............... G06F 1/1647 |
| | | | 359/9 |
| 2012/0249741 | A1 | 10/2012 | Maciocci et al. |
| 2013/0222227 | A1 | 8/2013 | Johansson et al. |
| 2013/0321462 | A1* | 12/2013 | Salter ............... G06F 1/163 |
| | | | 345/633 |
| 2013/0332890 | A1 | 12/2013 | Ramic et al. |
| 2014/0040832 | A1 | 2/2014 | Regelous |
| 2014/0078176 | A1* | 3/2014 | Kim ............... G06F 3/011 |
| | | | 345/633 |
| 2014/0104206 | A1 | 4/2014 | Anderson |
| 2014/0129990 | A1 | 5/2014 | Xin et al. |
| 2014/0333666 | A1 | 11/2014 | Poulos et al. |
| 2014/0368620 | A1 | 12/2014 | Li et al. |
| 2015/0067580 | A1* | 3/2015 | Um ............... G06F 3/0481 |
| | | | 715/781 |
| 2015/0121466 | A1 | 4/2015 | Brands et al. |
| 2015/0123901 | A1 | 5/2015 | Schwesinger et al. |
| 2015/0153833 | A1 | 6/2015 | Pinault et al. |
| 2015/0317831 | A1* | 11/2015 | Ebstyne ............ G06F 3/011 |
| | | | 345/419 |
| 2015/0331576 | A1 | 11/2015 | Piya et al. |
| 2016/0098093 | A1 | 4/2016 | Cheon et al. |
| 2016/0189426 | A1 | 6/2016 | Thomas et al. |
| 2016/0225164 | A1 | 8/2016 | Tomlin et al. |
| 2016/0291922 | A1 | 10/2016 | Montgomerie et al. |
| 2017/0032568 | A1 | 2/2017 | Gharpure et al. |
| 2017/0052595 | A1* | 2/2017 | Poulos ............. G06F 3/04847 |
| 2017/0053383 | A1* | 2/2017 | Heo ............... G06Q 30/00 |
| 2017/0178392 | A1 | 6/2017 | Zuccarino et al. |
| 2017/0213388 | A1* | 7/2017 | Margolis ............ G06T 13/00 |
| 2017/0221264 | A1 | 8/2017 | Perry |
| 2017/0243352 | A1 | 8/2017 | Kutliroff et al. |
| 2017/0251143 | A1 | 8/2017 | Peruch et al. |
| 2017/0270715 | A1 | 9/2017 | Lindsay et al. |
| 2017/0287215 | A1* | 10/2017 | Lalonde ............ G06F 3/012 |
| 2017/0287225 | A1 | 10/2017 | Powderly et al. |
| 2017/0351094 | A1* | 12/2017 | Poulos ............. G02B 27/017 |
| 2018/0005433 | A1 | 1/2018 | Kohler et al. |
| 2018/0088787 | A1 | 3/2018 | Bereza et al. |
| 2018/0103209 | A1 | 4/2018 | Fischler et al. |
| 2018/0122138 | A1 | 5/2018 | Piya et al. |
| 2018/0130255 | A1 | 5/2018 | Hazeghi et al. |
| 2018/0143693 | A1 | 5/2018 | Calabrese et al. |
| 2018/0173404 | A1* | 6/2018 | Smith ............. G06F 3/017 |
| 2018/0197341 | A1 | 7/2018 | Loberg et al. |
| 2018/0348986 | A1 | 12/2018 | Sawaki |
| 2019/0018479 | A1 | 1/2019 | Minami |
| 2019/0018498 | A1* | 1/2019 | West ............... G06F 3/012 |
| 2019/0050062 | A1 | 2/2019 | Chen et al. |
| 2019/0130622 | A1 | 5/2019 | Hoover et al. |
| 2019/0155495 | A1 | 5/2019 | Klein et al. |
| 2019/0164340 | A1 | 5/2019 | Pejic et al. |
| 2019/0228589 | A1 | 7/2019 | Dascola et al. |
| 2019/0340832 | A1 | 11/2019 | Srinivasan et al. |
| 2019/0349575 | A1 | 11/2019 | Knepper et al. |
| 2019/0362557 | A1 | 11/2019 | Lacey et al. |
| 2020/0005539 | A1 | 1/2020 | Hwang et al. |
| 2020/0045249 | A1 | 2/2020 | Francois et al. |
| 2020/0048825 | A1* | 2/2020 | Schultz ............ D06P 5/13 |
| 2020/0128227 | A1 | 4/2020 | Chavez et al. |
| 2020/0135141 | A1 | 4/2020 | Day et al. |
| 2020/0214682 | A1 | 7/2020 | Zaslavsky et al. |
| 2020/0286299 | A1 | 9/2020 | Wang et al. |
| 2020/0379626 | A1 | 12/2020 | Guyomard et al. |
| 2021/0034163 | A1 | 2/2021 | Goel et al. |
| 2021/0034319 | A1 | 2/2021 | Wang et al. |
| 2021/0225043 | A1 | 7/2021 | Tang et al. |
| 2021/0241483 | A1 | 8/2021 | Dryer et al. |
| 2021/0279967 | A1 | 9/2021 | Gernoth et al. |
| 2021/0295592 | A1 | 9/2021 | Von Cramon |
| 2021/0374221 | A1 | 12/2021 | Markhasin et al. |
| 2021/0383097 | A1 | 12/2021 | Guerard et al. |
| 2022/0083145 | A1 | 3/2022 | Matsunaga et al. |
| 2022/0084279 | A1 | 3/2022 | Lindmeier et al. |
| 2022/0121344 | A1 | 4/2022 | Pastrana Vicente et al. |
| 2022/0148257 | A1 | 5/2022 | Boubekeur et al. |
| 2022/0253136 | A1 | 8/2022 | Holder et al. |
| 2022/0317776 | A1 | 10/2022 | Sundstrom et al. |
| 2022/0326837 | A1 | 10/2022 | Dessero et al. |
| 2022/0335697 | A1 | 10/2022 | Harding et al. |
| 2022/0382385 | A1 | 12/2022 | Chen et al. |
| 2022/0397962 | A1 | 12/2022 | Goel et al. |

(56) References Cited

U.S. PATENT DOCUMENTS

| | | |
|---|---|---|
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0415094 A1 | 12/2022 | Kim et al. |
| 2023/0027040 A1 | 1/2023 | Wang et al. |
| 2023/0030699 A1 | 2/2023 | Zion et al. |
| 2023/0032771 A1 | 2/2023 | Zion et al. |
| 2023/0076326 A1 | 3/2023 | Xu et al. |
| 2023/0103161 A1 | 3/2023 | Li et al. |
| 2023/0119162 A1 | 4/2023 | Lipton et al. |
| 2023/0152935 A1 | 5/2023 | Mckenzie et al. |
| 2023/0168745 A1 | 6/2023 | Yoda |
| 2023/0290042 A1 | 9/2023 | Casella et al. |
| 2023/0377259 A1 | 11/2023 | Becker et al. |
| 2023/0377299 A1 | 11/2023 | Becker et al. |
| 2023/0377300 A1 | 11/2023 | Becker et al. |
| 2024/0037886 A1 | 2/2024 | Chiu et al. |
| 2024/0103636 A1 | 3/2024 | Lindmeier et al. |
| 2024/0104875 A1 | 3/2024 | Couche et al. |
| 2024/0104876 A1 | 3/2024 | Couche et al. |
| 2024/0233097 A1 | 7/2024 | Ngo et al. |

FOREIGN PATENT DOCUMENTS

| | | |
|---|---|---|
| KR | 10-2014-0097654 A | 8/2014 |
| KR | 10-2017-0027240 A | 3/2017 |
| KR | 10-2018-0102171 A | 9/2018 |
| KR | 10-2020-0110788 A | 9/2020 |
| KR | 10-2020-0135496 A | 12/2020 |
| WO | 2019/172678 A1 | 9/2019 |
| WO | 2019/213111 A1 | 11/2019 |
| WO | 2022/147146 A1 | 7/2022 |

OTHER PUBLICATIONS

Adding Environments, Available online at: https://manual.keyshot.com/manual/environments/adding-environments/, [retrieved on Jun. 9, 2023], 2 pages.

Area Light, Available online at: https://manual.keyshot.com/manual/materials/material-types/light-sources/area-light/, [retrieved on Jun. 9, 2023], 24 pages.

Artec Leo Full 3D Scanning Demo w/ Sample Data, Digitize Designs, LLC, Available online at: < https://www.youtube.com/watch?v=ecBKo_h3Pug>, [retrieved on Sep. 1, 2022], Feb. 22, 2019, 3 pages.

Feature Highlights, Available online at: https://manual.keyshot.com/manual/whats-new/feature-highlights/, [retrieved on Jun. 9, 2023], 28 pages.

Final Office Action received for U.S. Appl. No. 17/469,788, mailed on Nov. 16, 2023, 24 pages.

Final Office Action received for U.S. Appl. No. 17/807,226, mailed on Nov. 30, 2023, 23 pages.

Slambekova, Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

International Search Report received for PCT Patent Application No. PCT/US2021/049520, mailed on Apr. 8, 2022, 8 pages.

International Search Report received for PCT Patent Application No. PCT/US2022/071208, mailed on Aug. 18, 2022, 9 pages.

International Search Report received for PCT Patent Application No. PCT/US2023/074955, mailed on Feb. 1, 2024, 6 pages.

Light Manager, Available online at: https://manual.keyshot.com/manual/lighting/lighting-manager/, [retrieved on Jun. 9, 2023], 3 pages.

Non-Final Office Action received for U.S. Appl. No. 17/469,788, mailed on Mar. 2, 2023, 22 pages.

Non-Final Office Action received for U.S. Appl. No. 17/469,788, mailed on Mar. 21, 2024, 24 pages.

Non-Final Office Action received for U.S. Appl. No. 17/807,226, mailed on Jun. 26, 2023, 21 pages.

Non-Final Office Action received for U.S. Appl. No. 17/814,455, mailed on Feb. 16, 2024, 24 pages.

Non-Final Office Action received for U.S. Appl. No. 17/814,462, mailed on Feb. 1, 2024, 30 pages.

Non-Final Office Action received for U.S. Appl. No. 17/905,483, mailed on Mar. 27, 2024, 16 pages.

Non-Final Office Action received for U.S. Appl. No. 18/317,893, mailed on Apr. 25, 2024, 18 pages.

Notice of Allowance received for U.S. Appl. No. 17/807,236, mailed on Feb. 5, 2024, 13 pages.

Notice of Allowance received for U.S. Appl. No. 18/317,893, mailed on Mar. 6, 2024, 8 pages.

Notice of Allowance received for U.S. Appl. No. 18/317,893, mailed on Nov. 22, 2023, 9 pages.

Restriction Requirement received for U.S. Appl. No. 17/905,483, mailed on Dec. 7, 2023, 7 pages.

Cas and Chary XR, "Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.

Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.

Locher et al., "Mobile Phone and Cloud—a Dream Team for 3D Reconstruction", 2016 IEEE Winter Conference on Applications of Computer Vision (WACV), 2016, pp. 1-8.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Ex Parte Quayle Action received for U.S. Appl. No. 17/655,347, mailed on Jul. 8, 2024, 6 pages.

Notice of Allowance received for U.S. Appl. No. 17/807,226, mailed on Jul. 3, 2024, 9 pages.

Notice of Allowance received for U.S. Appl. No. 17/807,236, mailed on Jul. 10, 2024, 9 pages.

Notice of Allowance received for U.S. Appl. No. 18/473,180, mailed on Aug. 22, 2024, 13 pages.

* cited by examiner

DEVICES, METHODS AND GRAPHICAL USER INTERFACES FOR THREE-DIMENSIONAL PREVIEW OF OBJECTS

CROSS-REFERENCE TO RELATED APPLICATIONS

This application claims the benefit of U.S. Provisional Application No. 63/226,724, filed Jul. 28, 2021, the content of which is incorporated herein by reference in its entirety for all purposes.

FIELD OF THE DISCLOSURE

This relates generally to computer graphics editors and more specifically to devices, methods and user interfaces for three-dimensional previews of computer graphical objects.

BACKGROUND OF THE DISCLOSURE

Some computer graphical environments provide two-dimensional and/or three-dimensional environments where at least some objects displayed for a user's viewing are virtual and generated by a computer. In some uses, a user may create or modify extended reality (XR) environments, such as by editing, generating, or otherwise manipulating XR virtual objects using a content generation environment, such as a graphics editor or graphics editing interface running on a content creation application, for example. In some embodiments, creation or modification of XR environments, including content items (e.g., two-dimensional and/or three-dimensional objects) within the XR environments, may include generating and presenting, to the user, a preview of the content items at various intermediate stages of the content creation process. However, such previews of content items that are generated and presented to the user in two-dimensions are limited by the two-dimensional display and graphics processing characteristics of the device on which the content creation application runs. Editors that allow for intuitive editing of computer-generated virtual objects presented in three-dimensions are thus desirable.

SUMMARY OF THE DISCLOSURE

Some embodiments of the disclosure are directed to a three-dimensional preview of content (e.g., XR content also referred to herein as XR content item(s)) generated and presented at an electronic device in a three-dimensional environment (e.g., in a computer-generated environment). In some embodiments, the three-dimensional preview of content is presented concurrently with a two-dimensional representation of the content in a content generation environment (e.g., a content creation application) presented in the three-dimensional environment. In some embodiments, while the three-dimensional preview of content is presented in the three-dimensional environment, one or more affordances are provided for interacting with the one or more computer-generated virtual objects of the three-dimensional preview. In some embodiments, the one or more affordances may be displayed with the three-dimensional preview of content in the three-dimensional environment (e.g., displayed below, in front of, above, adjacent to, etc. the one or more virtual objects of the three-dimensional preview). In some embodiments, the three-dimensional preview of content is presented on a three-dimensional tray (e.g., a user interface element) and the one or more affordances are presented in a control bar or other grouping of controls outside the perimeter of the tray and/or along the perimeter of the tray. In some embodiments, as described herein, a group of some or all of the affordances are referred to as a manipulator or as an object manipulator.

In some embodiments, the three-dimensional preview of content is configurable to operate in at least two modes. A first mode (e.g., play mode) can simulate run-time of the content in which one or more actions (e.g., animations, audio clips, etc.) associated with the content can be performed. For example, one or more virtual objects of the three-dimensional preview may be animated to move, and one or more virtual objects can respond to an input to execute additional animations or other behaviors. A second mode (e.g., edit mode) can provide a three-dimensional preview of the content to allow a user to interact with the content for the purposes of editing the three-dimensional content. For example, a user may select an element in the three-dimensional content and the corresponding elements can be selected in the two-dimensional representation of the content generation environment.

In some embodiments, the object manipulator can include a first affordance that is selectable to cause the electronic device to operate in a first mode. In some embodiments, the object manipulator can include a second affordance that is selectable to cause the electronic device to operate in a second mode, different than the first mode. In some embodiments, the first and second affordances can be a singular affordance that toggles the mode (e.g., a play/pause button). In some embodiments, the object manipulator can include a third affordance that is selectable to scale dimensions of one or more virtual objects of the preview. In some embodiments, the object manipulator can include a fourth affordance that is selectable to step through executable code associated with playback of the previewed content, causing one or more actions (e.g., animations, audio clips, etc.) to be performed by the one or more virtual objects incrementally with each selection of the fourth affordance. In some embodiments, the object manipulator can also include a fifth affordance that is selectable to cause the electronic device to operate in a third mode, different than the first mode and the second mode. In the third mode, a full-scale representation of the one or more virtual objects of the three-dimensional preview is displayed within the three-dimensional environment.

As described herein, some embodiments of the disclosure are directed to user-interactions with and/or manipulations of a three-dimensional preview of content (e.g., XR content item) displayed on an electronic device. In some embodiments, a two-dimensional representation of an XR content item generated in a content creation application displayed on a first electronic device may be concurrently displayed with a three-dimensional preview of the XR content item on a second electronic device. In some embodiments, user interactions (e.g., user input, such as touch, tap, motion, reorientation, etc.) with the three-dimensional preview of the XR content item received at the second electronic device may cause the display of the three-dimensional preview of the XR content item to be updated according to the input. In some embodiments, the user input received at the second electronic device is communicated to the first electronic device in real time, such that the displays of the two-dimensional representation of the XR content item and the three-dimensional preview of the XR content item are optionally manipulated concurrently or nearly concurrently (e.g., within less than 50 ms of one another).

Manipulating the three-dimensional preview of the content in the three-dimensional environment may include altering an appearance of one or more virtual objects of the three-dimensional preview. In some embodiments, manipulations of the three-dimensional preview are optionally determined by the mode of operation of the electronic device presenting the three-dimensional environment. In some embodiments, the computer-generated object manipulator is optionally presented in the three-dimensional environment with an interactive tray, wherein the interactive tray optionally contains the three-dimensional preview. The interactive tray may be manipulated, such that user interactions with the tray may alter an appearance of the interactive tray within the three-dimensional environment, without necessarily altering the appearance of the one or more virtual objects of the three-dimensional preview contained on the tray. In some embodiments, the appearance of the interactive tray may be altered in response to manipulations of the one or more virtual objects of the three-dimensional preview contained on the tray. In some embodiments, changes to a viewpoint associated with the electronic device may alter a view of the three-dimensional preview visible by the user. In some embodiments, changes to the viewpoint associated with the electronic device may alter an orientation and/or a location of the object manipulator within the three-dimensional environment, such that the object manipulator optionally continues to face the user. In some embodiments, a two-dimensional representation of the one or more virtual objects generated in a content creation application displayed on a first electronic device may be concurrently displayed with the three-dimensional preview of the one or more virtual objects on a second electronic device. Changes to the viewpoint associated with the second electronic device are optionally independent of the viewpoint of the first electronic device, such that changes to the view of the three-dimensional preview optionally do not change the view of the two-dimensional representation of the one or more virtual objects.

The full descriptions of these embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
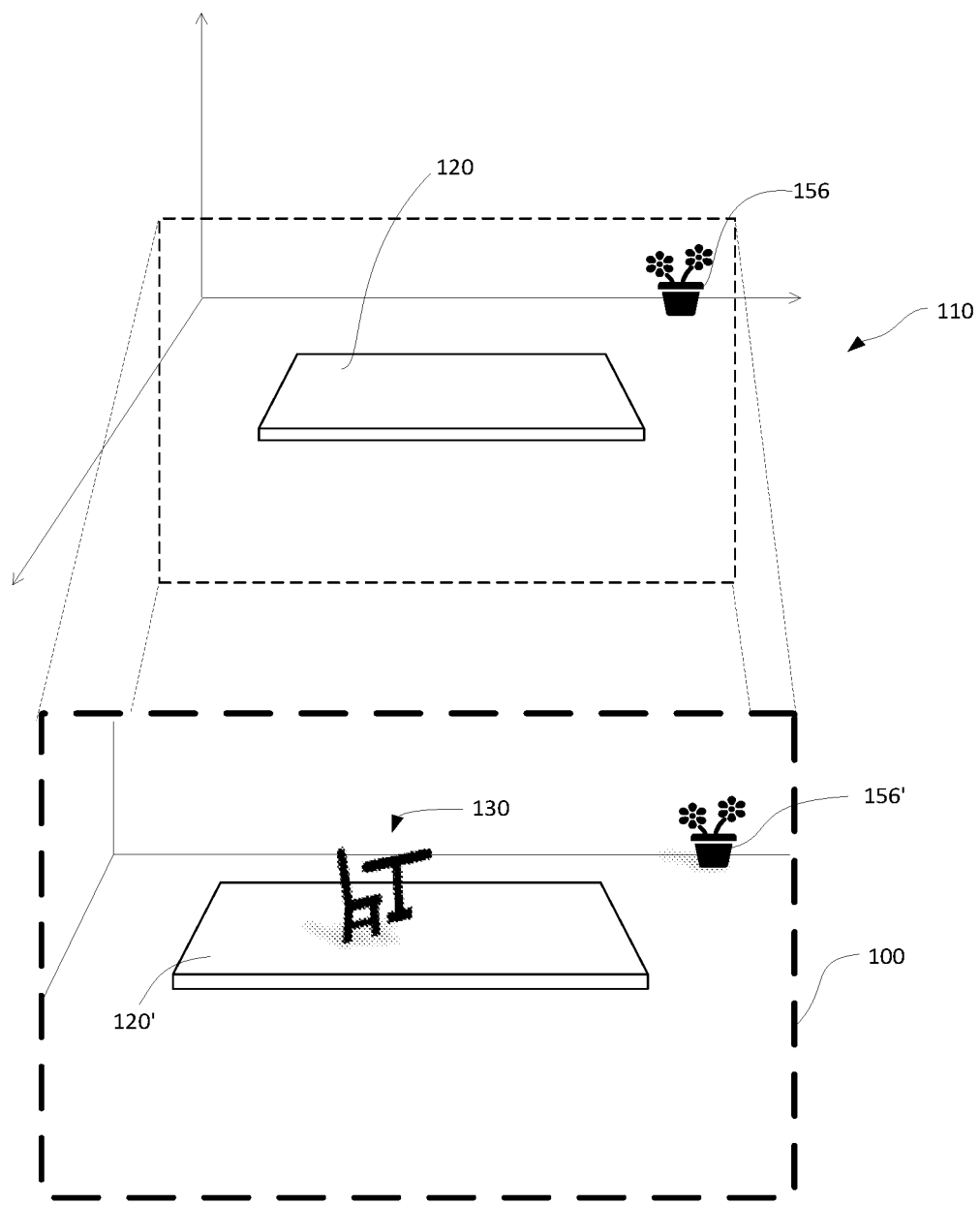
FIG. 1 illustrates an electronic device displaying an extended reality environment (e.g., a computer-generated environment) according to embodiments of the disclosure.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. As another example, the XR system may detect an interaction (e.g., a (virtual) touch, tap, pinch, etc.) with one or more objects in the XR environment, and, in response, adjust and/or update graphical content presented to the user in a manner similar to how such objects or views of such objects would change in a physical environment. In some embodiments, the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems (including hologram-based systems), heads-up displays (HUDs), head mounted displays (HMDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, XR content can be presented to the user via an XR data file (data file) (including script, executable code, etc.) that includes data representing the XR content and/or data describing how the XR content is to be presented. In some embodiments, the XR file includes data representing one or more XR scenes and one or more triggers for presentation of the one or more XR scenes. For example, an XR scene may be anchored to a horizontal, planar surface, such that when a horizontal, planar surface is detected (e.g., in the field of view of one or more cameras), the XR scene can be presented. The XR file can also include data regarding one or more virtual objects associated with the XR scene, and/or associated triggers and actions involving the XR virtual objects.

In order to simplify the generation of XR files and/or editing of computer-generated graphics generally, a content creation application including a content generation environment (e.g., an authoring environment graphical user interface (GUI)) can be used. In some embodiments, a content generation environment is itself an XR environment (e.g., a two-dimensional and/or three-dimensional environment). For example, a content generation environment can include one or more virtual objects and one or more representations of real-world objects. In some embodiments, the virtual objects are superimposed over a physical environment, or a representation thereof. In some embodiments, the physical environment is captured via one or more cameras of the electornic device and is actively displayed in the XR environment (e.g., via the display generation component). In some embodiments, the physical environment is (e.g., passively) provided by the electronic device, for example, if the display generation component includes a translucent or transparent element through which the user is able to see the physical environment.

In such a content generation environment, a user can create virtual objects from scratch (including the appearance of the virtual objects, behaviors/actions of the virtual objects, and/or triggers for the behaviors/actions of the virtual objects). Additionally or alternatively, virtual objects can be created by other content creators and imported into the content generation environment, where the virtual objects can be placed into an XR environment or scene. In some embodiments, virtual objects generated in a content generation environment or entire environments can be exported to other environments or XR scenes (e.g., via generating an XR file and importing or opening the XR file in a content creation application or XR viewer application).

Some embodiments of the disclosure are directed to a three-dimensional preview of content (e.g., XR content also referred to herein as XR content item(s)) generated and presented at an electronic device in a three-dimensional environment (e.g., in a computer-generated environment). In some embodiments, the three-dimensional preview of content is presented concurrently with a two-dimensional representation of the content in a content generation environment (e.g., a content creation application) presented in the three-dimensional environment. In some embodiments, while the three-dimensional preview of content is presented in the three-dimensional environment, one or more affordances are provided for interacting with the one or more computer-generated virtual objects of the three-dimensional preview. In some embodiments, the one or more affordances may be displayed with the three-dimensional preview of content in the three-dimensional environment (e.g., displayed below, in front of, above, adjacent to, etc. the one or more virtual objects of the three-dimensional preview). In some embodiments, the three-dimensional preview of content is presented on a three-dimensional tray (e.g., a user interface element) and the one or more affordances are presented in a control bar or other grouping of controls outside the perimeter of the tray and/or along the perimeter of the tray. In some embodiments, as described herein, a group of some or all of the affordances are referred to as a manipulator or as an object manipulator.

In some embodiments, the three-dimensional preview of content is configurable to operate in at least two modes. A first mode (e.g., play mode) can simulate run-time of the content in which one or more actions (e.g., animations, audio clips, etc.) associated with the content can be performed. For example, one or more virtual objects of the three-dimensional preview may be animated to move, and one or more virtual objects can respond to an input to execute additional animations or other behaviors. A second mode (e.g., edit mode) can provide a three-dimensional preview of the content to allow a user to interact with the content for the purposes of editing the three-dimensional content. For example, a user may select an element in the three-dimensional content and the corresponding elements can be selected in the two-dimensional representation of the content generation environment.

In some embodiments, the object manipulator can include a first affordance that is selectable to cause the three-dimensional preview to operate in a first mode. In some embodiments, the object manipulator can include a second affordance that is selectable to cause the three-dimensional preview to operate in a second mode, different than the first mode. In some embodiments, the first and second affordances can be a singular affordance that toggles the mode (e.g., a play/pause button). In some embodiments, the object manipulator can include a third affordance that is selectable to scale dimensions of one or more virtual objects of the preview. In some embodiments, the object manipulator can include a fourth affordance that is selectable to step through executable code associated with playback of the previewed content, causing one or more actions (e.g., animations, audio clips, etc.) to be performed by the one or more virtual objects incrementally with each selection of the fourth affordance. In some embodiments, the object manipulator can also include a fifth affordance that is selectable to cause the three-dimensional preview to operate in a third mode, different than the first mode and the second mode. In the third mode, a full-scale representation of the one or more virtual objects of the three-dimensional preview is displayed within the three-dimensional environment.

As described herein, some embodiments of the disclosure are directed to user-interactions with and/or manipulations of a three-dimensional preview of content (e.g., XR content item) displayed on an electronic device. In some embodiments, a two-dimensional representation of an XR content item generated in a content creation application displayed on a first electronic device may be concurrently displayed with a three-dimensional preview of the XR content item on a second electronic device. In some embodiments, user interactions (e.g., user input, such as touch, tap, motion, reorientation, etc.) with the three-dimensional preview of the XR content item received at the second electronic device may cause the display of the three-dimensional preview of the XR content item to be updated according to the input. In some embodiments, the user input received at the second electronic device is communicated to the first electronic device in real time, such that the displays of the two-dimensional representation of the XR content item and the three-dimensional preview of the XR content item are optionally manipulated concurrently or nearly concurrently (e.g., within less than 50 ms of one another).

Manipulating the three-dimensional preview of the content in the three-dimensional environment may include altering an appearance of one or more virtual objects of the three-dimensional preview. In some embodiments, manipulations of the three-dimensional preview are optionally determined by the mode of operation of the electronic device presenting the three-dimensional environment. In some embodiments, the computer-generated object manipulator is optionally presented in the three-dimensional environment with an interactive tray, wherein the interactive tray optionally contains the three-dimensional preview. The interactive tray may be manipulated, such that user interactions with the tray may alter an appearance of the interactive tray within the three-dimensional environment, without necessarily altering the appearance of the one or more virtual objects of the three-dimensional preview contained on the tray. In some embodiments, the appearance of the interactive tray may be altered in response to manipulations of the one or more virtual objects of the three-dimensional preview contained on the tray. In some embodiments, changes to a viewpoint associated with the electronic device may alter a view of the three-dimensional preview visible by the user. In some embodiments, changes to the viewpoint associated with the electronic device may alter an orientation and/or a location of the object manipulator within the three-dimensional environment, such that the object manipulator optionally continues to face the user. In some embodiments, a two-dimensional representation of the one or more virtual objects generated in a content creation application displayed on a first electronic device may be concurrently displayed with the three-dimensional preview of the one or more virtual objects on a second electronic device. Changes to the viewpoint associated with the second electronic device are optionally independent of the viewpoint of the first electronic device, such that changes to the view of the three-dimensional preview optionally do not change the view of the two-dimensional representation of the one or more virtual objects.

FIG. 1 illustrates an electronic device 100 displaying an XR environment (e.g., a computer-generated environment) according to embodiments of the disclosure. In some embodiments, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and tabletop 120 are located in the physical environment 110. In some embodiments, electronic device 100 may be configured to capture areas of physical environment 110 including tabletop 120 and plant 156 (illustrated in the field of view of electronic device 100). In some embodiments, in response to a trigger, the electronic device 100 may be configured to display a virtual object 130 in the computer-generated environment (e.g., represented by a chair and table illustrated in FIG. 1) that is not present in the physical environment 110, but is displayed in the computer-generated environment positioned on (e.g., anchored to) the top of a computer-generated representation 120' of real-world tabletop 120. For example, virtual object 130 can be displayed on the surface of the tabletop 120' in the computer-generated environment displayed via device 100 in response to detecting the planar surface of tabletop 120 in the physical environment 110. As shown in the example of FIG. 1, the computer-generated environment can include representations of additional real-world objects, such as a representation 156' of real-world plant 156. It should be understood that virtual object 130 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some embodiments, the application or user interface can include the display of content items (e.g., photos, video, etc.) of a content application. In some embodiments, the virtual object 130 is optionally configured to be interactive and responsive to user input, such that a user may virtually touch, tap, move, rotate, or otherwise interact with, the virtual object. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for generating or editing content for computer generated graphics and/or XR environments (e.g., an application with a content generation environment).

Additionally, the device may support a three-dimensional graphic rendering application for generating and presenting XR content and/or XR environments in three-dimensions.

Figure 2:
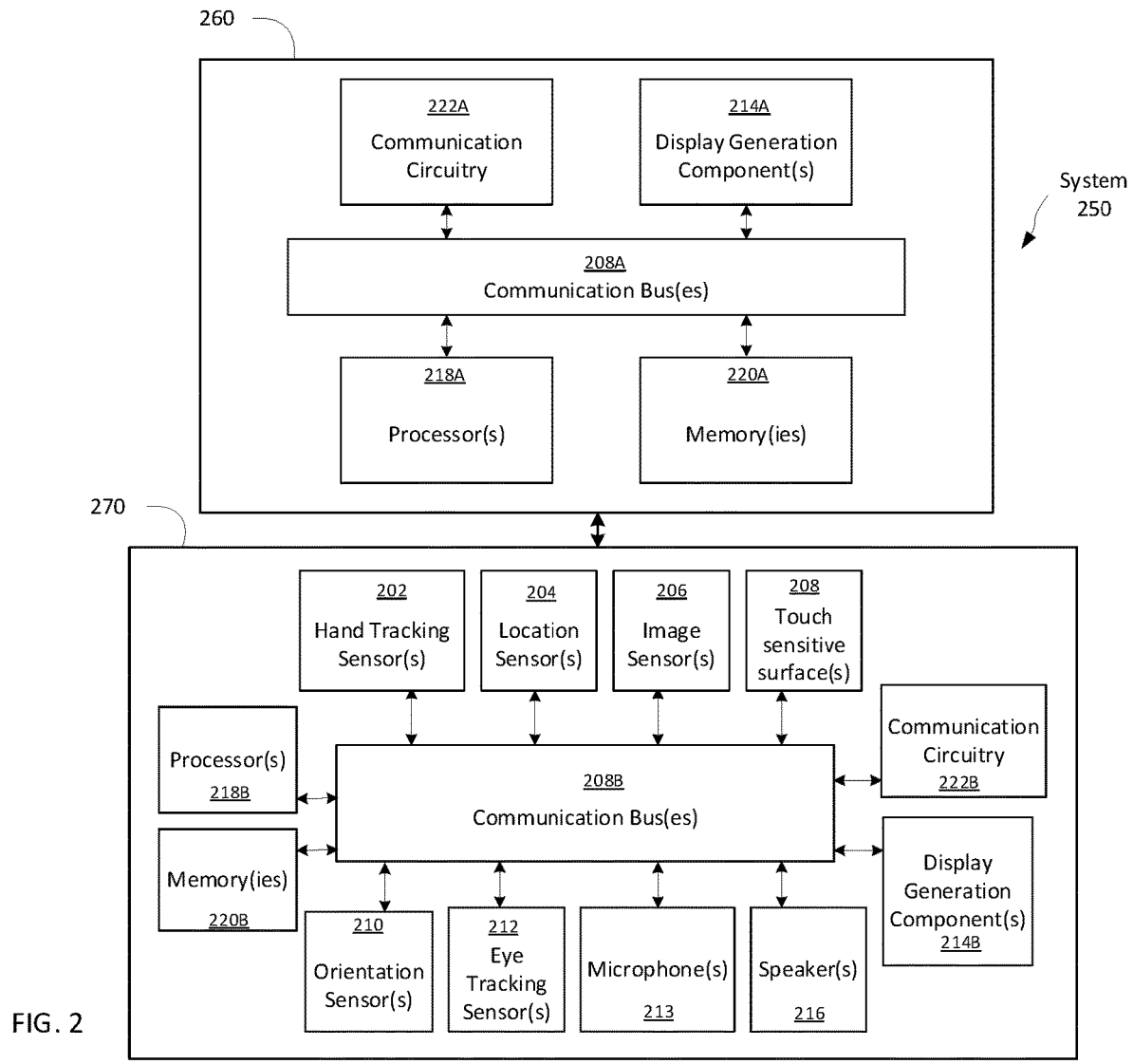
FIG. 2 illustrates a block diagram of an exemplary architecture for a system or device according to embodiments of the disclosure.

FIG. 2 illustrates a block diagram of an exemplary architecture for a system or device 250 according to embodiments of the disclosure. In some embodiments, device 250 is a mobile device, such as a mobile phone (e.g., smart phone), a tablet computer, a laptop computer, a desktop computer, a head-mounted display, an auxiliary device in communication with another device, etc. Device 250 optionally includes various sensors (e.g., one or more hand tracking sensor(s), one or more location sensor(s), one or more image sensor(s), one or more touch-sensitive surface(s), one or more motion and/or orientation sensor(s), one or more eye tracking sensor(s), one or more microphone(s) or other audio sensors, etc.), one or more display generation component(s), one or more speaker(s), one or more processor(s), one or more memories, and/or communication circuitry. One or more communication buses are optionally used for communication between the above-mentioned components of device 250.

In some embodiments, as illustrated in FIG. 2, system/device 250 can be divided between multiple devices. For example, a first device 260 optionally includes processor(s) 218A, memory or memories 220A, communication circuitry 222A, and display generation component(s) 214A optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 208, one or more motion and/or orientation sensor(s) 210, one or more eye tracking sensor(s) 212, one or more microphone(s) 213 or other audio sensors, etc.), one or more display generation component(s) 214B, one or more speaker(s) 216, one or more processor(s) 218B, one or more memories 220B, and/or communication circuitry 222B. One or more communication buses 208B are optionally used for communication between the above-mentioned components of device 270. First device 260 and second device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some embodiments, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some embodiments, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some embodiments, display generation component(s) 214A, 214B include a single display (e.g., a liquid-crystal display (LCD), organic light-emitting diode (OLED), or other types of display). In some embodiments, display generation component(s) 214A, 214B includes multiple displays. In some embodiments, display generation component(s) 214A, 214B can include a display with touch capability (e.g., a touch screen), a projector, a holographic projector, a retinal projector, etc. In some embodiments, device 270 includes touch-sensitive surface(s) 208 for receiving user inputs, such as tap inputs and swipe inputs or other gestures. In some embodiments, display generation component(s) 214B and touch-sensitive surface(s) 208 form touch-sensitive display(s) (e.g., a touch screen integrated with device 270 or external to device 270 that is in communication with device 270).

Device 270 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 270. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 270 uses CCD sensors, event cameras, and depth sensors in combination to detect the physical environment around device 270. In some embodiments, image sensor(s) 206 include a first image sensor and a second image sensor. The first image sensor and the second image sensor work in tandem and are optionally configured to capture different information of physical objects in the real-world environment. In some embodiments, the first image sensor is a visible light image sensor, and the second image sensor is a depth sensor. In some embodiments, device 270 uses image sensor(s) 206 to detect the position and orientation of device 270 and/or display generation component(s) 214 in the real-world environment. For example, device 270 uses image sensor(s) 206 to track the position and orientation of display generation component(s) 214B relative to one or more fixed objects in the real-world environment.

In some embodiments, device 270 includes microphone(s) 213 or other audio sensors. Device 270 uses microphone(s) 213 to detect sound from the user and/or the real-world environment of the user. In some embodiments, microphone(s) 213 includes an array of microphones (a plurality of microphones) that optionally operate in tandem, such as to identify ambient noise or to locate the source of sound in space of the real-world environment.

Device 270 includes location sensor(s) 204 for detecting a location of device 270 and/or display generation component(s) 214B. For example, location sensor(s) 204 can include a GPS receiver that receives data from one or more satellites and allows device 270 to determine the device's absolute position in the physical world.

Device 270 includes orientation sensor(s) 210 for detecting orientation and/or movement of device 270 and/or display generation component(s) 214B. For example, device 270 uses orientation sensor(s) 210 to track changes in the position and/or orientation of device 270 and/or display generation component(s) 214B, such as with respect to physical objects in the real-world environment. Orientation sensor(s) 210 optionally include one or more gyroscopes and/or one or more accelerometers.

Device 270 includes hand tracking sensor(s) 202 and/or eye tracking sensor(s) 212, in some embodiments. Hand tracking sensor(s) 202 are configured to track the position/location of one or more portions of the user's hands, and/or motions of one or more portions of the user's hands with respect to the extended reality environment, relative to the display generation component(s) 214B, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214B. In some embodiments, hand tracking sensor(s) 202 and/or eye tracking sensor(s) 212 are implemented together with the display generation component(s) 214B. In some embodiments, the hand tracking sensor(s) 202 and/or eye tracking sensor(s) 212 are implemented separate from the display generation component(s) 214B.

In some embodiments, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some embodiments, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 270 and system 250 are not limited to the components and configuration of FIG. 2, but can include fewer, alternative, or additional components in multiple configurations. In some embodiments, system 250 can be implemented in a single device. A person using system 250, is optionally referred to herein as a user of the device. Attention is now directed towards exemplary concurrent displays of a two-dimensional representation of content items and corresponding three-dimensional previews of the content items. As discussed below, the two-dimensional representation of the content items can be displayed on a first electronic device (e.g., via a content creation application) and the three-dimensional previews of the content items can be concurrently displayed at a second electronic device (e.g., via a three-dimensional graphic rendering application). In some embodiments, the processes of generating the three-dimensional preview of the content items described below can be performed by processors 218A, 218B of the devices 260 and 270.

Figure 3A:
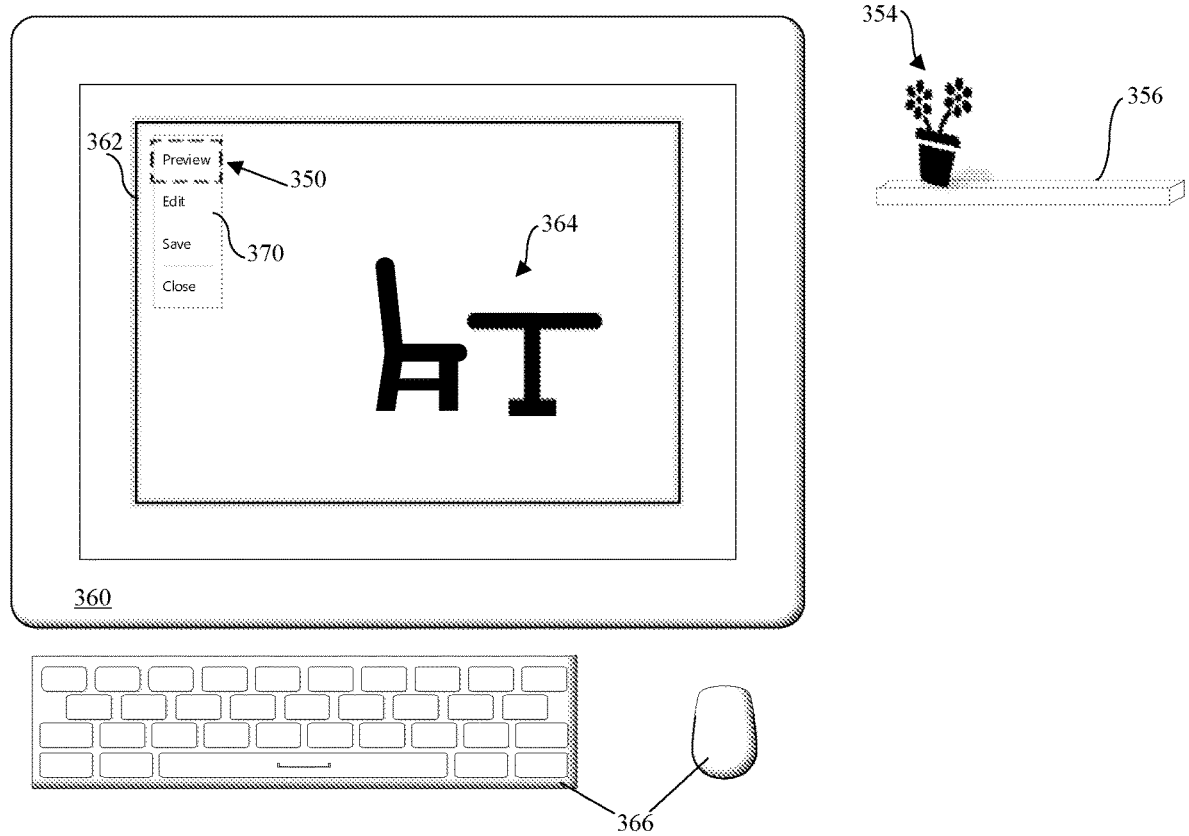
FIG. 3A illustrates a content creation application including an authoring environment graphical user interface and representative content according to some embodiments of the disclosure.

FIG. 3A illustrates a content creation application 362 including an authoring environment GUI and representative content 364 according to some embodiments of the disclosure. The content creation application 362 including authoring environment GUI can be displayed on an electronic device 360 (e.g., similar to device 100 or 260) including, but not limited to, portable or non-portable computing devices such as a tablet computing device, laptop computing device or desktop computing device. FIG. 3A illustrates a real-world environment (e.g., a room) 352 including shelf 356 and plant 354 disposed in a rear portion of the real-world environment behind the electronic device 360. As an example, the content creation application 362 may display a two-dimensional representation of a 3D computer environment defined by X. Y and Z axes and including content 364. In the example of FIG. 3A, the content 364 is a chair and a table, but it should be understood that the chair and table are merely representative, and that one or more different virtual objects (e.g., one-dimensional (1D), 2D or 3D objects) can be imported or selected from a content library (including a number of shapes, objects, symbols, text, number, and the like) and included in the 3D environment.

In the example of FIG. 3A, a content item (e.g., an XR content item, such as virtual object 130 in FIG. 1) created in the content creation application 362 running on the electronic device 360 may be previewed in three-dimensions via a three-dimensional graphic rendering application running on a second electronic device, as discussed in more detail below with reference to FIG. 3B, which is optionally in communication with the electronic device 360. In some embodiments, the content creation application may, optionally in response to a request by the user to preview the content item 364 in three-dimensions, transmit three-dimensional graphical data corresponding to the content item to the three-dimensional graphic rendering application, which may generate and present the three-dimensional preview of the content item (e.g., in an XR environment).

In some embodiments, as shown in FIG. 3A, the user, via the electronic device 360, may be working in the content creation application 362 to design and/or modify the content 364. The content creation application optionally communicates with an integrated design environment (IDE). The content creation application 362 and/or the IDE (not shown) optionally utilizes a graphical data file (e.g., including script, executable code, etc.) describing a content item (e.g., defining the appearance, actions, reactivity, etc. of the content 364) targeting a three-dimensional operating system (e.g., designed for a three-dimensional graphical environment). In some embodiments, the data file describing the content item may be uploaded to and/or launched by the content creation application 362, such that a two-dimensional representation of the content item may be displayed (e.g., via display generation component 214A in FIG. 2) on the electronic device 360. It is understood that the two-dimensional representation is a function of the two-dimensional display of the first electronic device, but that the two-dimensional representation may represent three-dimensional content. In some embodiments, the two-dimensional representation of the content item may be displayed within a display GUI of the content creation application 362 (e.g., within or adjacent to the authoring environment GUI). In some embodiments, the graphical data file being uploaded to the content creation application may be stored on the electronic device 360 (e.g., stored in memory 220A or downloaded and accessed from web-based storage). In some embodiments, the data file may be edited while running on the content creation application 362. In such some embodiments, the script, executable code, etc. may be displayed within the authoring environment GUI, such that a user may directly edit portions of the script, executable code, etc. at the electronic device 360. The edits made to the graphical data file may, if applicable, update the appearance of the two-dimensional representation of the content items 364 displayed on the electronic device 360. As described herein, in some embodiments, edits to the data file may be achieved in an IDE in communication with the content creation application 362.

As mentioned above, the preview of the content items is generated and presented to the user in two-dimensions, as illustrated in the example of FIG. 3A; such preview may be limited by the two-dimensional display of the device 360 on which the content creation application 362 is running. While certain aspects of the content item created in the content creation application 362 can be captured in two-dimensions (e.g., color, two-dimensional dimensions such as height and width, planar views, etc.), other aspects cannot be captured. Particularly, for example, because the content items being created in the content creation application 362 is explicitly designed to be displayed in three-dimensional environments, the two-dimensional preview may not provide the user with complete information regarding three-dimensional appearance and characteristics that could actually be useful during the design stage. Alternative views (e.g., side and rear views), surface texture, lighting effects, etc. may not be visible or capturable within the two-dimensional preview. Further, in order to view alternative views of the content, for example, the user may need to generate a new preview for each alternative view, increasing the time and effort and thus the complexity of work-flow for designing, previewing, and modifying content items. Accordingly, providing an interactive preview of the content in three-dimensions may be particularly useful during the design stages of the digital content creation process, as discussed below.

In some embodiments, the user may request to preview the two-dimensional representation of the content item (e.g., chair and table of the content 364) in three-dimensions. As an example, the content creation application 362 may display a menu 370 including one or more selectable graphical user interface elements (e.g., displayed in the authoring environment GUI, in the display GUI, or some other GUI in or in communication with the content creation application) that, when selected, generates the request. Additionally or alternatively, in some embodiments, the request may be inputted using one or more input devices 366 in communication with the electronic device 360, such as by pressing one or more keys on a keyboard, for example. As shown in the example of FIG. 3A, the user may select "Preview" from the menu 370, as indicated by selection 350, to request a preview of the content 364 in three dimensions. In some embodiments, in response to receiving the preview request, the electronic device may initiate a data transfer of the three-dimensional graphical data defining the content item (e.g., table and chair of the content 364), wherein the three-dimensional graphical data is optionally transferred to a second electronic device. The electronic device 360 may communicate with the second electronic device via any suitable communication means, such as, for example, wire or cable transfer (e.g., universal serial bus), wireless transfer (e.g., Wi-Fi or Bluetooth®), etc. In some embodiments, the three-dimensional graphical data may be received by a three-dimensional graphic rendering application running on the second electronic device, wherein the three-dimensional graphic rendering application is configured to generate and present a three-dimensional preview of the content item defined by the three-dimensional graphical data, as discussed below.

Figure 3B:
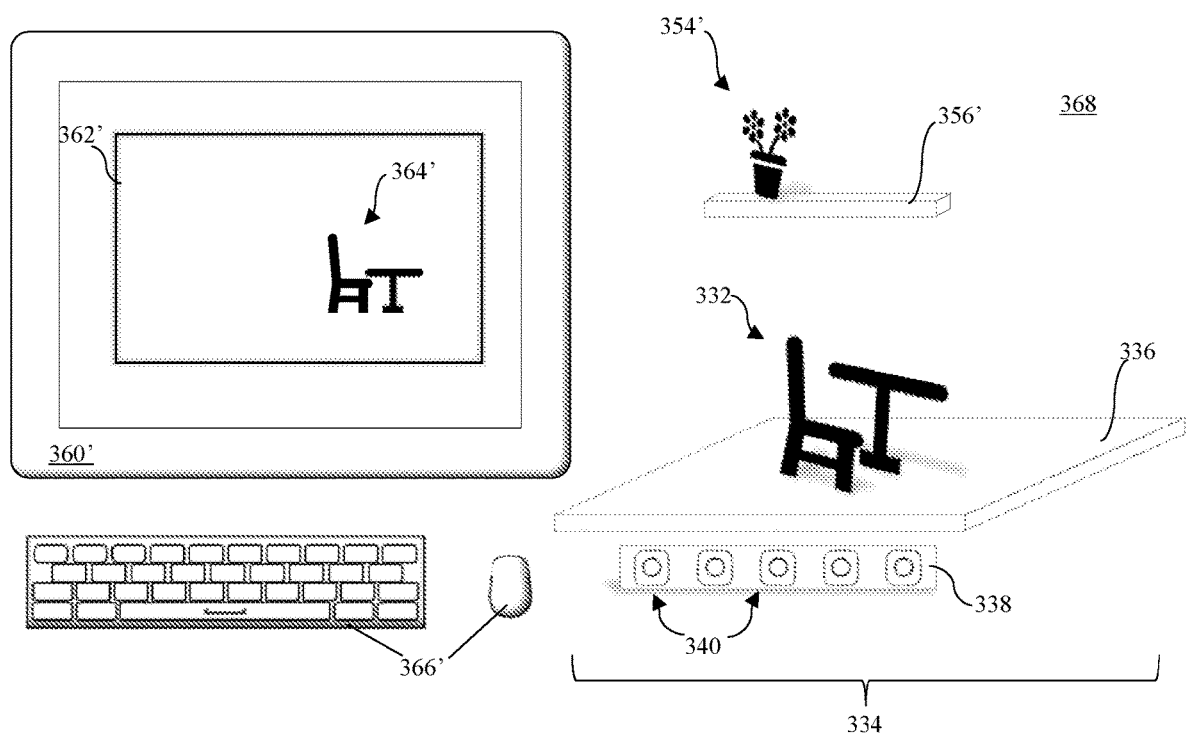
FIG. 3B illustrates an XR environment presented to the user using a second electronic device according to embodiments of the disclosure.

FIG. 3B illustrates an XR environment presented to the user using a second electronic device (e.g., corresponding to electronic device 270 in FIG. 2) according to embodiments of the disclosure. For example, three-dimensional computer-generated environment 368 can be defined by X, Y and Z axes as viewed from a perspective of the second electronic device (e.g., a viewpoint associated with the second electronic device), which may be a head mounted display, for example). In some embodiments, the second electronic device may capture portions of a real-world environment (e.g., via the image sensors). As shown in FIG. 3B, the three-dimensional computer-generated environment 368 can include presenting a first electronic device 360 displaying the two-dimensional representation of the content item(s) of FIG. 3A (or displaying a representation of the first electronic device 360' and/or the content item(s) 364' in content application 362'). Additionally or alternatively, the three-dimensional environment 368 includes presenting the one or more input devices 366 (or displaying a representation of the one or more input devices). Although not shown in FIGS. 3A-3B, the first electronic device and the one or more input devices may be resting on a table that can be presented in the environment (or a representation of the table may be displayed in the environment. Additionally or alternatively, the three-dimensional environment 368 includes presenting portions of the real-world environment including a shelf 356 and a plant 354 or representation of the shelf 356' and the plant 354'.

Additionally, or alternatively, the three-dimensional environment 368 optionally includes a three-dimensional preview 334 presenting one or more virtual objects 332 corresponding to the content 364 shown in FIG. 3A. It should be understood that the virtual objects illustrated are merely representative, and that one or more different virtual objects can be imported or designed within the content creation application and included in the 3D environment 368. In some embodiments, concurrently displaying the three-dimensional preview 334 and the content creation application on the first electronic device. In this way, a designer may be able to create content using familiar editing tools and augment the design process with a three-dimensional live preview. Additionally, the three-dimensional preview can provide the designer with additional ways of interacting with the content of the three-dimensional preview and/or with the content in the content creation application on the first electronic device.

For example, in some embodiments, the second electronic device optionally includes hand tracking sensors (e.g., corresponding to hand tracking sensors 202) and eye tracking sensors (e.g., corresponding to eye tracking sensors 212), which may allow the user to interact with and manipulate one or more virtual objects within the three-dimensional environment. As an example, the eye tracking sensors may track the gaze associated with one or both eyes of the user to determine the viewpoint associated with the second electronic device, and thus a direction of the viewpoint within the three-dimensional environment. The hand tracking sensors, for example, may track the movement of one or more fingers of the user to associate respective finger motions (e.g., touch/tap, pinch, drag, etc.) with one or more interactions with one or more elements of the three-dimensional environment. The user may provide input corresponding to selection and/or manipulation of one or more elements within the three-dimensional environment via the respective finger motions.

As shown in FIG. 3B, the three-dimensional environment optionally includes an interactive tray ("tray") 336 on which the three-dimensional representations 332 of the content is presented within the three-dimensional environment 368. The user may interact with and/or manipulate the tray 336 and/or or the contents of the tray 336. For example, the interactions with the three-dimensional preview 334 of the content can cause the content to be repositioned in two or three-dimensions (e.g., moved in the plane of the tray and/or moved above or below the tray) and/or reoriented (e.g., rotated) within the three-dimensional environment 368. As shown, the three-dimensional environment may also include an interactive toolbar ("toolbar," "object manipulator") 338 associated with the tray 336 and including one or more user interface elements (affordances) 340 which may receive user input. In some embodiments, some or all of the affordances can be selectable to control an appearance and/or one or more actions of the one or more virtual objects 332 of the three-dimensional preview 334. As discussed in detail below, the user may interact with one or more of the affordances 340 to activate one or more modes of the device (e.g., a first mode, a second mode, or a third mode), which may allow the user to view an animation of the one or more virtual objects, to select a virtual object of the one or more virtual objects for editing, and/or scale and project full-sized renderings of the one or more virtual objects within the three-dimensional environment, among other examples. It should be understood that, in some embodiments, the interactive tray 336 and/or the toolbar 338 (and associated affordances 340) are optionally not displayed within the three-dimensional environment 368. For example, in some embodiments, the three-dimensional preview 334 may comprise the one or more virtual objects 332, without including interactive tray 336 and toolbar 338. Additionally or alternatively, in some embodiments, for example, an affordance or menu (not shown) may be presented within the three-dimensional environment 368 for controlling whether the tray 336 and/or the toolbar 338 are presented within the three-dimensional environment 368.

As discussed herein, the three-dimensional preview of the content concurrently displayed with the two-dimensional representation of the content in the content creation application may provide the user with useful visual feedback regarding the appearance of the content in three-dimensions which may otherwise not be provided via the two-dimensional representation. In some embodiments, edits or modifications to the data file running in the content creation application may produce corresponding changes to the appearance of the three-dimensional preview displayed at the second electronic device. As an example, the user may wish to edit or modify one or more features of the content items and view a new three-dimensional preview of the content item in accordance with the edits or modifications. For example, the user may, via one or more input devices in communication with the first electronic device (e.g., via a keyboard), rewrite portions of the script, executable code, etc. of the data file while the two-dimensional representation of the content item is displayed on the first electronic device and the three-dimensional preview of the content item is concurrently displayed on the second electronic device. The user may finalize the edits or modifications (e.g., by saving the changes to the data file) and may request a new preview of the content item representing the data file. Additionally or alternatively, the new preview may be automatically requested once the edits or modifications are finalized by the user. The new (e.g., newly updated) data may be transferred from the content creation application to the three-dimensional rendering application in the manner described above, and the three-dimensional preview of the content item currently displayed on the second electronic device may be updated according to the corresponding changes to the two-dimensional representation of the content item displayed on the first electronic device, such that the three-dimensional preview of the content item has an updated appearance.

As mentioned above, the three-dimensional preview 334 of the content item may be displayed on the second electronic device while the two-dimensional representation 364' of the content item is concurrently displayed on the first electronic device 360'. In some embodiments, the two-dimensional representation of and the three-dimensional preview of the content may be provided at a single electronic device (e.g., a laptop computer, desktop computer, mobile device, etc.), rather than separately provided at two electronic devices. For example, the three-dimensional graphic rendering application may be provided within or at least partially as, a simulator configured to display a computer-generated environment in three-dimensions. In such some embodiments, in response to receiving a request to display a content item in three-dimensions, the three-dimensional graphic rendering application may generate and present a preview of the content in three-dimensions within the computer-generated environment of the simulator (e.g., in a different window on the display of the electronic device). In such some embodiments, the two-dimensional representation of the content may be displayed within the display GUI of the content creation application while the three-dimensional preview of the content is concurrently displayed within the computer-generated environment of the simulator, for example. Additionally or alternatively, in some embodiments, the content creation application may be communicatively linked directly to the three-dimensional graphic rendering application. In such some embodiments, all or portions of the script, executable code, etc. of the data file at 310 may be transferred directly to the three-dimensional graphic rendering application at 318.

In some embodiments, the graphical data communicated along the communication channel between the first electronic device 360 and the second electronic device may be synchronized. In such some embodiments, for example, the communication channel between the content creation application 362 and the three-dimensional rendering application (not shown) may be bidirectional, allowing data to be selectively transferred therebetween in either direction, as dictated by the operating mode of the second electronic device (e.g., the head-mounted display).

In some embodiments, as used herein, a first operating mode ("first operating mode," "first mode") of the second electronic device may refer to a play mode ("play mode," "live mode"), during which animations (including audio effects and/or lighting effects) of the one or more virtual objects within the three-dimensional environment may be presented to the user. In some embodiments, as used herein, a second operating mode ("second operating mode," "second mode") may refer to a selection mode ("selection mode," "edit mode"), during which a respective virtual object of the one or more virtual objects may be selected by the user, at the second electronic device, to allow the user to edit/modify the appearance, animations, etc., at the first electronic device, corresponding to the respective virtual object. In some embodiments, some editing may also be possible using user input to the second electronic device. In some embodiments, as used herein, a third operating mode ("third operating mode," "third mode") may refer to an immersive mode, during which the one or more virtual objects are displayed at full-scale over occluded portions of the real-world environment within the three-dimensional environment As discussed below, a user may interact with the three-dimensional preview of the content item while the second electronic device operates in one of the operating modes to improve content creation for XR content items.

Figure 4A:
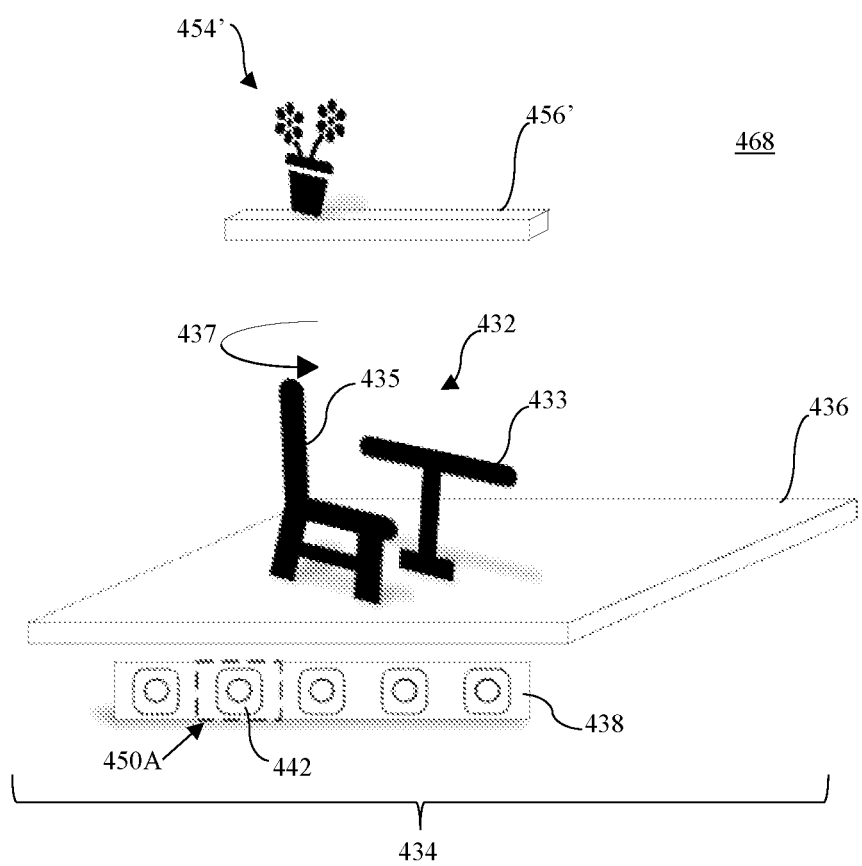
FIGS. 4A-4S illustrate exemplary user interfaces and/or user interactions with one or more objects of a three-dimensional preview of content within a three-dimensional environment according to embodiments of the disclosure.
Figure 4B:
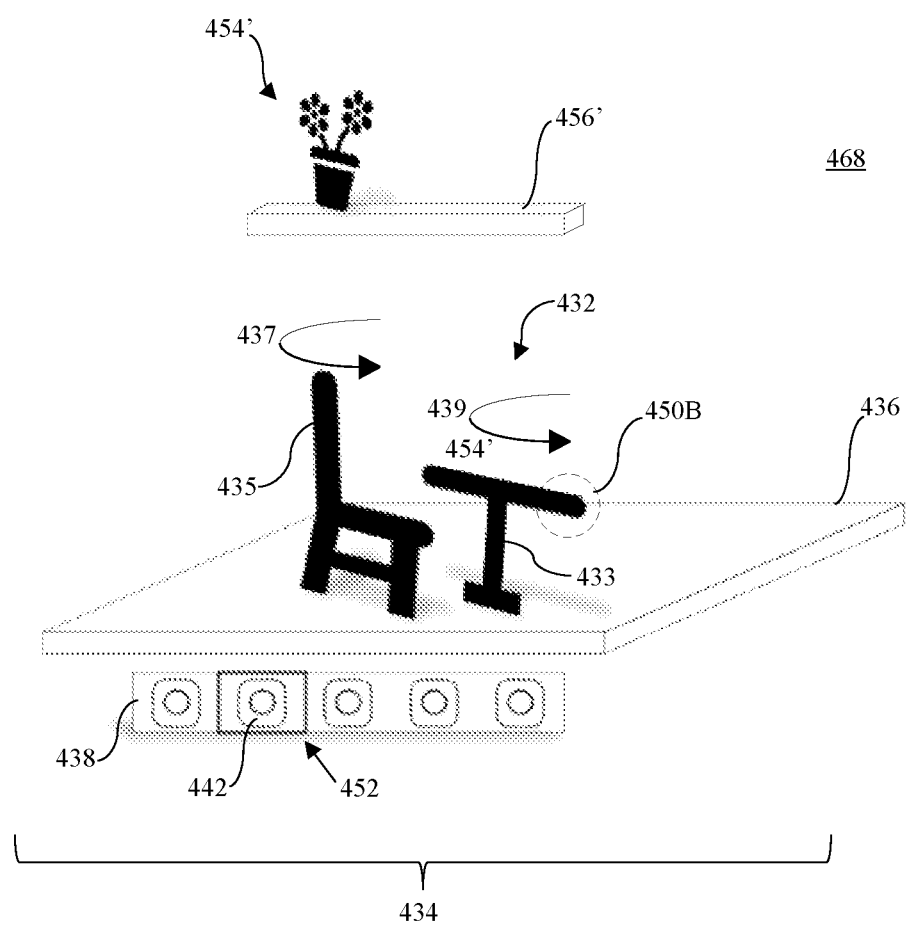
Figure 4C:
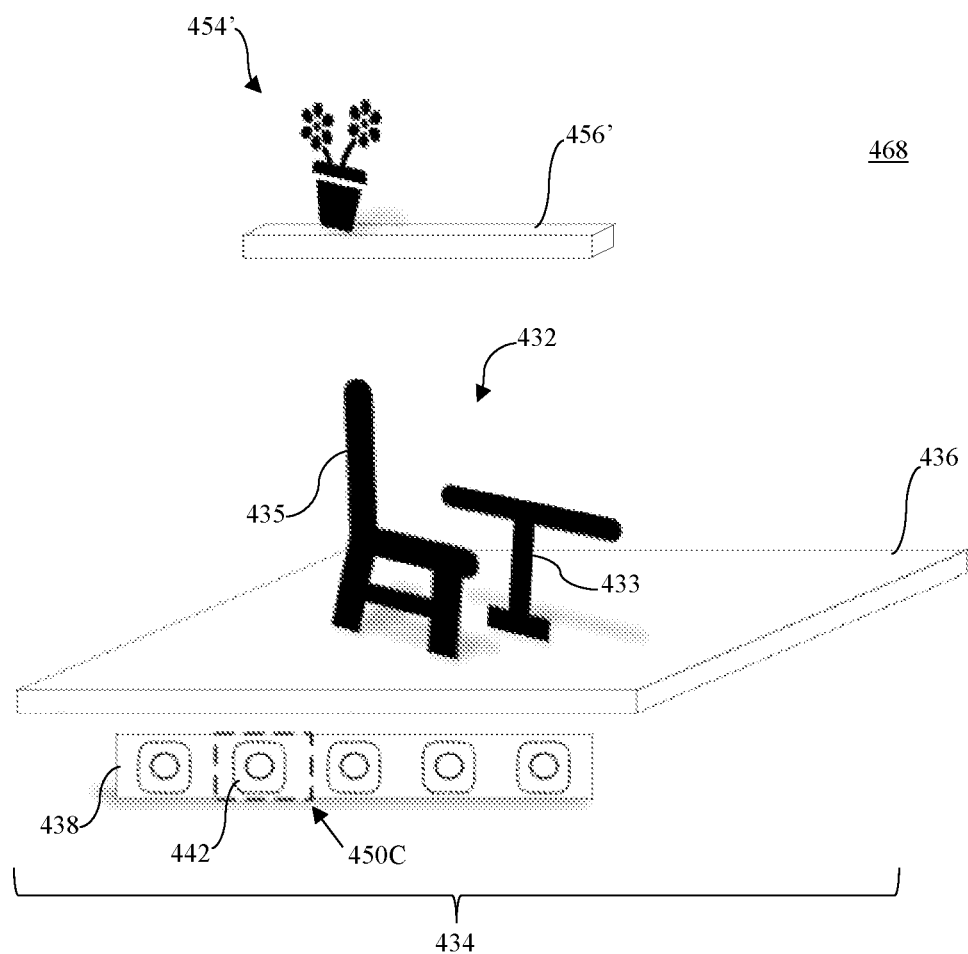
Figure 4D:
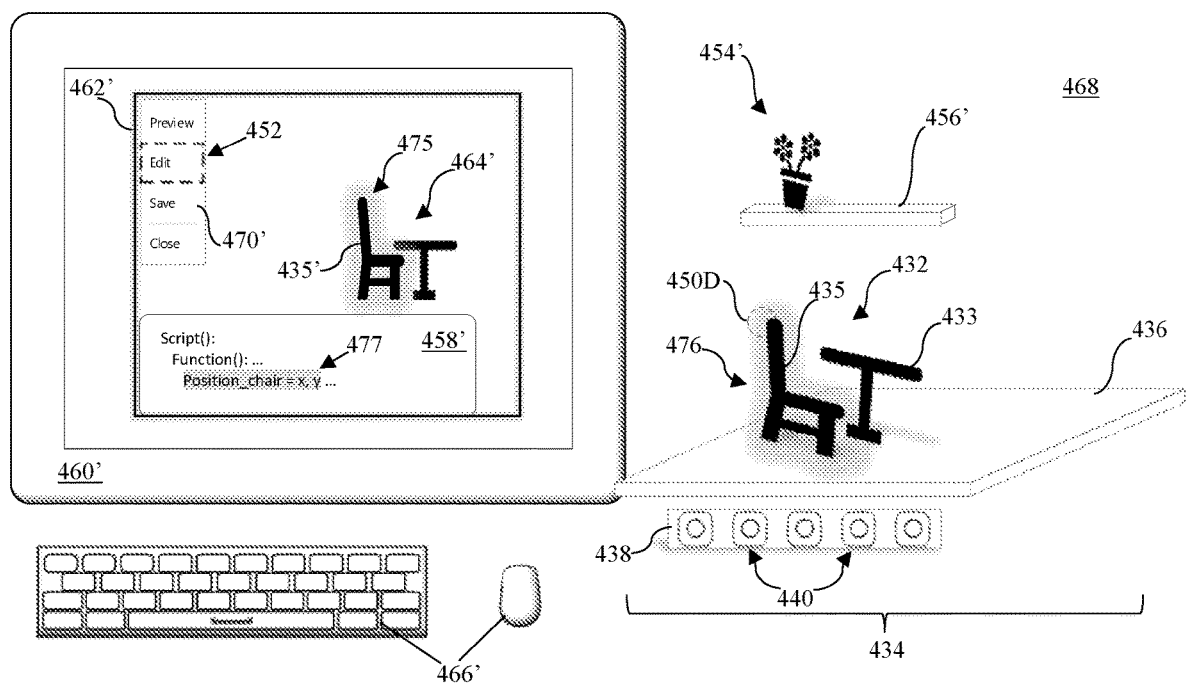
Figure 4E:
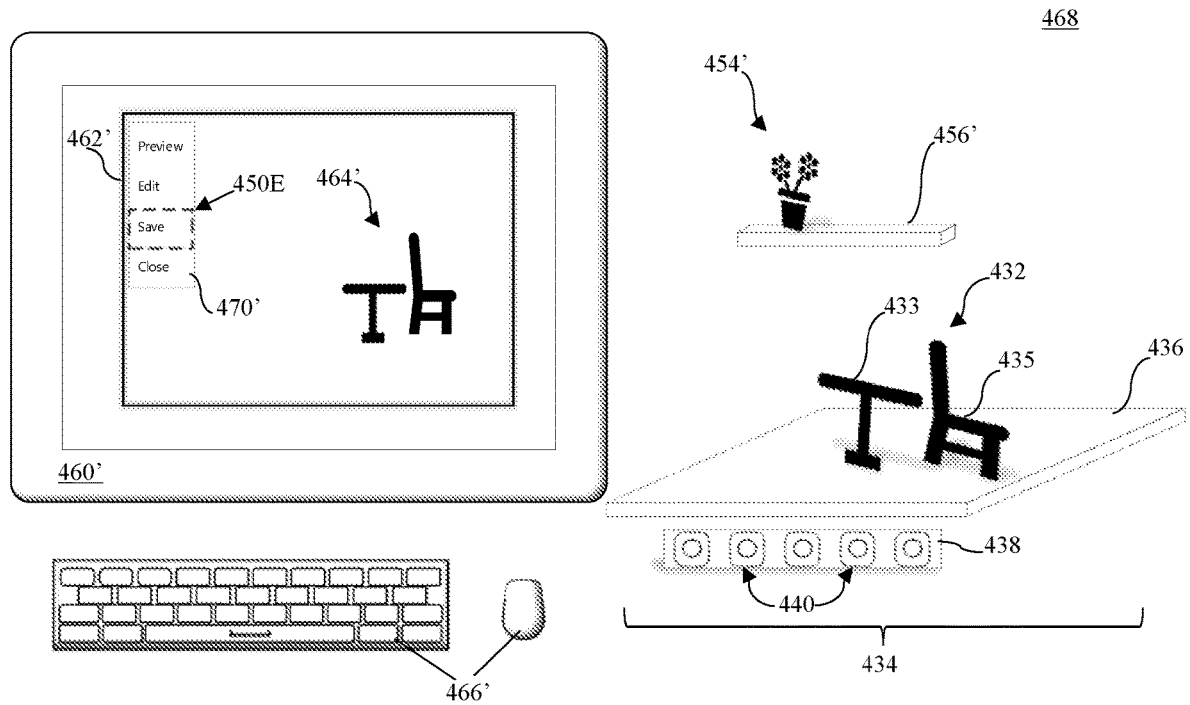
Figure 4F:
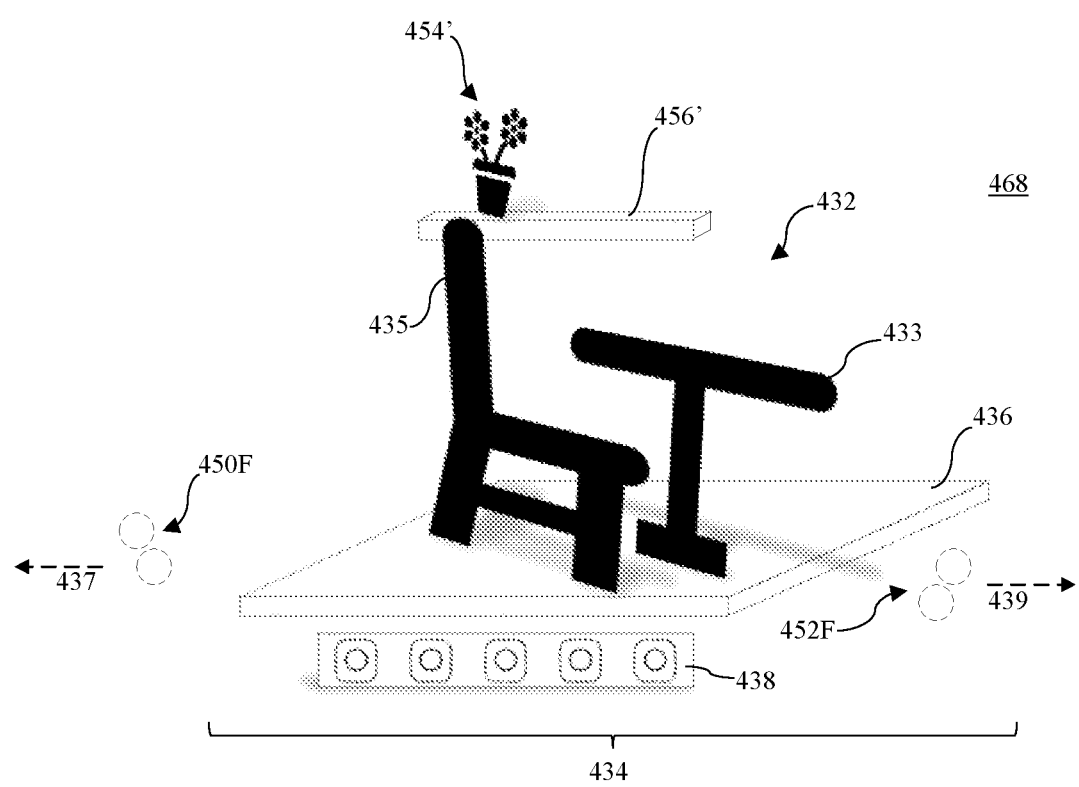
Figure 4G:
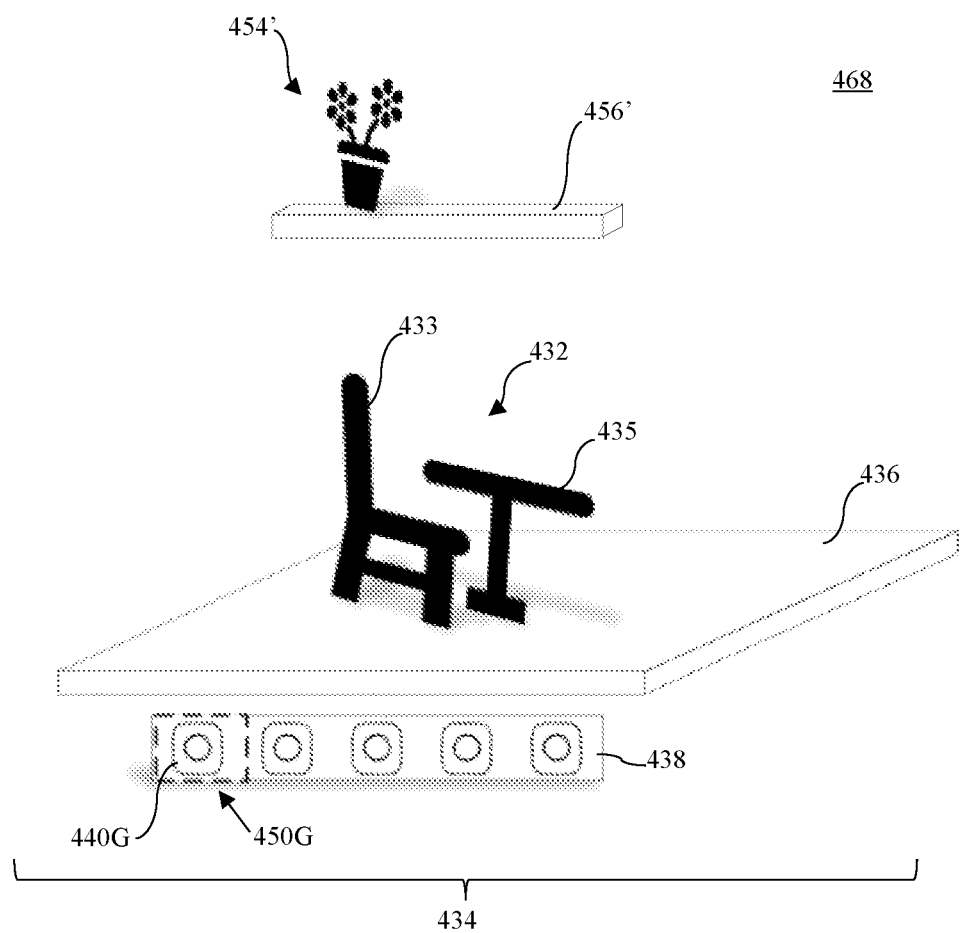
Figure 4H:
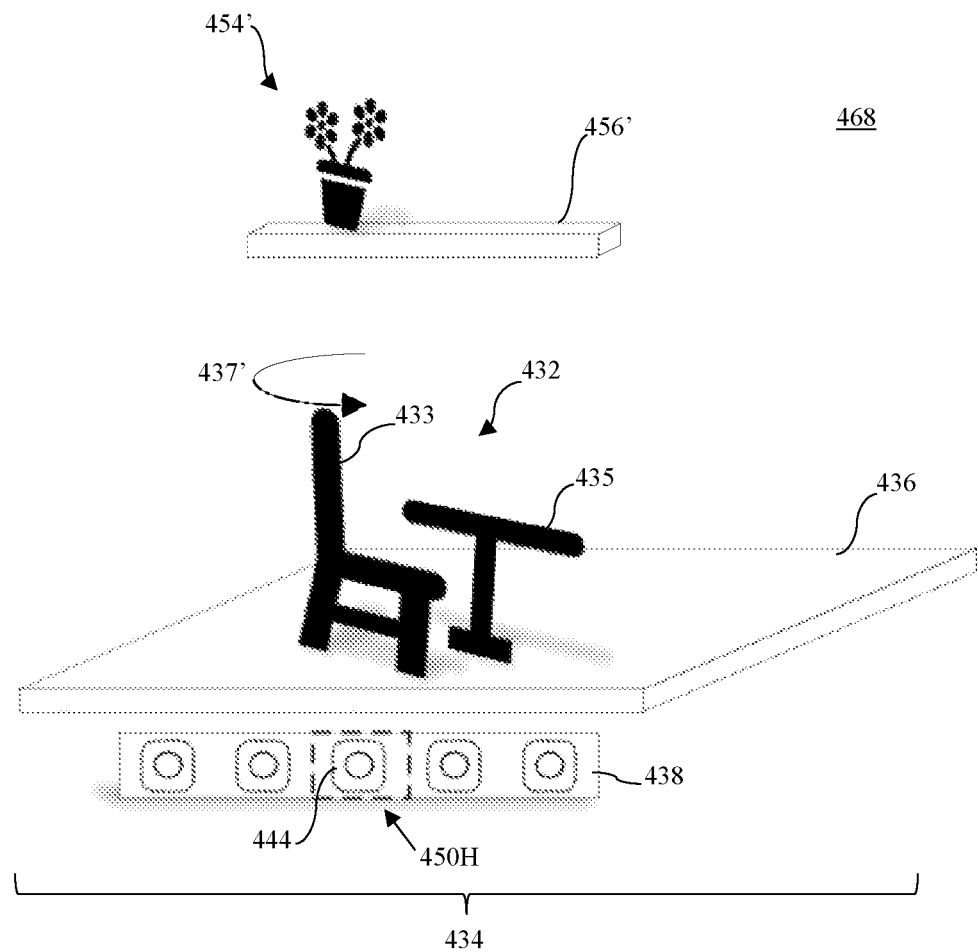
Figure 4I:
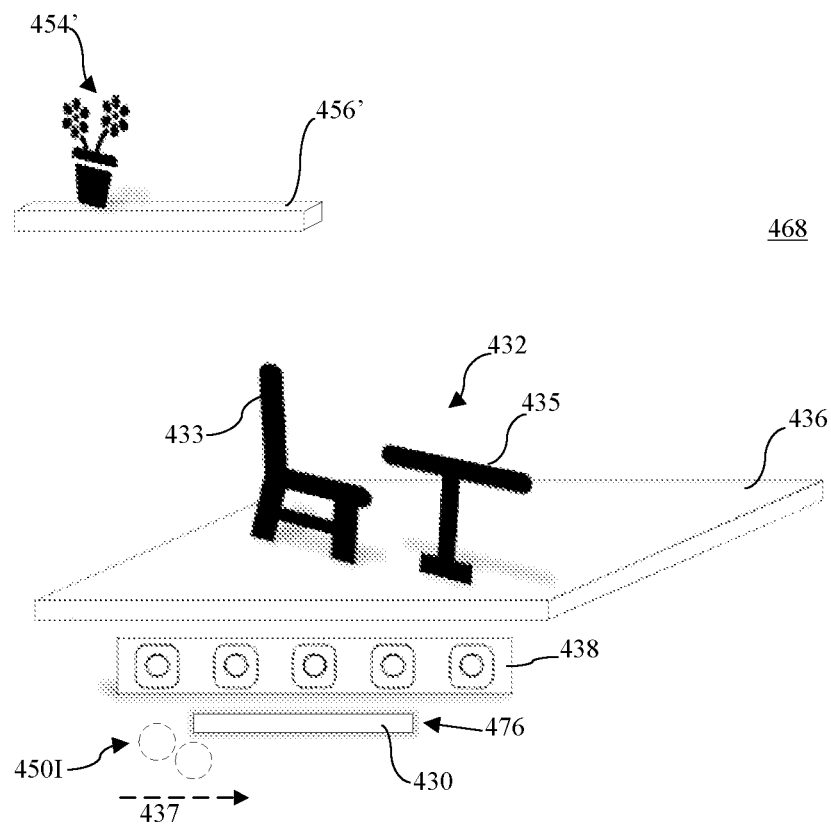
Figure 4J:
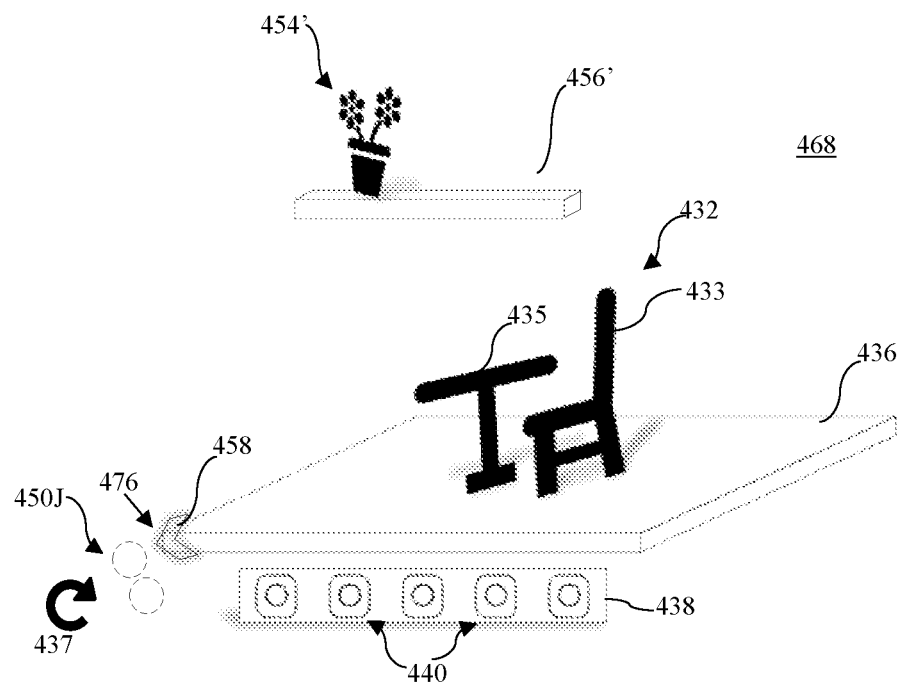
Figure 4K:
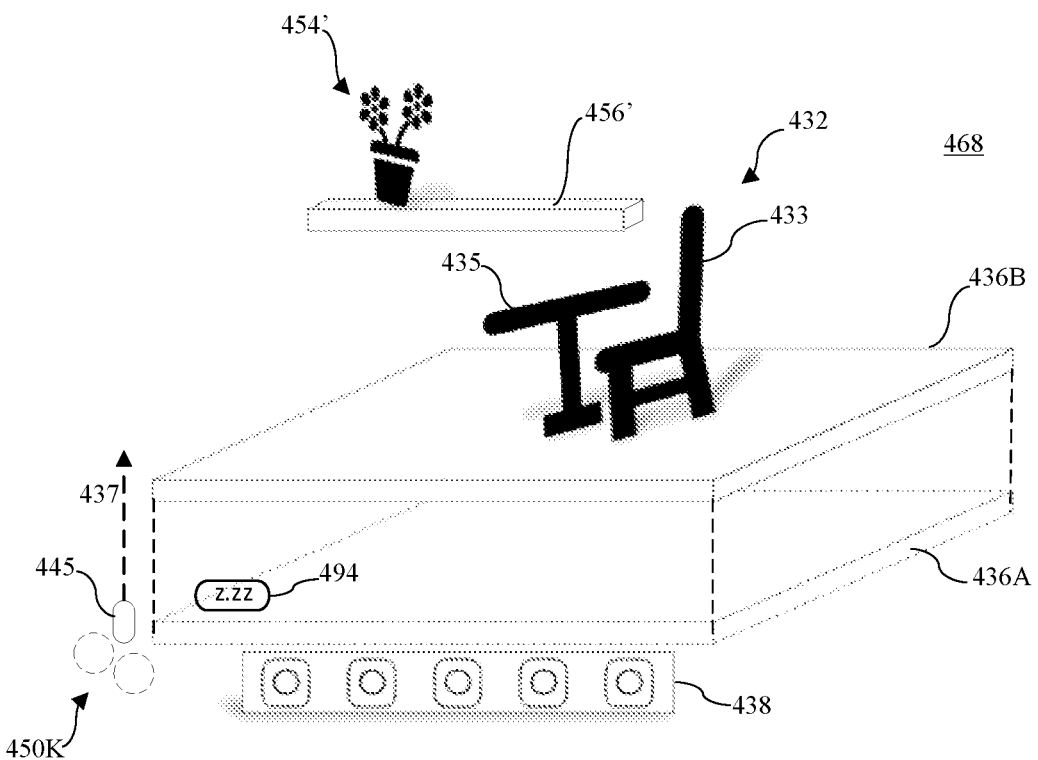
Figure 4L:
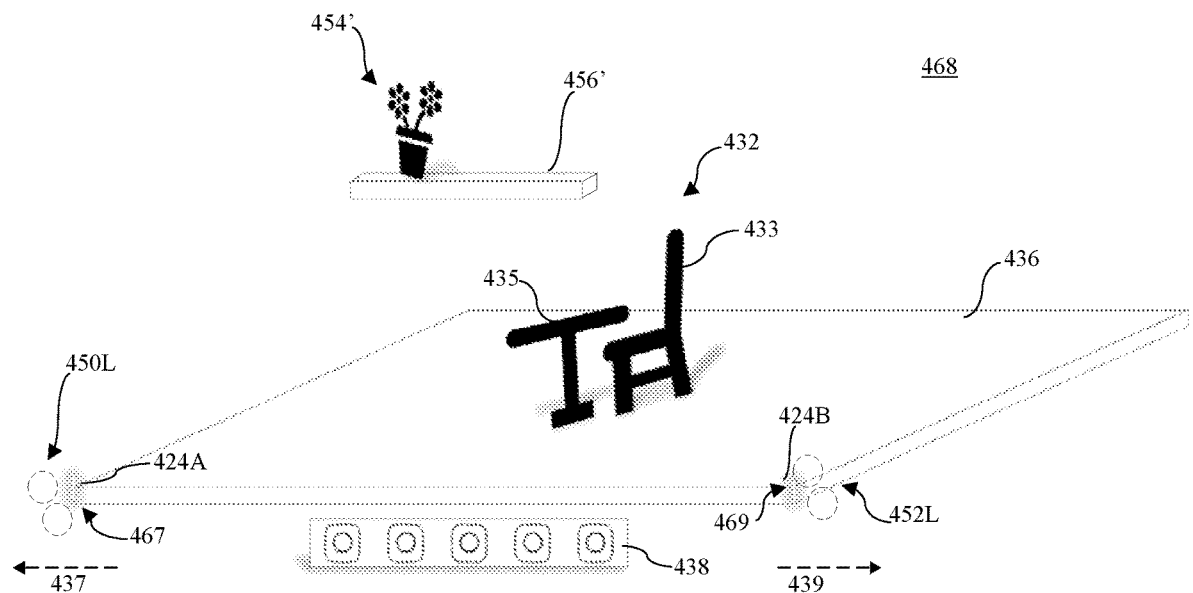
Figure 4M:
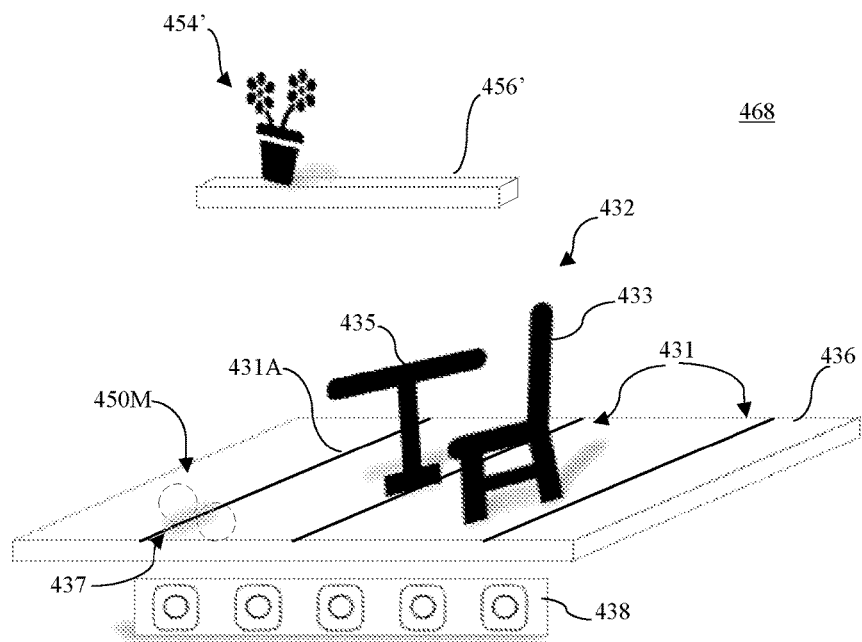
Figure 4N:
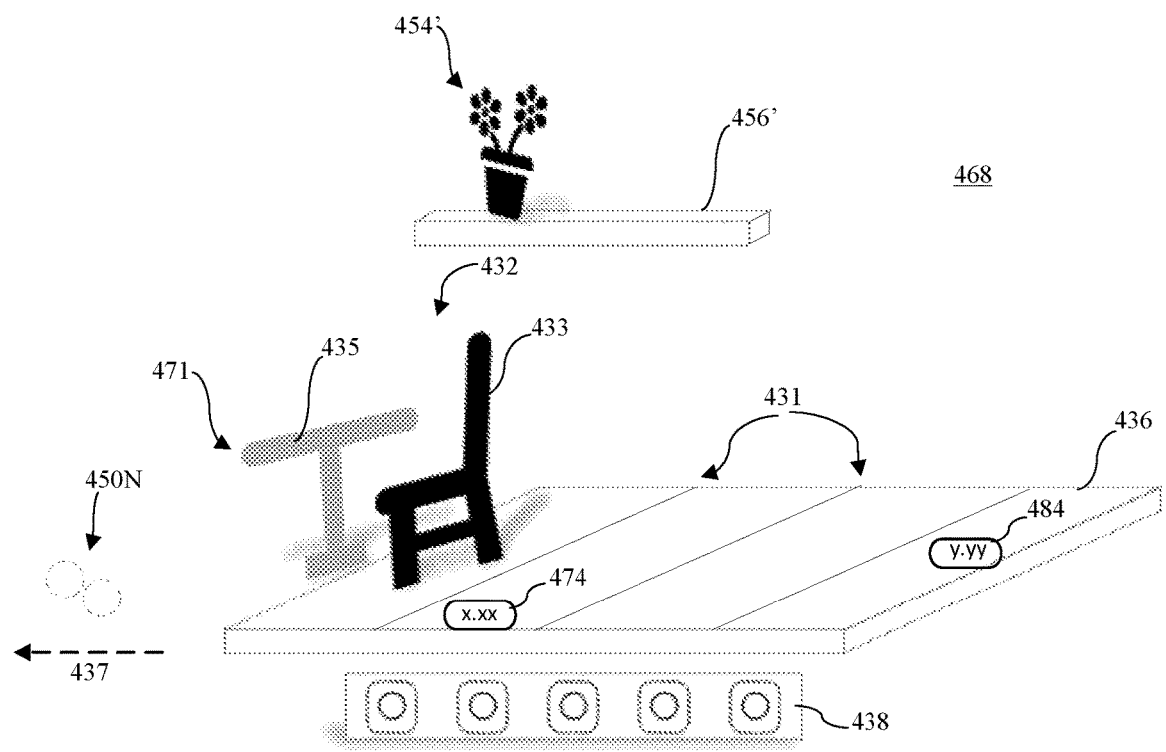
Figure 4O:
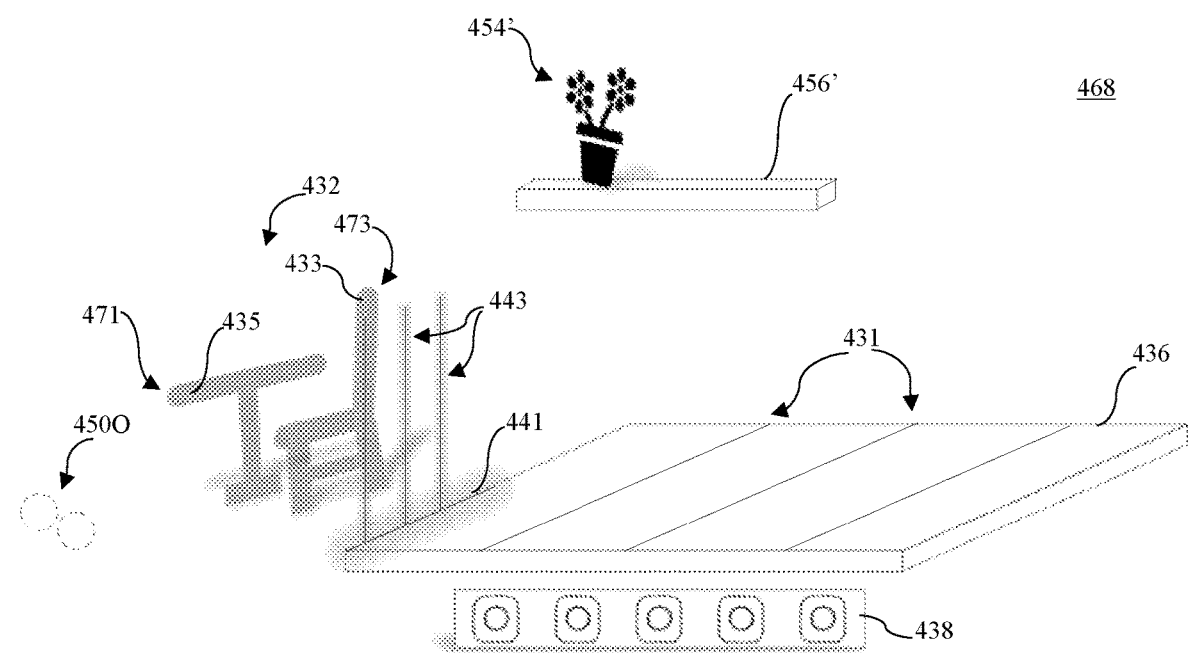
Figure 4P:
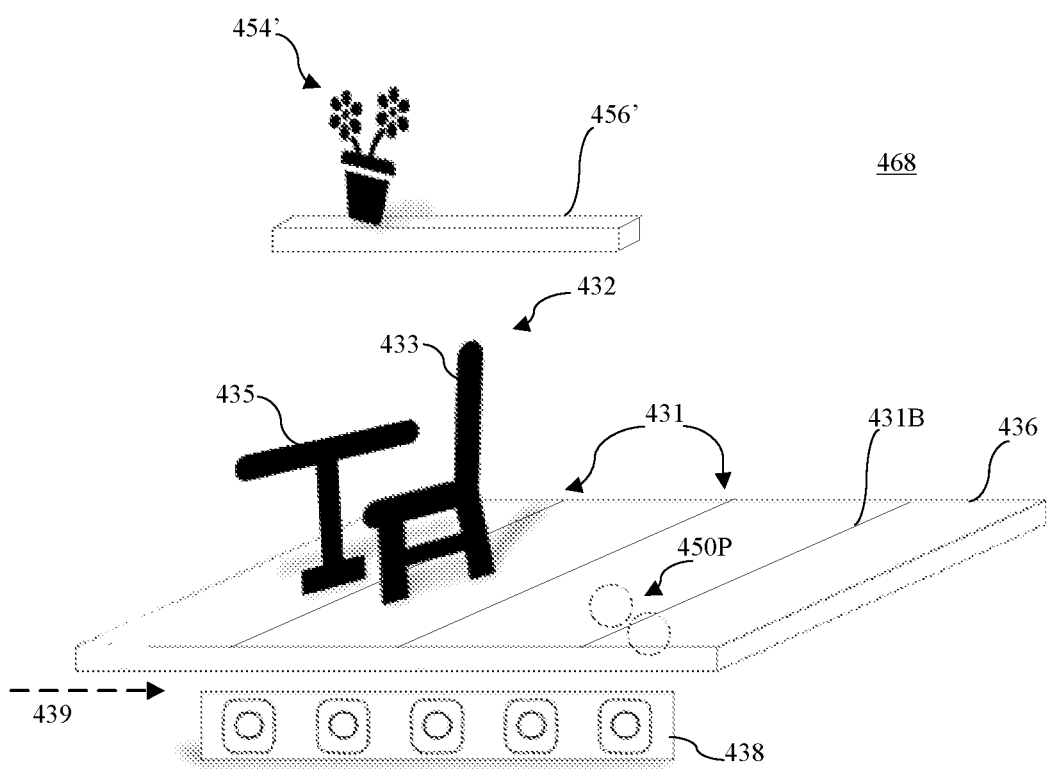
Figure 4Q:
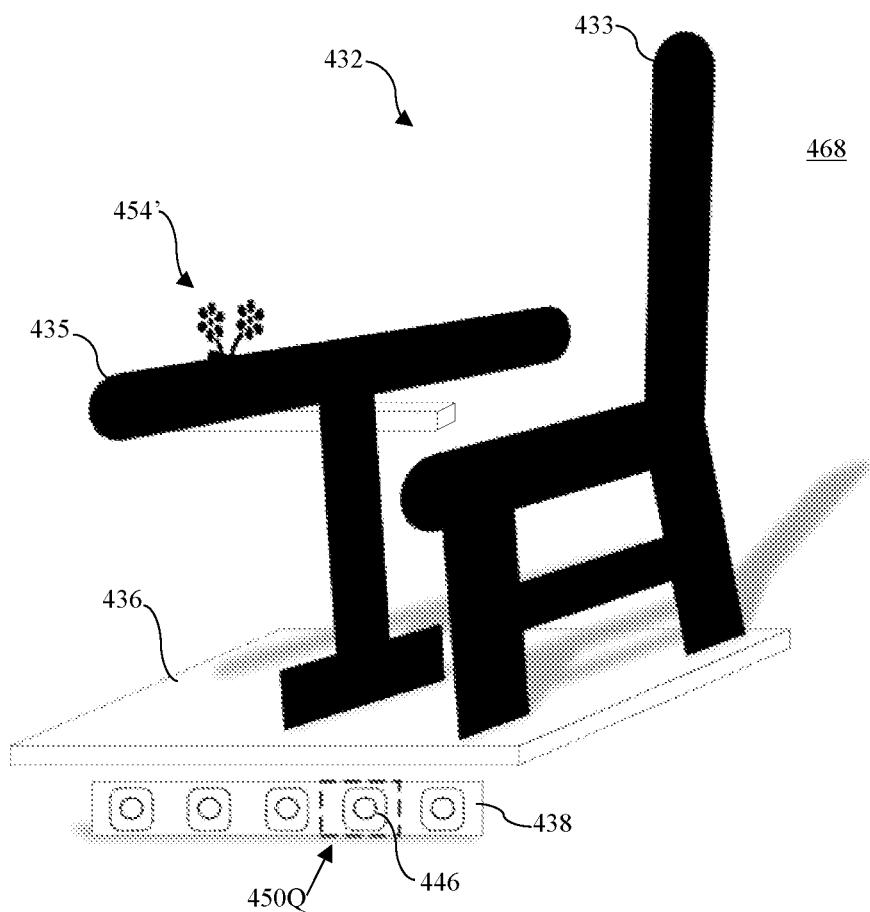
Figure 4R:
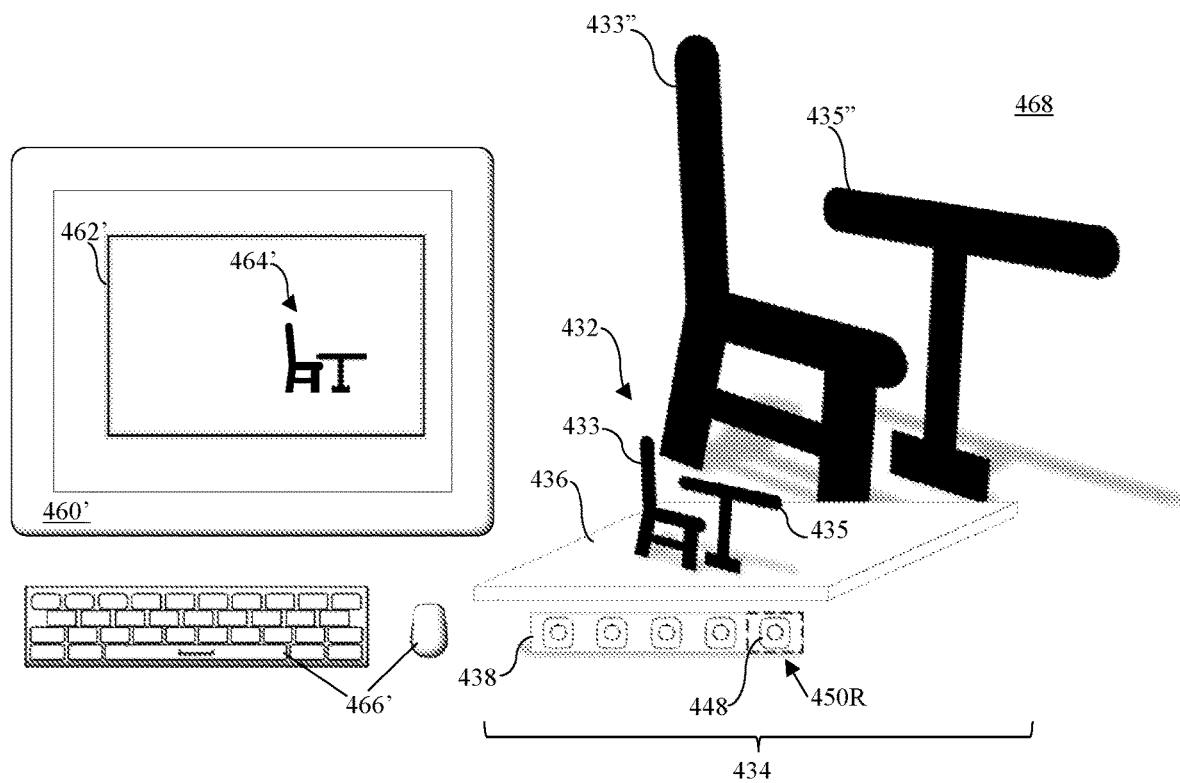
Figure 4S:
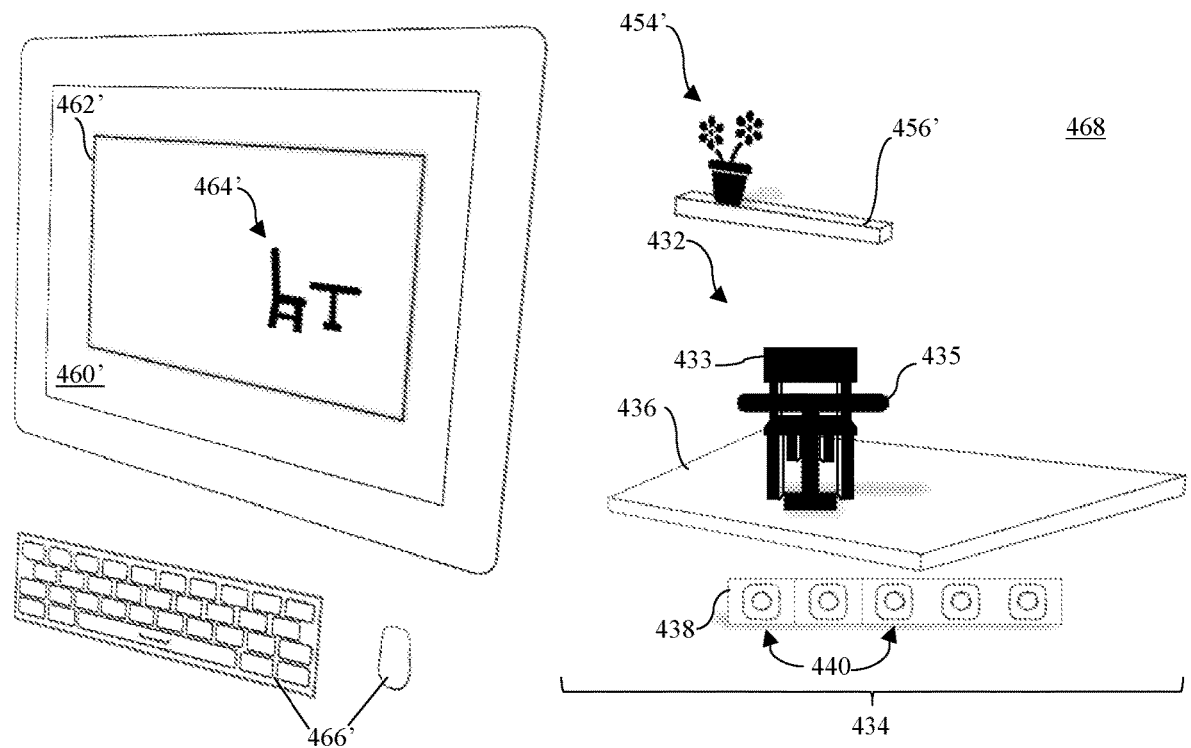

FIGS. 4A-4S illustrate exemplary user interfaces and/or user interactions with one or more objects of a three-dimensional preview 434 of content 432 within a three-dimensional environment 468 according to embodiments of the disclosure. The exemplary user interactions to follow continue the examples illustrated in FIGS. 3A-3B and discussed above. Accordingly, the three-dimensional environment generated and presented at the second electronic device may include the three-dimensional preview of the content as well as representations of the captured portions of the real-world environment, as shown in FIG. 3B. As discussed above, the three-dimensional preview of the content item may provide the user with improved perspective regarding the appearance and form of the content item in three-dimensions. It may be advantageous for the user to view the three-dimensional preview from various angles and perspectives, in various sizes and orientations, and to test and view animations and related actions associated with the content items of the three-dimensional preview. As discussed below, various methodologies are provided for interacting with and manipulating the three-dimensional preview of the content item, such that an enhanced and improved user experience is provided for viewing the content item in three-dimensions.

FIG. 4A illustrates an example user interaction with the three-dimensional preview 434 activating a play mode according to embodiments of the disclosure. As mentioned above, the three-dimensional preview displayed by the second electronic device may be configured to operate in one or more modes, including the play mode (e.g., a first mode of operation) illustrated in the example of FIG. 4A. As shown in the example of FIG. 4A, the three-dimensional preview 434 of the one or more virtual objects 432 may be displayed within the three-dimensional environment 468, which optionally includes the representations of the captured portions of the real-world (e.g., shelf 456' and plant 454'). In some embodiments, the user may select a first affordance 442 ("first affordance," "play mode affordance," "live mode affordance") of the toolbar 438, as shown by selection 450A. Selection of the first affordance 442 may cause one or more virtual objects atop the tray 436 to perform in accordance with any associated behavior. For example, a first virtual object (e.g., the chair) 435 of the one or virtual objects 432 may be configured to perform an action (e.g., an animation, such as a spinning/swiveling motion, as shown by arrow 437), and the action may be executed in the live mode (e.g., the action is designed to be triggered without further user input). In some embodiments, the script, executable code, etc. defining the one or more virtual objects 432 may include instructions for animating the one or more virtual objects within a particular three-dimensional environment (e.g., a computer game, mobile application interface, TV show, movie, etc.). In some embodiments, alternative or additional actions may be performed by the one or more virtual objects while the device operates in the play mode, such as audio operations, lighting operations, object manipulations (e.g., object scaling), movement, etc.

In the play mode, the user may easily and clearly observe animations that have been programmed and defined within the content creation application (e.g., 362) operating on the first electronic device (e.g., 360). In this way, the user may make edits or modifications to the animation of the first virtual object 435 (e.g., by editing the corresponding portions of the script or code in the content creation application and/or IDE) via the first electronic device, and view the updated animation of the first virtual object 435 in real time (e.g., within a threshold amount of time (e.g., 50 ms)). Further, as discussed herein, the user may view the animations from different perspectives (e.g., by walking around the three-dimensional preview or viewing the three-dimensional preview from above), which may be difficult or impossible in a two-dimensional view (e.g., on a 2D screen of the first electronic device). Thus, one advantage of the disclosed method is that animations and related actions associated with one or more virtual objects may be observed in the three-dimensional preview, allowing a user to easily and selectively modify the animations and related actions, as needed. In some embodiments, animations of the one or more virtual objects 432 presented at the second electronic device may concurrently be displayed in two-dimensions on the first electronic device. For example, as the three-dimensional chair 435 spins atop the tray 436 as presented to the user of the second electronic device, the corresponding two-dimensional representation of the chair displayed on the first electronic device (e.g., as shown in FIG. 3A) may spin as well, such that the user may clearly identify the corresponding representation on the first electronic device to edit, as needed.

FIG. 4B illustrates an example user interaction with the three-dimensional preview 434 of selecting a virtual object while the second electronic device operates in the play mode according to embodiments of the disclosure. Continuing the example of FIG. 4A, the user may, while the play mode is active (e.g., while the animations and related actions are actively being presented), interact with the one or more virtual objects 432 to observe a response associated with a user input. For example, a user may provide an input selecting a second virtual object 433 of the one or more virtual objects 432. In some examples, the selection input can be an indirect interaction. For example, the user may gaze toward the second virtual object and select the second virtual object (e.g., the table) 433, as shown by selection 450B, by resting the gaze on the object for more than a threshold period of time, or alternatively by targeting the object with gaze and performing selection by another input such as a touch input (e.g., a pinch of two fingers, pressing a button, performing a gesture), using a vocal command, etc. In some embodiments, the selection input can be a direct interaction in which the user touches the object in the three-dimensional environment directly, as represented by selection 450B. In some embodiments, as shown in the example of FIG. 4B, an action corresponding to the table 433 occurs (e.g., in response to receiving the selection 450B of the table 433). The action may be defined by one or more instructions encoded for the table 433. For example, the table 433 may be encoded (via the content creation application 362 or IDE) to perform a swivel/spin action, as shown by arrow 439, that is triggered by a selection input. As another example, in some embodiments, an alternative action associated with the table may be encoded to be performed (e.g., emit audio, perform alternative movement, etc.) in response to the selection 450B. It should be understood that additional or alternative actions may be performed by the one or more virtual objects or be associated with object in response to the same, an additional, or an alternative inputs. For example, a double tap input (e.g., by one or more fingers) may cause the table 433 to move to a respective location on the tray 436 different from its initial position before the double tap input.

In some embodiments, animations of the one or more virtual objects 432 or other action associated with the virtual object(s) presented at the second electronic device may concurrently be displayed in two-dimensions on the first electronic device. For example, as the table 433 spins atop the tray 436 at the second electronic device in response to the selection 450, the corresponding two-dimensional representation of the table displayed on the first electronic device (e.g., as shown in FIG. 3A) may spin as well, such that the user may clearly identify the corresponding representation on the first electronic device to edit, as needed.

FIG. 4C illustrates an example user interaction with the three-dimensional preview 434 stopping the play mode according to embodiments of the disclosure. Continuing the examples of FIGS. 4A-4B, while the play mode is active (i.e., while the animations and/or other actions related to the one or more virtual objects 432 are actively being presented), the user may interact with the first affordance 442 to cause the play mode to stop operating. For example, as shown in the example of FIG. 4C, the user may select the first affordance 442 of the toolbar 438 a second time, as shown by selection 450C, to cause the first virtual object 435 and/or the second virtual object 433 to stop spinning/swiveling (as indicated by the omission of arrows 437 and 439. In this way, the user effectively stops operation of the play mode. In some embodiments, stopping the play mode causes a transition to a second mode (e.g., the selection mode/edit mode). In some embodiments, stopping the play mode causes playback of the animations/actions to pause, but the playback can be resumed later user the same or a different affordance.

FIG. 4D illustrates an example user interaction of selecting a virtual object with the three-dimensional preview 434 operating in the selection mode/editing mode according to embodiments of the disclosure. As mentioned above, and in continuation of the example of FIG. 4C, in some embodiments, pausing playback causes a transition from the play mode to the selection mode. In the selection mode, individual items of content 432 can be selected for quick editing of the individual items of the content 432. The selection input can be a direct or indirect interaction that is the same or similar to the interactions described above with respect to FIG. 4B.

In some embodiments, as shown in the example of FIG. 4D, while the second electronic device operates in the selection mode, the user may select the first virtual object 435, as shown by selection 450D. In some examples, an appearance of a selected virtual object changes. For example, the first virtual object 435 can be highlighted in response to selection, as shown by highlight 476 around object 435. It should be understood that additional or alternative indications may be provided for indicating selection of one of the virtual objects 432 (e.g., glow effects, animation of an arrow pointing to the virtual object, etc.). As shown in FIG. 4D, in some embodiments, selection of the first virtual object 435 while in the selection mode optionally causes the selection and a change in appearance of the corresponding two-dimensional representation 435' of the virtual object (chair), as shown by highlight 475. In some embodiments, the change in appearance on the selected objects 435 and 435' may be different between the three-dimensional preview and the content creation application (e.g., different shade of highlight, different effect, etc.). Additionally or alternatively, in some embodiments, a change in appearance of corresponding portions of the script or executable code defining the chair 435' in the content creation application 462' (and/or in an IDE) may occur concurrently with the change of appearance of chairs 435 and/or 435', as shown by highlight 477. As shown as an example, the code may be presented within a script editor window/UI 458' (or a representation of a script editor window) that may be presented and/or updated in response to the user selecting the chair 435 within the three-dimensional preview 434 (and/or within content creation application).

As mentioned previously in the disclosure, the user may actively edit the content 464' within the content creation application 462' at the first electronic device 460' using the feedback provided by the three-dimensional preview 434. As shown in the example of FIG. 4D, while the portions of the code within script editor 458' are highlighted, the user may select "Edit" from the menu 470', as shown by selection 452. The user may then edit portions of the highlighted code, shown at 477, to change a position of the chair 435 with respect to the table 433 in the three-dimensional environment 468, for example, as discussed in more detail below. In some embodiments, the user can use input devices to perform edits to characteristics of the selected object in script editor 458' and/or in other user interfaces within the content creation application 462'. For example, the user may edit the highlighted portions of the code or modify other editable user interface fields via the one or more input devices 466' (e.g., clicking or double clicking the code within the script editor window 458' using a mouse and modifying the code with a keyboard). Additionally or alternatively, the user can click and drag use arrow keys on the keyboard to change the position of the selected object.

FIG. 4E illustrates an example user interaction with the three-dimensional preview 434 editing a position of a virtual object in the selection mode according to embodiments of the disclosure. Continuing the example of FIG. 4D, in some embodiments, the user may edit the content 464' within the content creation application 462' at the first electronic device 460'. As mentioned above, the user may reposition the chair 435 with respect to the table 433 in the three-dimensional environment 468, as shown in the example of FIG. 4E. After the edits are made, the user may optionally finalize them by, for example, selecting "Save" from the menu 470', as shown by selection 450E. It should be understood that the user may finalize/save the changes made to the code defining one or more virtual objects by other means, such as, for example, inputting a combination of keys from a keyboard in communication with the first electronic device. In some embodiments, the edits are reflected in real-time without saving.

In some embodiments, as shown, the three-dimensional preview 434 may be updated in response to the changes to the content 464' made in the content creation application 462' at the first electronic device 460'. In some embodiments, the three-dimensional preview 434 may be updated in real time (e.g., within a threshold amount of time) without the user having to request a new (e.g., a second) preview. As shown in FIG. 4E, the chair 435 is repositioned to the right of the table 433, while maintaining its original orientation (e.g., while continuing to face out). Because the only change made to the chair 435 relates to the position of the chair on the tray 436, per this example, selecting the first affordance (e.g., 442) optionally activates the play mode and causes the chair to spin/swivel in the same manner shown and described previously. Thus, as outlined above, one advantage of the disclosed method is that a user may easily edit or modify a virtual object by selecting the virtual object in three-dimensional space at the second electronic device, and directly editing relevant portions of code defining the virtual object at the first electronic device, allowing for an interactive and streamlined content creation and editing process.

FIG. 4F illustrates an example user interaction with the three-dimensional preview 434 of expanding a size of one or more virtual objects according to embodiments of the disclosure. In some embodiments, the user may increase or decrease a size of some or all of the one or more virtual objects 432 within the three-dimensional environment 468 to, for example, view additional or alternative features of the one or more virtual objects (e.g., surface texture, coloration, etc.). In some embodiments, the user may increase or decrease the size of the one or more virtual objects via eye gaze and/or using hand/finger manipulations.

In some embodiments, as shown in the example of FIG. 4F, a user's gaze targets the three-dimensional preview (e.g., gazing at the one or more virtual objects 432 atop the tray 436) and the user performs a hand operation to expand or shrink the one or more virtual objects. The hand operation can include pinching two fingers of a first hand and pinching two fingers of a second hand and moving the two hands closer together or further apart while holding the pinching of both hands. The direction of the motion can determine whether to increase or decrease the size of the objects. In some examples, moving of the hands apart (increasing the distance between the pairs of pinched fingers, as indicated by arrows 437 and 439) increases the size of the one or more objects. For example, as shown in the example of FIG. 4F, chair 435 and the table 433 are shown increased in size relative to FIG. 4C. In some examples, moving of the hands together (decreasing the distance between the pairs of pinched fingers) decreases the size of the one or more objects. In some embodiments, an amount of change in size of the one or more objects is a function (linear or non-linear) of the amount of change in distance between the two hands. In some embodiments, to expand or shrink the size of the one or more virtual objects 432, the pinching with two fingers begins at opposite sides of the tray 436, as shown by pinch inputs 450F and 452F. In some embodiments, the pinching of fingers of both hands must occur within a threshold period of time.

Additionally or alternatively, in some embodiments, the second electronic device may change the size of the one or more virtual objects 432 in the three-dimensional environment 468 in response to user input directed to a representation of a pivot point that is displayed with the tray 436. For example, the second electronic device may display the pivot point (e.g., a graphical point, pin, marker, etc.) on the tray 436 in response to detecting a pinch selection and hold for a threshold period of time (e.g., for 1, 2, 3, 4, etc. seconds) while the gaze of the user is directed toward the tray 436 (e.g., and without movement or with less than a threshold movement of the hand of the user until the threshold period of time for the hold is satisfied). In some embodiments, the pivot point may be displayed at a predefined location of the tray 436. For example, the pivot point is displayed at a location of the gaze of the user on the tray 436. In some embodiments, the pivot point is displayed at a predetermined location of the tray 436 that is closest to (e.g., within a threshold distance of, such as 0.5, 1, 1.5, 2, 3, etc. cm of) the location of the gaze of the user on the surface of the tray 436. In some embodiments, the pivot point is displayed at a center point on the tray 436 irrespective of the location of the gaze of the user on the tray 436. In some embodiments, the pivot point is displayed at a corner of the tray 436 irrespective of the location of the gaze of the user on the tray 436. In some embodiments, the pivot point is displayed at other locations of the tray 436 irrespective of the location of the gaze (e.g., at a location adjacent to and/or between the virtual objects 432). In some embodiments, the pivot point is displayed at the center point or a respective corner point that is closest to the location of the gaze. In some embodiments, the second electronic device does not display a representation of the pivot point and may change the size of the one or more virtual objects 432 in the three-dimensional environment relative to the pivot point (e.g., which is optionally not actually displayed on the tray 436 in the three-dimensional environment 468).

In some embodiments, the second electronic device may scale the one or more virtual objects 432 atop the tray 436 in response to movement of the hand of the user, while maintaining the pinch selection and hold discussed above, relative to the pivot point on the tray 436. For example, while the pivot point is displayed on the tray 436 after the second electronic device detects the pinch selection and hold, the tray 436 may be increased in size, as similarly shown in FIG. 4L, in response to movement of the hand of the user in a first direction (e.g., toward and/or away from the pivot point on the tray 436). Additionally, in some embodiments, the tray 436 may be decreased in size in response to movement of the hand of the user in a second direction, opposite the first direction (e.g., away from and/or toward the pivot point on the tray 436). In some embodiments, the second electronic device may scale the one or more virtual objects 432 atop the tray 436 in response to movement of the hand of the user relative to a location in space (e.g., in the three-dimensional environment 468) at which the pinch and selection and hold was established (as described above). For example, the movement of the hand of the user is relative to a location in space at which the pinch selected was detected for the threshold period of time for the hold (e.g., and without detecting movement or with less than the threshold movement of the hand of the user until the threshold period of time for the hold is satisfied).

In some embodiments, instead of scaling the tray 436, the input can be used to scale the virtual objects 432 displayed on the tray. In some embodiments, in response to detecting movement of the pinched hand of the user in a first direction (e.g., toward the pivot point on the tray 436, away from a body of the user) relative to the pivot point, the second electronic device may scale down (e.g., decrease the size of) the one or more virtual objects 432 on the tray 436. In some embodiments, in response to detecting movement of the pinched hand of the user in a second direction, opposite the first direction (e.g., away from the pivot point on the tray 436, toward the body of the user), the second electronic device may scale up (e.g., increase the size of) the one or more virtual objects 432 on the tray 436, as similarly shown in FIG. 4F. In some embodiments, an amount (e.g., a scaling factor) by which the one or more virtual objects 432 is scaled on the tray 436 is proportional to a magnitude of the movement of the hand relative to the pivot point in the three-dimensional environment 468. Accordingly, as outlined above, providing a graphical pivot point on the tray 436 as a reference point by which the one or more virtual objects 432 may be scaled in response to user input simplifies the gesture needed to scale the one or more virtual objects 432 in the three-dimensional environment 468 (e.g., by reducing the gesture from a two-handed gesture to a one-handed gesture). Additionally, providing the graphical pivot point on the tray 436 as a reference point simplifies the user interface objects provided for scaling the one or more virtual objects 432 because the graphical pivot point is optionally only displayed in response to detecting a pinch selection and hold input and while maintaining the pinch selection and hold input as discussed above.

In some embodiments, in response to detecting a release of the pinch selection (e.g., such that the user is no longer gripping the pivot point), the second electronic device no longer displays the pivot point on the tray 436 (e.g., ceases display of the corner grip 458). Subsequent movement after release of the pinch does not scale the virtual objects 432 and/or tray 436. For example, movement of the hand of the user toward and/or away from the pivot point will not cause the second electronic device to scale the one or more virtual objects 432 atop the tray 436 in the three-dimensional environment 468. In some embodiments, a pinch selection followed by movement of the hand of the user (e.g., above the threshold movement before a hold of the pinch selection for the threshold period of time established a pinch selection and hold input) does not cause the pivot point to be displayed on the tray 436. In some embodiments, the pinch selection followed by the movement of the hand (e.g., without establishing a hold before the movement) may cause the second electronic device to move (translate) the virtual objects 432 on the tray 436 in the three-dimensional environment 468 in accordance with the movement of the hand (e.g., as similarly shown in FIG. 4I), rather than scale the one or more virtual objects 432.

As shown in the example of FIG. 4F, in some embodiments, changing the sizes of the virtual objects 433 and 435 does not change the size of the tray 436 or the toolbar 438. In this way, a scaling of the one or more virtual objects 432 does not cause the scaling of other elements within the three-dimensional environment 468, which could interfere with the visibility of the three-dimensional preview 434 (e.g., if the tray shrinks) or other content in the three-dimensional environment (e.g., other applications or due to occlusion between the toolbar 438 and tray 436 or content items) and/or of the ability to interact with the controls (e.g., which may be difficult to use when the size and/or position of the controls changes. It should be noted that, in some embodiments, increases or decreases in the sizes of the one or more virtual objects 432 presented at the second electronic device is not received or construed as being an input corresponding to a request to edit or modify the actual size of the corresponding content at the first electronic device. For example, while the virtual objects 433 and 435 may be increased or decreased in size in the three-dimensional preview 434, the corresponding two-dimensional representations (e.g., 464' in FIG. 4E) displayed on the first electronic device remain unchanged (e.g., the sizes of the two-dimensional representations do not increase or decrease). In some embodiments, however, the size of the corresponding two-dimensional representations may change in size, but the amount of change in size may be scaled down (e.g., according to the ratio of size between the content creation application and the three-dimensional preview in the three-dimensional environment). In some embodiments, the user may increase or decrease the actual size of the content items in the content creation application (e.g., by editing portions of the code in the IDE defining size parameters) and the corresponding change in size can be reflected in the three-dimensional preview.

In some embodiments, the use of the hand operation without first selecting or targeting a specific object (or group of objects) causes the change in size to be applied to all content in the three-dimensional preview. In some examples, the same hand operation causes the change in size to be applied to only the selected or targeted object or group of objects (e.g., using a tap, a pinch and release of one hand while targeting with gaze, or by resting gaze on an object for more than a threshold period of time).

FIG. 4G illustrates an example user interaction with the three-dimensional preview 434 of resetting of one or more virtual objects according to embodiments of the disclosure. As mentioned above, in some embodiments, the user may change the size of the one or more virtual objects 432 displayed in the three-dimensional preview 434 within the three-dimensional environment 468. Continuing the example of FIG. 4F, in some embodiments, the user may reset the appearance, form, orientation, etc. of the one or more virtual objects 432, such that the first and the second virtual objects 433 and 435 are optionally restored to and displayed at their original sizes (e.g., to the size as shown previously in FIG. 4C). As shown in FIG. 4G, the user may select a reset affordance 440G, as shown by selection 450G, to restore the first and the second virtual objects 433 and 435 to their initial sizes. As shown, in response to the selection of the reset affordance 440G, the first and the second virtual objects 433 and 435 may be shrunk to reduce the sizes of the first and the second virtual objects 433 and 435 to their original sizes from the enlarged sizes in FIG. 4F, for example. In some embodiments, the resetting causes all of the content items to be displayed within the bounds of the tray 436.

In some embodiments, selection of the reset affordance 440G optionally resets some or all previous manipulations of the virtual objects (e.g., reorientations/changes in perspective of the one or more virtual objects) to their respective initial states (e.g., respective appearance, form, size, etc.), not solely just size manipulations. In some embodiments, selection of the reset affordance 440G optionally resets some or all previous manipulations of the three-dimensional preview (e.g., including manipulations of the tray described herein). Additionally or alternatively, in some embodiments, manipulations of the content items made on the first electronic device (e.g., changes to position of one or more content items, changes in orientation/perspectives of the one or more content items, etc.) may also be reset (e.g., concurrently reset) in response to selection of the reset affordance 440G within the three-dimensional environment 468. In some embodiments, the resetting of the one or more virtual objects 432 within the three-dimensional preview 434 may be animated, for example, such that the change of each of the sizes of the first virtual object 433 and the second virtual object 435 of FIG. 4G to their respective original sizes shown in FIG. 4F is animated and displayed at the second electronic device for the user to observe. In some embodiments, although some manipulations to the content items may be reset, other manipulations of the tray 436 (e.g., changes to the size, elevation, position, etc. of the tray 436) may not be reset in response to selection of the reset affordance 440G.

FIG. 4H illustrates an example user interaction with the three-dimensional preview 434 of scrubbing through an animation corresponding to one or more virtual objects according to embodiments of the disclosure. In some embodiments, the user may view one or more animations and/or related actions associated with one or more virtual objects incrementally, rather than viewing the animations or related actions in a sequence and timing corresponding to these behaviors (e.g., during the play mode). In some embodiments, as illustrated in the example of FIG. 4H, the user may select a third affordance ("third affordance," "scrubber affordance") 444 from the toolbar 438, as shown by selection 450H. In response to receiving the selection of the scrubber affordance 444, the first virtual object 437 may advance from performing a first portion of a first action to performing a second portion of the first action or performing a second action. For example, as described with respect to FIG. 4B, chair 433 can be configured to swivel or spin. In some embodiments, the scrubber affordance can cause the chair 433 to advance from a first position within the animation to a different position within the animation, as shown by dashed arrow 437'. For example, the scrubber can cause the playback in the play mode to advance by a predefined amount (e.g., 500 ms, 1 second, etc.) and/or advance to a time linked to another event (e.g., a next triggering action), etc. Subsequent selections of the second affordance may cause playback to advance to skip to another portion of the animation (e.g., a different position within the animation of swiveling of chair 433) or to a subsequent animation or action for one of the virtual objects.

In some embodiments, the above behavior is triggered by tapping and releasing the scrubber affordance 444. In some embodiments, the scrubber affordance can have other input modes to provide different scrubbing behavior. For example, the user may continuously select the second affordance 444 (e.g., by pressing and holding button 444 or by holding a pinch, etc.) to continuously scrub through the animation associated with the first virtual object 433, equivalent to fast-forwarding the playback of the actions/animations for the objects in the three-dimensional preview. For example, chair 433 can swivel at a faster speed while performing the continuous scrub relative to the speed of the swivel animation during regular playback. The ability to scrub through the animation by selecting and/or holding down the scrubber affordance 444 may enable the user to control the speed of stepping through the animations, which provides a designer more flexibility to debug and analyze various aspects of the animation, such as transitions between portions of the animation, interactions between virtual objects, etc.

It should be understood that, in some embodiments, any and/or every virtual object may perform one or more actions in response to selection and/or continuous selection of the scrubber affordance 444, not solely the first virtual object 433, as discussed in the example above. In some embodiments, scrubbing of the actions associated with the one or more virtual objects of the three-dimensional preview 434 may also cause the corresponding two-dimensional representation of the content items (e.g., 464') displayed on the first electronic device (e.g., 460') to concurrently move in accordance with the scrubbing of the animations. For example, as the chair 433 is incrementally spun/swiveled (as shown in FIG. 4H) in response to selection of the affordance 444, the two-dimensional representation of the chair displayed on the first electronic device optionally concurrently spins/swivels within the content creation application (e.g., 462'). In some embodiments, the scrubbing is reflected in the preview, but not reflected in the content creation application. In some embodiments, the scrubber affordance 444 may alternatively be provided as a scrubber bar (not shown) for allowing the user to selectively navigate to a particular time marker or selectively view certain time intervals within the duration of the respective animation(s).

In some embodiments, user inputs interacting with the three-dimensional preview 434 can be represented within the three-dimensional environment to assist user interaction. For example, referring back to FIGS. 4D and 4F, selection inputs 450D or 450F, respectively, can represent input from a finger or pinching of fingers that can be presented using the second electronic device (e.g., displayed as circles, similar to 450 and 452). In some embodiments, the fingers/hands or representations thereof can be presented to the user instead of circles. In this way, the user can visually track finger movement and more accurately select and/or interact with various elements of the three-dimensional preview 434. Additionally, in some embodiments, a gaze of the user (e.g., the viewpoint associated with the second electronic device) can be represented within the three-dimensional environment to allow the user to accurately and precisely focus on one element within the three-dimensional preview 434. In some embodiments, the gaze can be represented in a similar manner as a cursor (e.g., a dot or other shape). In some embodiments, the user's gaze may be indicated by changing the appearance of a virtual object or affordance that currently has focus (e.g., brightening, highlighting, enlarging, etc. the object or affordance that has current focus from the user's eyes). In such some embodiments, the representation of fingers/hands and/or gaze may be displayed in some operating modes and hidden in other operating modes. In some such embodiments, an additional affordance may be provided that toggles whether to display and indication of a location of the user's fingertips and/or a gaze of the user's eyes within the three-dimensional environment 468.

FIGS. 4I-4L illustrate various example user interactions with and manipulations of the interactive tray 436 according to embodiments of the disclosure. As discussed herein above, the user may interact with and manipulate one or more of the virtual objects 432 displayed within the three-dimensional preview 434 to observe and gain feedback from various perspectives, sizes, and/or positions of the content items in three-dimensions. Attention is now directed toward various exemplary interactions with and manipulations of the tray 436 for providing the user with additional perspective regarding the appearance, form, and associated animations and/or related actions of the content items in three-dimensions.

FIG. 4I illustrates an example user interaction with the tray 436 of repositioning the tray 436 (and thereby repositioning the three-dimensional preview) within the three-dimensional environment 468 according to embodiments of the disclosure. In some embodiments, the tray 436 may be repositioned within the three-dimensional environment 468 using a direct or indirect manipulation of a handle affordance. For example, the user may desire to move the three-dimensional preview of the content items to a different position in the environment (e.g., to a different position on a desk, to a different surface within the user's real-world environment, etc.). In some embodiments, the tray 436 may include a handle 430, optionally disposed below the toolbar 430, as shown in the example of FIG. 4I. It should be understood that the handle 430 may be alternatively disposed at or in other areas. For example, above the toolbar 438, along a different edge of the tray 436, vertically to a side of the tray 436, atop the tray 436, etc. In some embodiments, an edge of toolbar 438 can behave as a handle affordance (e.g., selecting the toolbar 438 rather than affordances within toolbar 438).

In some embodiments, the user may provide a pinch input at or while targeting the handle 430 with gaze, as shown by pinch 450I, corresponding to a selection/gripping of the handle 430, as an example. Movement while maintaining the selection (e.g., while holding the pinch) can cause movement of the three-dimensional preview 434. In some embodiments, the appearance of the handle 430 may change when selected. For example, in response to the input corresponding to a selection/gripping of the handle 430, the handle 430 may become highlighted, as shown by highlight 476, indicating to the user that the tray may be moved. As shown in the example of FIG. 4I, while gripping/holding the handle 430, the user may reposition the tray 436 within the three-dimensional environment 468 to the right (e.g., relative to the position shown in FIG. 4C), as shown by dashed arrow 437 and as shown by the position relative to real-world plant 454' and shelf 456'. As shown, in some embodiments, the one or more virtual objects 432 and the toolbar 438 are moved with the tray 436 in accordance with the input moving the handle 430 to the right. Thus, the user may move the tray 436 and the remaining components of the preview within the three-dimensional environment 468 by selecting and moving the handle 430. In some embodiments, after the user is done moving the tray 436, and after the pinch input 450I is released (e.g., ceasing selection of the handle 430), the handle 430 may return to its original appearance prior to selection (e.g., cease to be highlighted). In some embodiments, the handle 430 may cease to be displayed within the three-dimensional environment after release of the pinch input 450I.

FIG. 4J illustrates an example user interaction with the tray 436 of rotating the tray 436 within the three-dimensional environment 468 according to embodiments of the disclosure. In some embodiments, the user can rotate the tray 436 to change a perspective of the one or more virtual objects 432. As shown in the example of FIG. 4J, in some embodiments, the tray 436 may comprise a user interface element, such as corner grip 458, disposed at a corner of the tray 436. In some embodiments, the corner grip 458 is optionally integrated with and always displayed with the tray 436. For example, rather than representing the tray with a contiguous shape, the tray outline can appear to have multiple segments, including one or more corner segments connected by one or more linear segments. In some embodiments, the tray is represented with a contiguous shape, but a corner segment can change its appearance to delineate the corner grip functionality. For example, in some embodiments, the corner grip 458 is optionally displayed in response to user input selecting or gripping a corner of the tray 436 (e.g., based on direct and/or indirect targeting/selection using eye gaze and/or fingers). For example, the corner segment can be highlighted, change color, and/or have a different effect applied while the corner grip 458 is targeted and/or selected. Although FIG. 4J shows one corner grip 458, it is understood that, in some embodiments, a corner grip is optionally available at more than one or at each corner of the tray 436. Including multiple corner grips can provide a user with more options to rotate the tray which can be useful because the relative orientation of the tray and the user may change based on movement of the tray or movement of the user within the real-world environment.

As mentioned above, the user may rotate the tray 436 to view an alternate perspective of the content including the first virtual object 433 and the second virtual object 435. In some embodiments, the user may directly select/grip the corner grip 458, as shown by pinch selection 450J in FIG. 4J or the user may indirectly select/grip the corner grip 458 using gaze to target the corner grip 458 and a pinch selection 450J. Alternatively, as mentioned above, the corner grip 458 may be displayed after receiving the pinch selection 450J and/or change its appearance in response to targeting and/or selection. For example, in response to selection of the corner grip 458, the corner grip 458 may become highlighted, as shown by highlight 476, indicating to the user that the tray 436 may be rotated. As shown in the example of FIG. 4J, while gripping/holding the corner grip 458, the user may rotate the tray 436 within the three-dimensional environment 468, as shown by arrow 437, by moving the hand/fingers relative to an initial position. In response to the input rotating the tray 436 within the three-dimensional environment 468, the one or more virtual objects 432 are optionally also rotated, as shown in FIG. 4J, such that the first virtual object 433 is displayed to the right of the second virtual object 435 according to the input rotating the tray 436 (e.g., showing approximately 180-degree rotation). As shown, in some embodiments, the toolbar 438 remains at its initial position despite the input rotating the tray 436. In such some embodiments, the toolbar 438 is optionally configured to face the user regardless of changes to the tray 436 or the one or more virtual objects 432, such that the user may always have access to the affordances 440. In some embodiments, after the user is done rotating the tray 436, and after the pinch input 450 is released (i.e., the user ceases selection of the corner grip 458), the corner grip 458 may cease to be highlighted and/or may cease to be displayed within the three-dimensional environment (e.g., the corners of the tray return to their original appearance).

Additionally or alternatively, in some embodiments, the second electronic device may rotate the tray 436 within the three-dimensional environment 468 in response to user input directed to a pivot point that is displayed with the tray 436. For example, as similarly described above with reference to FIG. 4F, the second electronic device displays a pivot point at a predefined location of the tray 436 in response to detecting a pinch selection and hold for a threshold period of time (e.g., without detecting movement or detecting less than a threshold movement of the hand of the user until the threshold period of time for the hold is satisfied) while the gaze of the user is directed toward the tray 436 in the three-dimensional environment 468. For example, the pivot point may be displayed at the location of the gaze on the tray 436, a predetermined location that is near the location of the gaze on the tray 436, the center point on the tray 436, and/or other location of the tray 436, as similarly described above. In some embodiments, the pivot point may be displayed in addition or alternatively to the corner grip 458 with the tray 436 when the second electronic device detects a pinch selection and hold while the gaze of the user is directed toward the tray 436.

In some embodiments, while the pivot point (e.g., similar to grip 458 in FIG. 4J) is displayed with the tray 436, the second electronic device may manipulate the tray 436 in response to user input. For example, while the pivot point is displayed on the tray 436 (e.g., at the center of the tray 436, at a location that is based on the gaze of the user, etc., as described above), the second electronic device rotates the tray 436 (e.g., and optionally the one or more virtual objects 432), as similarly shown in FIG. 4J, in response to lateral movement (e.g., leftward or rightward movement) of the hand of the user while the user is maintaining the pinch. In some embodiments, if the second electronic device detects movement of the hand of the user in a rightward direction while the hand is maintaining the pinch, the second electronic device may rotate the tray 436 counterclockwise about the pivot point in the three-dimensional environment 468 (e.g., the pivot point acts as the axis of rotation (a vertical axis of rotation normal to the tray)). For example, if the pivot point is displayed at the center of the tray 436, the second electronic device rotates the tray 436 (and optionally the one or more virtual objects 432) about the center of the tray 436, and if the pivot point is displayed at a corner of the tray 436, the second electronic device rotates the tray 436 (and optionally the one or more virtual objects 432) about the corner of the tray 436. Additionally, in some embodiments, if the second electronic device detects movement of the hand of the user leftward while the hand is maintaining the pinch, the second electronic device may rotate the tray 436 clockwise about the pivot point in the three-dimensional environment 468, as similarly shown in FIG. 4J. In some embodiments, an amount (e.g., in degrees) by which the tray 436 (and thus the one or more virtual objects 432) is rotated about the pivot point in the three-dimensional environment 468 is proportional to a magnitude of the lateral movement of the hand of the user relative to the pivot point. In some embodiments, a direction (e.g., clockwise or counterclockwise) in which the tray 436 (and thus the one or more virtual objects 432) is rotated about the pivot point in the three-dimensional environment 468 is based on a direction of the lateral movement of the hand of the user relative to the pivot point. Accordingly, as outlined above, providing a graphical pivot point on the tray 436 as a reference point by which the one or more virtual objects 432 may be rotated in response to user input simplifies the gesture needed to rotate the one or more virtual objects 432 in the three-dimensional environment 468 (e.g., by reducing the gesture from a two-handed gesture to a one-handed gesture). Additionally, providing the graphical pivot point on the tray 436 as a reference point simplifies the user interface objects provided for rotating the one or more virtual objects 432 because the graphical pivot point is optionally only displayed in response to detecting a pinch selection and hold input as discussed above.

In some embodiments, as similarly described above, in response to detecting a release of the pinch selection (e.g., such that the user is no longer gripping the pivot point), the second electronic device no longer displays the pivot point on the tray 436 (e.g., ceases display of the corner grip 458). For example, movement of the hand of the user laterally will not cause the second electronic device to rotate the tray 436 within the three-dimensional environment 468. In some embodiments, a pinch selection (e.g., without a hold) followed by movement of the hand of the user may cause the second electronic device to not display the pivot point on the tray 436 in the three-dimensional environment 468. In some embodiments, the pinch selection followed by movement of the hand may cause the second electronic device to move the tray 436 in the three-dimensional environment 468 in accordance with the movement of the hand (e.g., as similarly shown in FIG. 4I), rather than rotate the tray 436.

In some embodiments, the second electronic device may change an elevation of the one or more virtual objects 432 on the tray 436 in response to detecting movement of the hand of the user longitudinally in space (e.g., relative to the pivot point displayed on the tray 436). For example, as similarly shown in FIG. 4K, if the second electronic device detects movement of the hand of the user upward in space relative to the pivot point on the tray 436, the second electronic device may raise a plane on which the one or more virtual objects 432 are displayed atop the tray 436 (e.g., and thus raising the one or more virtual objects 432 in the three-dimensional environment 468). Similarly, if the second electronic device detects movement of the hand of the user downward in space relative to the pivot point on the tray 436, the second electronic device may lower the plane on which the one or more virtual objects 432 are displayed atop the tray 436 (e.g., and thus lowering the one or more virtual objects 432 in the three-dimensional environment 468), as similarly described below.

As mentioned herein, in some embodiments, some or all changes to the content in the three-dimensional preview are reflected in the two-dimensional representation in the content creation application, and some or all changes in the two-dimensional representation in the content creation application are reflected in the three-dimensional preview. In some embodiments, it may be desirable to decouple some changes. For example, the camera perspective of the content in the three-dimensional preview presented using the second electronic device may be decoupled from the camera perspective of the two-dimensional representation of the content on the first electronic device. For example, as mentioned herein, the user can change position in the physical environment, while wearing the second electronic device. For example, a user can "walk around" the three-dimensional preview to view the content from alternative perspectives and/or viewing angles. In such examples, although the perspective/view of the three-dimensional preview changes for a user of the second electronic device, the perspective/view of the two-dimensional representation of content does not change. Likewise, changing the perspective/viewing angle of the two-dimensional representation of content in the content application does not change the perspective/view of the three-dimensional preview. In a similar manner, in some embodiments, rotation of the tray 436 in the three-dimensional environment 46 does not change the perspective/view of the two-dimensional representation of content in the content creation application. Decoupling the perspectives/views between the content creation application and the three-dimensional preview can advantageously provide for easily and quickly viewing alternative perspectives of the content items in three dimensions using the second electronic device without interfering with the editing using the first electronic device.

It is understood that, in some embodiments, the camera perspective/view can be coupled partially or entirely such that changes to the perspective/view at one device can change the perspective/view at another device. For example, in a collaboration mode, a first user can be using the first electronic device (e.g., a desktop or laptop computer) and a second user can be using the second electronic device (e.g., a head-mounted display). In some embodiments, the view of the content on the first device can follow the camera perspective of the user of the second electronic device so that the two users can be viewing the same content from the same perspective. In some embodiments, a picture-in-picture presentation can be used to display the other second user's perspective of the content, but the primary view of the content in the content creation application on the first electronic device can be from a perspective/view that is decoupled from the perspective view of the content at the second electronic device.

FIG. 4K illustrates an example user interaction with the tray of elevating the contents of the preview above an initial position of the tray within the three-dimensional environment 468 according to embodiments of the disclosure. In some embodiments, the plane on which the content is presented can be elevated or lowered within the three-dimensional environment 468, such that the content including the one or more virtual objects 432 are optionally also elevated or lowered. Continuing the example of FIG. 4J, the user may desire to elevate the tray to gain feedback regarding the appearance, form, animations, and related actions, etc. of bottom portions of the one or more virtual objects 432 and/or to experience a placement of content offset with respect to an anchor point. In some embodiments, a user interface element represented by pod 445 may be provided at or near a side or corner of the tray in the three-dimensional environment 468. In some embodiments, pod 445 can be an initial representation of the third pill 494 prior to any offset. In some embodiments, pod 445 can have an alternative appearance (e.g., solid, dashed, dotted, outlined, wire-framed, or different shading). As shown in the example of FIG. 4K, the user may grip or select the pod 445 using direct or indirect selection (e.g., by providing a direct pinch input at the pod 445, as shown by pinch input 450K, or using gaze to target with an indirect pinch for selection) and movement while maintaining the selection as an input to raise or lower the content with respect to an initial position of the tray within the three-dimensional environment 468. In some embodiments, the pod 445 may become highlighted (not shown) in response to receiving the input selecting/gripping the pod 445.

As shown in FIG. 4K, the user may, raise the pod 445 to create a new plane (or offset tray) 436B with an offset within the three-dimensional environment 468 relative to the plane of tray 436A at the initial position. The movement of the pod 445 is indicated by dashed arrow 437. As shown in FIG. 4K, offset tray 436B and the content moves closer to the representations of the real-world plant 454' and shelf 456'. In some embodiments, the appearance of the offset tray 436B is the same as the appearance of tray 436A. In some embodiments, the offset tray 436B may have a different appearance than tray 436A. For example, the offset tray 436A may comprise different fill, outline, shading, line style, or other effects. As shown, the first virtual object 433 and the second virtual object 435 may be raised with the offset tray 436B within the three-dimensional environment 468, such that the user can view the virtual objects 433 and 435 from a bottom or near bottom view, which can be advantageous for easily and quickly analyzing the appearance, form, color, shading, etc. of the bottom portions of the one or more virtual objects or for viewing the appearance of objects that appear with an offset with respect to an anchoring point. As shown, the toolbar 438 may remain at its initial position connected to tray 436 (at the initial position of the tray, which can be advantageous for maintaining continuity of the location of the controls. In some embodiments, some or all of the affordances of toolbar 438 may be duplicated for offset tray 436B or moved entirely to a position in proximity to offset tray 436B.

In some embodiments, one or more user interface elements (e.g., pills) can be used to provide a user with context regarding relative position of the content within the three-dimensional preview environment. Each of the one or more pills can provide a relative position along one dimension. For example, a first pill 474, a second pill 484 and a third pill 494 can be used to provide relative position along an x-axis, y-axis and z-axis respectively. In some embodiments, the first pill can appear along a first edge of the tray (e.g., corresponding to the x-axis), the second pill can appear along a second edge of the tray (e.g., corresponding to the y-axis), and the third pill can appear at or within a threshold distance of a corner of the tray (e.g., corresponding to the z-axis). In some embodiments, the first pill 474 and/or the second pill 484 can appear at a midpoint (or within a threshold distance of the midpoint) between corners of the tray 436 along orthogonal sides of the tray 436.

In some embodiments, each of the pills is visible irrespective of the orientation of the tray or interaction with the tray. In some embodiments, some pills may be visible or hidden or have a different appearance depending on the orientation of the tray and/or interaction with the tray. For example, in some embodiments, the first pill 474 may be visible when the corresponding first axis of the plane is facing the user (or within a threshold of facing the user) and the second pill 484 may be hidden, whereas the first pill 474 may be hidden when the corresponding second axis of the plane is facing the user (or within a threshold of facing the user) and the second pill may be visible. In some examples, when viewing the tray 436 after rotation by a threshold amount, both the first and second pills can be visible. For example, when viewing the tray 436 after a 45-degree rotation (facing a corner of the tray), both the first and second pills are visible in some embodiments. In some embodiments, the first and second pills are visible during rotation of the tray described with reference to FIG. 4J. In some embodiments, appearance of the third pill 494 can be different when the tray is at an initial position than when the tray is offset from the initial position. For example, as described with reference to FIG. 4K, the content items of the preview can be elevated. In some examples, the third pill 494 may appear smaller in size and/or include no content or different content prior to a change in offset compared with the appearance of the third pill 494 during and/or after an elevation offset. Additionally or alternatively, the position of the third pill 494 can change due to an elevation offset. For example, the third pill 494 can appear at a midpoint (or within a threshold distance of the midpoint) between the initial position of the tray and the offset position.

Third pill 494 can include a text indication of the amount of displacement of the content within the tray 436 relative to the initial placement along the z-axis. The text indication within one or more pills can change as a user moves the content within the plane of the tray, as described in more detail with respect to FIGS. 4M-4P and/or by elevating the tray, as described above. For example, the first pill can include a label "x.xx" indicating an x-axis displacement, the second pill can include a label "y.yy" indicating a y-axis displacement, and the third pill 494 can include a label "z.zz" indicating a z-axis displacement within the three-dimensional environment with respect to a starting position. The labels can be advantageous in providing environmental awareness to a designer during the design process, in particular when the content of the preview is moved. In some embodiments, pills 474, 484 and 494 may indicate the displacement amount in any unit of measure, including unitless coordinates, for example. In some embodiments, the pills can have a different appearance depending on their relative position within the environment. For example, pills may have different styles of outline (e.g., solid, dashed, dotted, color, etc.), different fill (e.g., color, pattern, etc.) and/or different effects (e.g., shadow, glow, etc.). For example, the three pills may be represented with different colors to differentiate between the three pills irrespective of the orientation of the pills. In some embodiments, when a pill is occluded by a virtual object, the outline, fill or effects may be different than when the pill is not occluded. Additionally or alternatively, when a pill is occluded behind a virtual object, the outline, fill or effects may be different than when the pill is occluded within the volume of the virtual object. In some embodiments, the location and/or appearance of pills and the information displayed within the pills can be changed in a pill properties pane, which optionally appears as an overlay in the 3D environment 468 or may be displayed in a window in the content creation application (e.g., 462'), for example (e.g., optionally when the pill is selected).

In some embodiments, the location and/or appearance of third pill 494 and/or the information it displays can be changed in a pill properties pane that may appear as an overlay in the 3D environment 468 or may be displayed in a window in the content creation application (e.g., 462'), for example. In some embodiments, pill 494 is integrated with pod 445 rather than displayed as a separate user interface element.

FIG. 4L illustrates an example user interaction with the tray 436 expanding a size of the tray 436 within the three-dimensional environment 468 according to embodiments of the disclosure. As mentioned herein, the one or more virtual objects 432 are optionally displayed atop and centrally to the tray 436 (e.g., initially and/or in response to resetting the view). In other words, display of the one or more virtual objects 432 and movement or expansion of the one or more virtual objects may initially be limited by the dimensions of the tray 436 in the three-dimensional environment. In some embodiments, the tray 436 can be resized (e.g., increasing or decreasing area), such that dimensions of the tray 436 within the three-dimensional environment 468 are resized. In some embodiments, resizing the tray 436 changes the size of the tray while maintaining the size of the one or more virtual objects 432.

As an example, the user may desire to expand the size of the tray 436 to provide additional space within the environment for interacting and/or viewing the one or more virtual objects 432 within the three-dimensional environment 468. In some embodiments, as shown as an example in FIG. 4L, the user may select or grip two (e.g., opposite) corners 424A and 424B of the tray 436, by providing finger pinch input at the two corners 424A and 424B, as shown by pinches 450 and 452. In response to receiving the pinch inputs 450 and 452, the corners 424A and 424B optionally each become highlighted, as shown by highlights 467 and 469, respectively, indicating that the user may move opposite sides of the tray in opposite directions to expand the tray 436. As shown, while gripping the corners 424A and 424B, the user may move the tray 436 in opposite directions by moving the two hands apart, as shown by dashed arrows 437 and 439, such that the size of the tray is expanded. The amount of change in size is a function (e.g., linear or nonlinear) of the change in distance between the two hands while selection is maintained. In some embodiments, as the tray 436 is expanded within the three-dimensional environment 468, the one or more virtual objects 432 optionally remain unchanged in size and remain centrally disposed atop the tray 436. Additionally, in some embodiments, the toolbar 438 retains its relative position relative to the edge facing the user within the three-dimensional environment 468. In some embodiments, the center of the tray remains the same before and after the change in dimensions of the tray. In some embodiments, the dimensions increase evenly along each dimension. In some embodiments, the dimensions increase based on the direction of the movement of the input. For example, x-axis movement causes a change in the x-axis dimensions, y-axis movement causes a change in the y-dimensions, and diagonal movement cause a change in both the x-axis and y-axis dimensions.

Attention is now directed towards various examples illustrating movement of the one or more virtual objects 432 atop the tray 436 within the three-dimensional environment 468. FIGS. 4M-4P illustrate various example user interactions with one or more virtual objects 432 of moving the one or more virtual objects 432 along a surface of the tray 436 according to embodiments of the disclosure. FIG. 4M illustrates an example user interaction with the tray 436 initiating movement of the one or more virtual objects 432 on the tray 436 according to embodiments of the disclosure.

In some embodiments, the tray 436 may comprise a plurality of gridlines 431 disposed across the surface of the tray 436, as shown in the example of FIG. 4M. The gridlines may be included along one axis (e.g., the axis the user is facing), as shown in FIG. 4M or along two axes. In some embodiments, the plurality of gridlines 431 may also be selectable user interface elements, such that one or more virtual objects 432 atop the tray 436 may be moved according to a movement of the plurality of gridlines 431, for example. As an example, the user may desire to move the one or more virtual objects 432 to the left across the surface of the tray 436. As shown in the example of FIG. 4M, the user may gaze toward and select/grip a first gridline 431A, by using a pinch input, for example, as shown by pinch 450M, to initiate movement of the one or more virtual objects 432 across the tray 436. In some embodiments, in response to the selection of the first gridline 431A, a portion of (or all of) the first gridline 431A optionally becomes highlighted, which optionally corresponds to a portion at which the pinch input was received, as shown by highlight 437. While selecting/gripping the portion of the first gridline 431A, in some embodiments, the user may move the plurality of gridlines 431 laterally across the surface of the tray 436, which optionally causes corresponding movement of the first virtual object 433 and the second virtual object 435 across the top surface in accordance with the movement of the plurality of gridlines 431, as discussed in more detail below. In some examples, a similar user input (e.g., movement while pinching) can be used but by targeting or selecting the plane of the tray (e.g., optionally an area without content). For example, even looking at and/or pinching areas of the plane of tray 436 without a gridline can cause movement of the content.

FIG. 4N illustrates an example user interaction with the tray 436 of moving one or more virtual objects 432 across a surface of the tray 436 according to embodiments of the disclosure. As mentioned above, the user may, while selecting/gripping a first gridline (e.g., 431A) of the plurality of gridlines 431 disposed across the top surface of the tray 436, move the first gridline laterally to concurrently move the one or more virtual objects 432 across the surface of the tray 436, as an example (or alternatively selecting and moving the surface of tray 436 to move the one or more virtual objects). In some embodiments, continuing the example of FIG. 4M, the user may continuously move the first gridline across the top of the tray 436, as shown by dashed arrow 437, such that the first gridline appears to be dragged off the surface of the tray 436. As shown in the example of FIG. 4N, dragging the first gridline off the surface of the tray 436 may also drag the second virtual object 435 off the top surface of the tray 436, as represented by the change of appearance (e.g., shading 471) of the second virtual object. It is understood that the second virtual object 435, when moved off the tray 436 as shown in FIG. 4N, is optionally no longer visible to the user. Alternatively, in some embodiments, the appearance of the second virtual object 435 is optionally altered to indicate to the user that the virtual object is moved off the tray 436 (e.g., presented in different color shading, in dashed line, slightly transparent, etc.), such that the second virtual object 435 remains at least partially visible.

As shown in the example of FIG. 4N, in some embodiments, the tray 436 and/or toolbar 438 remain stationary within the three-dimensional environment 468 when the user moves the contents of the tray across the surface of the tray 436.

FIG. 4O illustrates an example user interaction with the tray 436 of moving one or more virtual objects 432 off a top of the tray 436 according to embodiments of the disclosure. As discussed above, the user may continue to move the one or more virtual objects 432 laterally across the surface of the tray 436 as described above. In some embodiments, as discussed below, the tray 436 may be configured to provide visual indications to the user that the one or more virtual objects 432 have been moved off the tray 436 within the three-dimensional environment 468.

Continuing the example of FIG. 4N, the user may continue moving the first gridline (e.g., 431A) leftward, such that the first virtual object 433 and the second virtual object 435 are moved off the top of the tray 436 and are optionally no longer visible to the user, as represented in FIG. 4O by shading 473 and 471, respectively. As shown, in some embodiments, a portion of a boundary of the tray 436 may change appearance (e.g., become highlighted, glowed, brightened, etc.), as represented by glow 441, wherein the portion of the boundary that changes appearance optionally corresponds to the location of the one or more virtual objects 432 outside the boundary of the tray 436 (e.g., when being moved off the tray 436 or after being moved off of the tray). For example, as shown in FIG. 4O, the off-tray content is disposed in the lower half of along the y-axis, and therefore the lower half of the boundary of the tray changes appearance. In some embodiments, the length of the boundary that changes appearance can be computed based on a lines from the content from the content that are orthogonal to the boundary that indicate the extent of off-tray content along the axis of the corresponding boundary.

Additionally or alternatively, in some embodiments, the change of appearance may manifest in a similar or different manner above the boundary. In some embodiments, an area above the boundary can provide an indication of off-tray content. For example, FIG. 4O illustrates a plurality of vertical indicators 443 may be presented along the highlighted portion 441 of the boundary of the tray 436, wherein the plurality of vertical indicators 443 may also have a different appearance (e.g., be highlighted, glowed, brightened, etc.). In some embodiments, rather than vertical indicators, the entire area may show a change of appearance indicating the presence of off-tray content. In some embodiments, the height of the vertical indicators or other projection of effect above the boundary that indicates the presence of off-tray content may have a height characteristic that corresponds to the height of the offscreen content. In some embodiments, one vertical indicator may be presented for each off-tray virtual object. In some embodiments, multiple (e.g., two, three, four, etc.) vertical indicators may be presented for each off-tray virtual object, and optionally more vertical traces are presented for wider objects. In some embodiments, a location of one or more respective vertical indicators (e.g., along a y-axis within the three-dimensional environment 468) are optionally located along the y-axis at a location corresponding to a center of a respective virtual object (e.g., a line from the center of the object to the vertical indicator is orthogonal to the boundary).

As illustrated in the example of FIG. 4O, the highlighted portion of the boundary 441 and/or the plurality of vertical indicators 443, individually and in combination, may notify the user of the existence of and/or the approximate location of the one or more of the off-tray virtual objects presented on the tray 436 have been moved off the tray 436, which may be advantageous for when a user unintentionally or intentionally moves one or more virtual objects off the tray.

As described herein, in some embodiments, the highlighted portion of the boundary 441 and the plurality of vertical indicators 443 may be presented in response to any movement or manipulation that causes one or more virtual objects to be moved or to be at least partially moved off the tray 436. In some embodiments, portions of a boundary of the tray 436 may become highlighted and a plurality of vertical indicators 443 may be presented in response to an enlarging of the size of one or more virtual objects that causes at least a portion of the one or more virtual objects to cross the portions of the boundary of the tray 436. In some embodiments, portions of a boundary of the tray 436 may become highlighted and a plurality of vertical indicators 443 may be presented in response to a decreasing of the size of the tray that causes at least a portion of one or more virtual objects to cross the boundary of the tray 436.

FIG. 4P illustrates an example user interaction of moving one or more virtual objects from off the tray back onto the tray according to embodiments of the disclosure. As discussed above, the one or more virtual objects 432 may be moved across the surface of the tray 436, including being moved off the tray 436, such that the one or more virtual objects are optionally no longer visible. Continuing the example of FIG. 4O, the one or more virtual objects may be moved from off the tray 436 back onto the tray 436 (e.g., by selecting and moving one of the plurality of gridlines 431 or selecting and moving the surface of the tray). For example, as shown in FIG. 4P, the user may gaze at and select a respective gridline 431B of the plurality of gridlines 431 (or at the surface generally), as shown by pinch input 450P, and while selecting/holding the respective gridline 431B (or the surface generally), move the respective gridline 431B (and the surface generally) rightward, as shown by dashed arrow 439, to cause the one or more virtual objects 432 to be traversed from off the tray 436 back onto the tray 436. As shown in the example of FIG. 4P, in some embodiments, once the first virtual object 433 and the second virtual object 435 are moved completely back onto the tray 436, the portion of the boundary (e.g., 441 in FIG. 4O) of the tray 436 may cease being highlighted and/or the plurality of vertical indicators (e.g., 443) may cease being presented.

Additionally or alternatively, the user may restore a positioning of the one or more virtual objects atop the tray 436 by selecting the reset affordance from the toolbar 438 (e.g., affordance 440 in FIG. 4G). It should be understood that although the above descriptions refer to leftward and rightward movements of the one or more virtual objects 432 across the top of the tray 436, the one or more virtual objects may also be traversed forward and backward along the top of the tray 436 using the plurality of gridlines 431), with similar changes of appearance available for the boundary and/or above the boundary where content moves off-tray. Additionally or alternatively, content can be moved outside the boundaries of the preview in the three-dimensional environment (e.g., the content exceed an upper or lower boundary). In some such embodiments, an indication of the off-tray content can be provided by changing an appearance of the preview (e.g., providing a lighting effect near the top of the preview when there is content outside the upper boundary of the preview in the z-axis.

FIG. 4Q illustrates an example user interaction with one or more virtual objects 432 of scaling the one or more virtual objects 432 to a full-size rendering according to embodiments of the disclosure. As discussed herein, the one or more virtual objects 432 may initially be presented in the three-dimensional preview at a size that allows for display within the boundaries of the tray 436. The size of the virtual objects may be manually scaled up or down in size (e.g., by pinching and expanding/contracting index finger and thumb or within the content creation application) to enable a user to view the one or more virtual objects 432 at various sizes according to user input. In some embodiments, the one or more virtual objects can be scaled to full scale (e.g., 1:1 ratio of the displayed size of the virtual objects within the preview to match to actual size of the virtual objects in implementation within a three-dimensional environment).

As shown in the example of FIG. 4Q, the user may select a fourth affordance ("fourth affordance," "scale affordance," "full scale affordance") 446 from the toolbar 438, as shown by selection 450 (e.g., direct or indirect actuation of the affordance). In response to selection of the fourth affordance 446, in some embodiments, the one or more virtual objects 432 may be scaled on the tray 436, such that the size of the first virtual object 433 and the size of the second virtual object 435 are each presented in full scale. For example, if a chair is encoded within the content creation application (e.g., 462) at the first electronic device (e.g., 460) to have a height of one meter in implementation (e.g., corresponding to a one-meter tall chair in the real-world), the virtual object 433 representing the chair is optionally displayed on the tray 436 at a height of one meter within the three-dimensional environment 468. Selection of the fourth affordance 446 allows the user to view the one or more virtual objects 432 at full scale, not only to enlarge the first virtual object 433 and the second virtual object 435 to observe surface details such as color, texture, etc., but advantageously, also to analyze the sizes of the first virtual object 433 and the second virtual object 435 relative to sizes of real-world objects in a respective real-world environment.

FIG. 4R illustrates an example user interaction with the three-dimensional preview 434 of activating an immersive mode according to embodiments of the disclosure. In some embodiments, an immersive mode ("immersive mode," "third mode," "third mode of operation") may be activated, such that the one or more virtual objects 432 are optionally displayed at full scale within the three-dimensional environment 468 without constraints of the tray 436. As an example, the user may desire to view the one or more virtual objects 432 in full scale with respect to the real-world environment (e.g., within the user's office) or with respect to a virtual environment. As discussed below, in the immersive mode, the second electronic device may generate full-scale representations in the three-dimensional environment optionally partially or fully occluding a background of the three-dimensional environment 468.

As shown in the example of FIG. 4R, the user may select a fifth affordance ("fifth affordance," "immersive mode affordance") 448 from the toolbar 438, as shown by selection 450. In response to selection of the fifth affordance 448, in some embodiments, a full-scale representation of the virtual objects 432 may be generated and presented within the three-dimensional environment 468. In some embodiments, portions of the three-dimensional environment 468 may be selectively occluded (e.g., darkened, faded, etc.) when the immersive mode is activated. For example, as shown in FIG. 4R, the representations of the real-world plant 454' and shelf 456' may be occluded (i.e., cease being displayed) within the three-dimensional environment 468. The representations of the first electronic device 460', the one or more input devices 466', the content creation application 462' and/or the content items 464' may continue being displayed at the second electronic device without being occluded.

In some embodiments, the full-scale representations of the virtual objects may be presented within the portions of the three-dimensional environment 468 in which the representations of the real-world plant 454' and shelf 456' (at least partially) were presented. In some embodiments, as shown, the one or more virtual objects 432 may concurrently be displayed on the tray 436 within the three-dimensional preview 434 while the full-scale representation of the first virtual object 433" and the full-scale representation of the second virtual object 435" is displayed (e.g., the immersive representation of the content is concurrently displayed behind or adjacent to the three-dimensional preview 434). In this way, while the second electronic device operates according to the immersive mode, the user may concurrently view the full-scale representations of the first virtual object 433" and the second virtual object 435", the one or more virtual objects 432 within the three-dimensional preview 434, the representations of the first electronic device 460' (including content creation application 462' and content items 464') and the one or more input devices 466'. Concurrently displaying the immersive representation of the content and the three-dimensional preview 434 provides the user with the ability to interact with and manipulate the one or more virtual objects 432 and/or the tray 436 in any of the above-described ways (e.g., size adjustments, movement, etc.) while maintaining display of the full-scale representations 433" and 435" (as well as the representations of the first electronic device 460' and including the content creation application 462' and including content items 464') and including input devices 466'.

Additionally or alternatively, in some embodiments, the representations of the first electronic device 460' (including the content creation application 462' and content items 464') and/or the three-dimensional preview 434 (including the one or more virtual objects 432 and tray 436) may be occluded to provide a clearer, more focused view of the full scale representations of the first virtual object 433" and the second virtual object 435" in the three-dimensional environment 468 (e.g., occluding more of the three-dimensional space to provide for the full-scale representation of the content). In some embodiments, the user may select the fourth affordance 448 a second time to exit the immersive mode and cease display of the full scale representations of the first virtual object 433" and the second virtual object 435" and restore display of the representations of the occluded portions of the real-world environment (e.g., plant 454' and shelf 456') and/or other portions of the three-dimensional environment 468. Additionally or alternatively, in some embodiments, the user may select the reset affordance (e.g., 440 in FIG. 4G) to exit the immersive mode and restore original display of the one or more virtual objects 432 and the original representations of the occluded portions of the three-dimensional environment (e.g., the plant 454', electronic device 460', etc.).

FIG. 4S illustrates an example user interaction with the three-dimensional preview 434 of changing a perspective of the three-dimensional environment and of the preview using the second electronic device according to embodiments of the disclosure. As discussed herein, in some embodiments, a change to a viewpoint associated with the second electronic device can be received at the second electronic device as an input corresponding to an interaction with the three-dimensional preview 434, as discussed below.

As an example, the user may desire to view the one or more virtual objects 432 from an alternate perspective. Rather than rotating the tray as described with reference to FIG. 4J to change the perspective or viewing angle, the user may change the viewpoint (e.g., the perspective of the three-dimensional environment 468) associated with the second electronic device by moving the second electronic device with respect to the three-dimensional environment 468 (e.g., while wearing the second electronic device). For example, FIG. 4S illustrates an updated view of the three-dimensional environment corresponding to a user wearing the second electronic device and moving to the left to a respective location within the real-world environment (and/or turning the head rightward) and viewing the three-dimensional environment 468 from the respective location. In some embodiments, the preview 434 (including the tray 436 and the one or more virtual objects 432), the representations of the plant 454' and the shelf 456', and the representations of the first electronic device 460' (including the one or more input devices 466') and the content creation application 462' (including the representation of the content items 464') may remain unchanged (e.g., fixed) within the three-dimensional environment 468. Accordingly, due to the new position of the second electronic device with respect to the three-dimensional environment, the user is presented with a new perspective shown in the example of FIG. 4S. From the new perspective, the user sees the preview (e.g., the tray 436 and the one or more virtual objects 432) from a different perspective, the representations of the plant 454' and the shelf 456' from the different perspective, and the representations of the first electronic device 460' (including the content creation application 462') and the input devices from the different perspective. For example, a front view of the one or more virtual objects 432 may be viewable from the user's new perspective at the respective location.

As outlined above, the user may move about the three-dimensional preview 434 to view the first virtual object 433 and the second virtual object 435 from alternate perspectives. In some embodiments, as shown, in response to changing the viewpoint associated with the second electronic device, a position of the toolbar 438 may change within the three-dimensional environment 468 to follow the perspective of the user. For example, as shown, the toolbar 438 may move to face toward the user, while a respective position and/or orientation of each of the remaining objects within the three-dimensional environment 468 may appear angled because their position remains unchanged. Having toolbar 438 follow the user allows the affordances 440 to be viewable and readily accessible (e.g., selectable) by the user. In this way, as the user changes position within the three-dimensional environment 468 to view the one or more virtual objects 432 from alternate perspectives, the user may advantageously be provided with easy access to the toolbar 438, and thus, with easy access to each of the modes and/or functionalities associated with the affordances 440, providing for an efficient and improved workflow.

It is understood that the embodiments shown and described herein are merely exemplary and that additional and/or alternative elements may be provided within the three-dimensional environment and/or within the three-dimensional preview. It should be understood that the appearance, shape, form, and size of each of the various user interface elements shown and described herein are exemplary and that alternative appearances, shapes, forms and/or sizes may be provided. For example, the interactive tray 436 may be provided in an alternative shape than a rectangular shape, such as a circular shape, triangular shape, oval shape, etc. In some embodiments, for example, the affordances (e.g., 340) may each be provided with a unique shape and appearance to visually convey the functionality of a respective affordance to the user (e.g., a "play" button for activating the play mode and a "pause" button for pausing/stopping the play mode. Additionally, for example, the affordance may each be provided with text (e.g., disposed within, above, or below the affordance) for visually conveying the functionality of a respective affordance to the user (e.g., "play" label disposed below the first affordance and "1:1" label disposed below the fourth affordance). Additionally, in some embodiments, the affordances may be selected vocally via user vocal commands (e.g., "activate play mode" vocal command). Additionally, in some embodiments, the affordances may be provided integrally to a front portion of the tray or disposed within a vertical toolbar disposed to a side of the tray 436, rather than in a horizontal toolbar below the tray, as shown and described.

In some embodiments, the concurrent display of the content items in two-dimensions on the first electronic device and in three-dimensions using the second electronic device may provide for a multi-user experience. For example, a first user may operate a first electronic device (e.g., a desktop computer) including a content creation application and a second user may operate a second electronic device (e.g., a head mounted display) including at least a 3D graphic rendering application, in accordance with some embodiments described herein. As discussed above, the content creation application may include content items comprising one or more virtual objects (e.g., 433 and 435) displayed as a two-dimensional representation on the first electronic device. The 3D graphic rendering application may be configured to display a preview of the content items in three-dimensions within a three-dimensional environment (e.g., 468) on the second electronic device. Thus, the first user may view the two-dimensional representation of the content items on the first electronic device, and the second user may concurrently view the three-dimensional preview of the content items on the second electronic device (as well as view the two-dimensional representation of the content items on the first electronic device). The first and the second users may then collaboratively view, select, modify, and update the content items by individually operating the first and/or the second electronic devices, respectively. As outlined above, edits or modifications made to the content items on the first electronic device can cause the corresponding three-dimensional representations of the content items at the second electronic device to be updated in accordance with the edits or modifications. The second user may thus actively interact with and manipulate the one or more virtual objects of the three-dimensional preview while the first user edits or modifies the code associated with the corresponding two-dimensional content items at the first electronic device to collaboratively modify and eventually finalize the appearance and form of the content items. Thus, another advantage is that concurrent display of the content items in two-dimensions on a first electronic device and content items in three-dimensions on a second electronic device can provide for efficient and more succinct user collaboration between a first user operating the first electronic device and a second user operating the second electronic device.

Figure 5A:
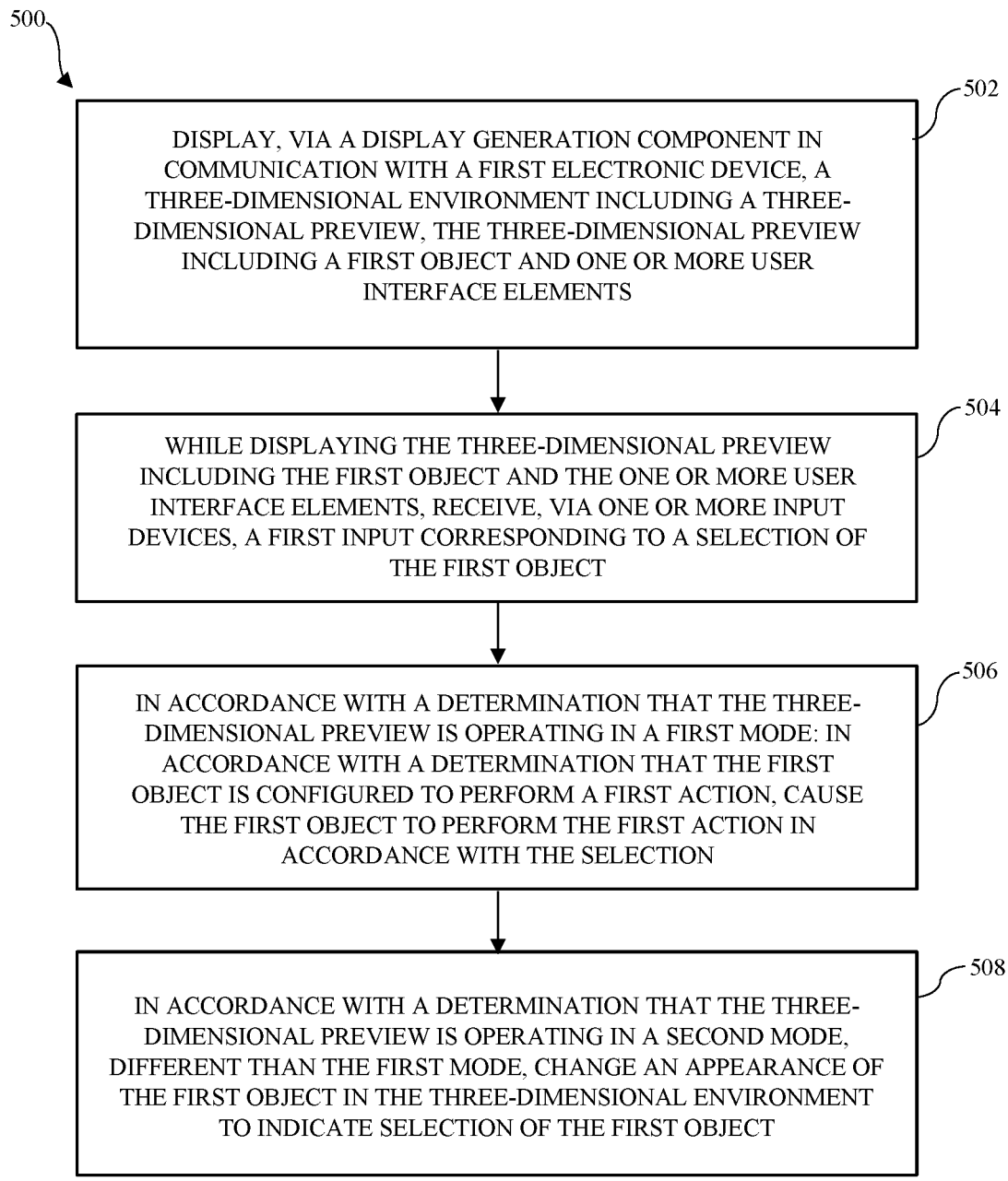
FIGS. 5A-5B illustrate a flow diagram illustrating a process for virtual object manipulation according to embodiments of the disclosure.
Figure 5B:
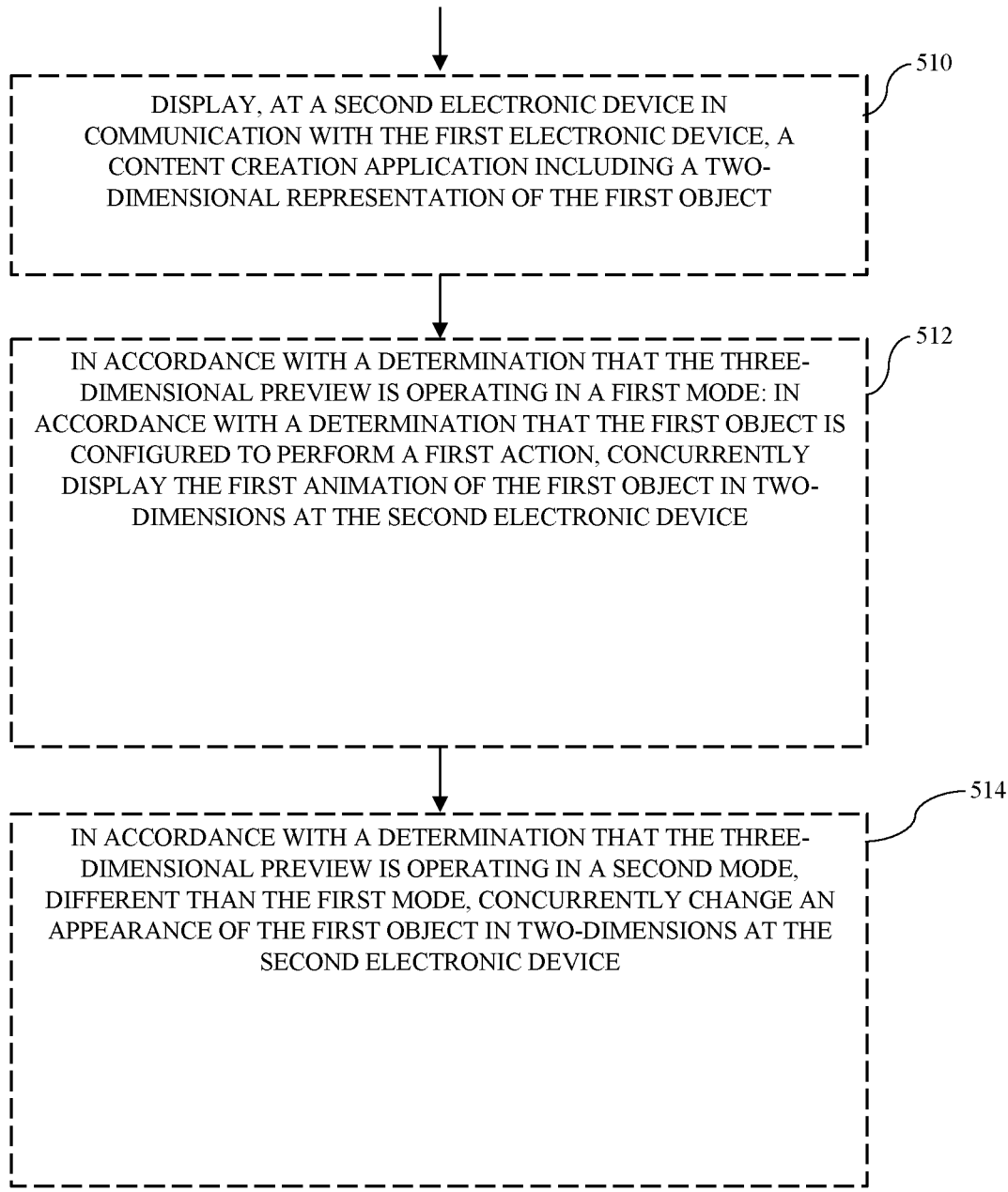

FIGS. 5A-5B illustrate a flow diagram illustrating a process 500 for interaction with a three-dimensional preview according to embodiments of the disclosure. For example, the interaction can include a selection input of a virtual object presented in the three-dimensional preview. Process 500 begins, at a first electronic device (e.g., a head-mounted display), with the display of a three-dimensional environment including a three-dimensional preview. The three-dimensional preview can include a first object and one or more user interface elements, as shown at 502. In some embodiments, the first electronic device may be in communication with a display generation component (e.g., a display) and one or more input devices (e.g., hand tracking sensor, eye tracking sensors, image sensors, etc.). In some embodiments, at 504, while displaying the three-dimensional environment including the first object and the one or more user interface elements, a first input can be received, via the one or more input devices, corresponding to a selection of the first object. The first input optionally corresponds to a selection input (e.g., a touch or tap input) received by one or more hand tracking sensors. In some embodiments, the first input can be received from execution of code in a content creation application.

In some embodiments, the three-dimensional preview is optionally operating according to a mode. In some embodiments, a first mode optionally refers to a live animation mode (play mode), a second mode optionally corresponds to a selection mode (editing mode), and a third mode optionally corresponds to an immersive mode. As shown in FIG. 5A, in some embodiments, at 506, in accordance with a determination that the three-dimensional preview is operating in a first mode, the first object performs a first action in accordance with the selection input (e.g., assuming that the first object is configured to perform the first action in response to a selection input). In some embodiments, the first action is performed in response to receiving the first input corresponding to the selection of the first object. The first action optionally corresponds to an animation, which can include movement of the first object, audio emission, lighting changes, etc.

In some embodiments, at 508, in accordance with a determination that the three-dimensional preview is operating in a second mode, different than the first mode, the appearance of the first object is changed (e.g., highlighted) in the three-dimensional environment. Changing the appearance (e.g., highlighting) of the first object in the three-dimensional environment optionally enables editing of the first object (e.g., editing of an appearance, form, respective position, etc. of the first object within the three-dimensional environment).

Continuing the flow diagram, as shown in FIG. 5B, in some embodiments, at 520, the first electronic device may be in communication with a second electronic device (e.g., a desktop computer, laptop computer, tablet computer, mobile device, etc.). In some embodiments, the second electronic device displays a content creation application including a two-dimensional representation of the first object. The content creation application and the two-dimensional representation of the first object may be displayed on the second electronic device while the three-dimensional environment including the first object with the one or more user interface elements is optionally concurrently displayed at the first electronic device (e.g., the head mounted display). At 512, in accordance with the determination that the three-dimensional preview is operating in the first mode, in accordance with the determination that the first object is configured to perform the first action, the second electronic device concurrently displays the first animation of the two-dimensional representation of the first object at the second electronic device (e.g., a spinning/swivel motion). Thus, in some embodiments, the same animation may be performed concurrently by both the first object in the three-dimensional environment and the two-dimensional representation of the first object in response to receiving the first input.

At 514, in some embodiments, in accordance with a determination that the three-dimensional preview is operating in the second mode, the appearance of the two-dimensional representation of the first object displayed at the second electronic device changes to indicate the selection of the first object. In some embodiments, in response to the first input, the first object in the three-dimensional environment and/or the two-dimensional representation of the first object are highlighted. In some embodiments, the three-dimensional representation of the first object and the two-dimensional representation of the first object may concurrently change appearance (e.g., be highlighted) in response to receiving the first input, for example.

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some embodiments of the disclosure are directed to a method of presenting and/or manipulating three-dimensional preview of content. The method can comprise: at a first electronic device in communication with a display and one or more input devices: displaying, via the display generation component, a three-dimensional environment including a three-dimensional preview. The three-dimensional preview can include: a first object; and one or more user interface elements. The method can further comprise: while displaying the three-dimensional preview including the first object and the one or more user interface elements, receiving, via the one or more input devices, a first input corresponding to a selection of the first object; in accordance with a determination that the three-dimensional preview is operating in a first mode, causing the first object to perform a first action in accordance with a determination that the first object is configured to perform the first action in accordance with the selection; and in accordance with a determination that the three-dimensional preview is operating in a second mode, different than the first mode, changing an appearance of the first object in the three-dimensional preview to indicate the selection of the first object.

Additionally or alternatively, in some embodiments, the first electronic device may be in further communication with a second electronic device; and the second electronic device may be configured to display a content creation application including a two-dimensional representation of the first object. Additionally or alternatively, in some embodiments, the second electronic device may be a laptop computer, a desktop computer, or a tablet computer.

Additionally or alternatively, in some embodiments, causing the first object to perform the first action can comprise: presenting a first animation of the first object in the three-dimensional environment; and in accordance with the determination that the three-dimensional preview is operating in the first mode, in accordance with the determination that the first object is configured to perform the first action, concurrently displaying the first animation of the two-dimensional representation of the first object at the second electronic device.

Additionally or alternatively, in some embodiments, the method can further comprise in accordance with a determination that the three-dimensional preview is operating in the second mode, changing the appearance of the two-dimensional representation of the first object displayed at the second electronic device to indicate the selection of the first object.

Additionally or alternatively, in some embodiments, changing the appearance of the first object in the three-dimensional environment can comprise highlighting the first object in the three-dimensional environment; and changing the appearance of the two-dimensional representation of the first object displayed at the second electronic device can comprise highlighting the two-dimensional representation of the first object displayed at the second electronic device.

Additionally or alternatively, in some embodiments, the method can further comprise: while concurrently highlighting the first object in the three-dimensional environment and the two-dimensional representation of the first object displayed at the second electronic device, receiving a second input at the second electronic device; and in accordance with the second input, updating a characteristic of the two-dimensional representation of the first object displayed at the second electronic device and updating the characteristic of the first object in the three-dimensional environment displayed at the first electronic device.

Additionally or alternatively, in some embodiments, the first electronic device may be a head-mounted display device.

Additionally or alternatively, in some embodiments, the three-dimensional preview may include a tray and the first object may be disposed on a surface on the tray.

Additionally or alternatively, in some embodiments, the one or more user interface elements may be displayed within a tool bar associated with the tray.

Additionally or alternatively, in some embodiments, the method can further comprise capturing, via the one or more input devices, at least portions of a real-world environment including the second electronic device and the content creation application displayed on the second electronic device. The three-dimensional environment can further include: a representation of the captured portions of the real-world environment including: a representation of the second electronic device; and a representation of the content creation application.

Additionally or alternatively, in some embodiments, the one or more user interface elements can comprise: a first user interface element that is selectable to cause the three-dimensional preview to operate in the first mode; a second user interface element that is selectable to cause the three-dimensional preview to cease operating in the first mode and to operate in the second mode; a third user interface element that is selectable to scale the first object from a first size to a second size, larger than the first size; a fourth user interface element that is selectable to cause the first object to scrub through the first action; and/or a fifth user interface element that is selectable to cause display of a full-scale representation of the first object.

Additionally or alternatively, in some embodiments, displaying the full-scale representation can comprise occluding at least portions of the three-dimensional environment and displaying the full-scale representation of the first object over the occluded portions of the three-dimensional environment.

Additionally or alternatively, in some embodiments, displaying the full-scale representation can comprise concurrently displaying in the three-dimensional environment: the representation of the three-dimensional preview; and the representation of the second electronic device including the representation of the content creation application and the two-dimensional representation of the first object.

Additionally or alternatively, in some embodiments, the method can further comprise: receiving, via the one or more input devices, a second input; in accordance with a determination that the second input corresponds to a request to move the three-dimensional preview, moving the three-dimensional preview within the three-dimensional environment in accordance with the second input; in accordance with a determination that the second input corresponds to a request to change a size of the tray, changing the size of the tray from a first size to a second size, different from the first size in accordance with the second input; in accordance with a determination that the second input corresponds to a request to rotate the tray and the first object disposed on the surface of the tray within the three-dimensional environment in accordance with the second input; and in accordance with a determination that the second input corresponds to a request to elevate the tray, moving the first object from a first height to a second height, offset from the initial position of the tray within the three-dimensional environment in accordance with the second input.

Additionally or alternatively, in some embodiments, the determination that the second input corresponds to the request to rotate the tray is in accordance with a determination that the second input includes: an interaction input provided by a predetermined portion of a user of the first electronic device for at least a threshold amount of time while a gaze of the user is directed toward the tray, wherein a representation of a pivot point is displayed at a respective location on the tray in response to detecting the interaction input; and movement of the predetermined portion of the user of the first electronic device in a respective direction relative to the representation of the pivot point on the tray while maintaining the interaction input. In some embodiments, rotating the tray and the first object disposed on the surface of the tray within the three-dimensional environment in accordance with the second input includes rotation of the tray and the first object disposed on the surface of the tray about an axis through the pivot point.

Additionally or alternatively, in some embodiments, the method can further comprise ceasing displaying the representation of the pivot point on the tray in response to a release of the interaction input provided by the predetermined portion of the user.

Additionally or alternatively, in some embodiments, the method can further comprise: receiving, via the one or more input devices, a second input corresponding to a request to manipulate the first object in the three-dimensional environment; in accordance with a determination that the third input corresponds to a request to change a size of the first object, changing the size of the first object from a first size to a second size, different than the first size in accordance with the third input; and in accordance with a determination that the third input corresponds to a request to reposition the first object on the tray, moving the first object from a first location to a second location, different than the first location, on the tray in accordance with the third input.

Additionally or alternatively, in some embodiments, the determination that the second input corresponds to the request to change the size of the first object is in accordance with a determination that the second input includes an interaction input provided by a predetermined portion of a user of the first electronic device for at least a threshold amount of time while a gaze of the user is directed toward the tray, wherein a representation of a pivot point is displayed at a respective location on the tray in response to detecting the interaction input. In some embodiments, movement of the predetermined portion of the user of the first electronic device in a respective direction relative to the representation of the pivot point on the tray. In some embodiments, changing the size of the tray from the first size to the second size, different from the first size in accordance with the second input is based on the amount of the movement of the predetermined portion of the user of the first electronic device.

Additionally or alternatively, in some embodiments, the method can further comprise in accordance with a determination that the second input corresponds to a request to reposition the first object outside a boundary of the tray: ceasing to display the first object; and changing an appearance of the three-dimensional preview. Changing the appearance of the three-dimensional preview can include: highlighting a portion of a boundary of the tray corresponding to the second location within the three-dimensional environment; and/or displaying one or more vertical indicators above the boundary of the tray corresponding to the second location within the environment.

Some embodiments of the disclosure are directed to an electronic device. The electronic device can comprise: one or more processors; memory; and one or more programs stored in the memory and configured to be executed by the one or more processors, the one or more programs including instructions for performing any of the above methods.

Some embodiments of the disclosure are directed to a non-transitory computer readable storage medium. The non-transitory computer readable storage medium can store one or more programs, the one or more programs comprising instructions, which when executed by one or more processors of an electronic device, cause the electronic device to perform any of the above methods.

Some embodiments of the disclosure are directed to an electronic device. The electronic device can comprise: one or more processors; memory; and means for performing any of the above methods.

Some embodiments of the disclosure are directed to an information processing apparatus for use in an electronic device. The information processing apparatus can comprise means for performing any of the above methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a first electronic device in communication with a display and one or more input devices:
displaying, via the display, a three-dimensional environment including a three-dimensional preview, wherein the three-dimensional preview includes:
a first object; and
one or more user interface elements;
while displaying the three-dimensional preview including the first object and the one or more user interface elements, receiving, via the one or more input devices, a first input corresponding to a selection of the first object;
in accordance with a determination that the three-dimensional preview is operating in a first mode, causing the first object to perform a first action in accordance with a determination that the first object is configured to perform the first action in accordance with the selection, wherein the first action includes movement of the first object in the three-dimensional preview; and
in accordance with a determination that the three-dimensional preview is operating in a second mode, different than the first mode, changing an appearance of the first object in the three-dimensional preview to indicate the selection of the first object;
wherein:
the first electronic device is in further communication with a second electronic device;
the second electronic device is configured to display a content creation application including a two-dimensional representation of the first object; and
the three-dimensional preview includes a tray, and the first object is disposed on a surface on the tray.

2. The method of claim 1, wherein:
the first electronic device is in further communication with a second electronic device; and
the second electronic device is configured to display a content creation application including a two-dimensional representation of the first object.

3. The method of claim 2, wherein:
the second electronic device is a laptop computer, a desktop computer, or a tablet computer; and
the first electronic device is a head-mounted display device.

4. The method of claim 2, wherein causing the first object to perform the first action comprises:
presenting a first animation of the first object including the movement in the three-dimensional environment; and
in accordance with the determination that the three-dimensional preview is operating in the first mode, in accordance with the determination that the first object is configured to perform the first action, concurrently displaying the first animation of the two-dimensional representation of the first object at the second electronic device.

5. The method of claim 2, further comprising:
in accordance with a determination that the three-dimensional preview is operating in the second mode, changing the appearance of the two-dimensional representation of the first object displayed at the second electronic device to indicate the selection of the first object.

6. The method of claim 5, wherein:
changing the appearance of the first object in the three-dimensional environment comprises highlighting the first object in the three-dimensional environment; and
changing the appearance of the two-dimensional representation of the first object displayed at the second electronic device comprises highlighting the two-dimensional representation of the first object displayed at the second electronic device.

7. The method of claim 6, further comprising:
while concurrently highlighting the first object in the three-dimensional environment and the two-dimensional representation of the first object displayed at the second electronic device, receiving a second input at the second electronic device; and
in accordance with the second input, updating a characteristic of the two-dimensional representation of the first object displayed at the second electronic device and updating the characteristic of the first object in the three-dimensional environment displayed at the first electronic device.

8. The method of claim 1, wherein the one or more user interface elements are displayed within a tool bar associated with the tray.

9. The method of claim 1, further comprising:
capturing, via the one or more input devices, at least portions of a real-world environment including the second electronic device and the content creation application displayed on the second electronic device;
wherein the three-dimensional environment further includes a representation of the captured portions of the real-world environment, including:
a representation of the second electronic device; and
a representation of the content creation application.

10. The method of claim 9, wherein the one or more user interface elements comprises:
a first user interface element that is selectable to cause the three-dimensional preview to operate in the first mode;
a second user interface element that is selectable to cause the three-dimensional preview to cease operating in the first mode and to operate in the second mode;
a third user interface element that is selectable to scale the first object from a first size to a second size, larger than the first size;
a fourth user interface element that is selectable to cause the first object to scrub through the first action; and/or
a fifth user interface element that is selectable to cause display of a full-scale representation of the first object.

11. The method of claim 10, wherein displaying the full-scale representation comprises:
occluding at least portions of the three-dimensional environment and displaying the full-scale representation of the first object over the occluded portions of the three-dimensional environment.

12. The method of claim 11, wherein displaying the full-scale representation comprises:
concurrently displaying in the three-dimensional environment:
the representation of the three-dimensional preview; and
the representation of the second electronic device including the representation of the content creation application and the two-dimensional representation of the first object.

13. The method of claim 1, further comprising:
receiving, via the one or more input devices, a second input;
in accordance with a determination that the second input corresponds to a request to move the three-dimensional preview, moving the three-dimensional preview within the three-dimensional environment in accordance with the second input;
in accordance with a determination that the second input corresponds to a request to change a size of the tray, changing the size of the tray from a first size to a second size, different from the first size in accordance with the second input;
in accordance with a determination that the second input corresponds to a request to rotate the tray, rotating the tray and the first object disposed on the surface of the tray within the three-dimensional environment in accordance with the second input; and
in accordance with a determination that the second input corresponds to a request to elevate the tray, moving the first object from a first height to a second height, offset from an initial position of the tray within the three-dimensional environment in accordance with the second input.

14. The method of claim 13, wherein:
the determination that the second input corresponds to the request to rotate the tray is in accordance with a determination that the second input includes:
an interaction input provided by a predetermined portion of a user of the first electronic device for at least a threshold amount of time while a gaze of the user is directed toward the tray, wherein a representation of a pivot point is displayed at a respective location on the tray in response to detecting the interaction input; and
movement of the predetermined portion of the user of the first electronic device in a respective direction relative to the representation of the pivot point on the tray while maintaining the interaction input; and
rotating the tray and the first object disposed on the surface of the tray within the three-dimensional environment in accordance with the second input includes rotation of the tray and the first object disposed on the surface of the tray about an axis through the pivot point.

15. The method of claim 14, further comprising:
ceasing displaying the representation of the pivot point on the tray in response to a release of the interaction input provided by the predetermined portion of the user.

16. The method of claim 1, further comprising:
receiving, via the one or more input devices, a second input corresponding to a request to manipulate the first object in the three-dimensional environment;
in accordance with a determination that the second input corresponds to a request to change a size of the first object, changing the size of the first object from a first size to a second size, different than the first size in accordance with the second input; and
in accordance with a determination that the second input corresponds to a request to reposition the first object on the tray, moving the first object from a first location to a second location, different than the first location, on the tray in accordance with the second input.

17. The method of claim 16, wherein:
the determination that the second input corresponds to the request to change the size of the first object is in accordance with a determination that the second input includes:
an interaction input provided by a predetermined portion of a user of the first electronic device for at least a threshold amount of time while a gaze of the user is directed toward the tray, wherein a representation of a pivot point is displayed at a respective location on the tray in response to detecting the interaction input;

movement of the predetermined portion of the user of the first electronic device in a respective direction relative to the representation of the pivot point on the tray; and changing the size of the tray from the first size to the second size, different from the first size in accordance with the second input is based on the amount of the movement of the predetermined portion of the user of the first electronic device.

18. The method of claim 16, further comprising:

in accordance with a determination that the second input corresponds to a request to reposition the first object outside a boundary of the tray:

ceasing to display the first object; and changing an appearance of the three-dimensional preview, wherein changing the appearance of the three-dimensional preview includes:

highlighting a portion of a boundary of the tray corresponding to the second location within the three-dimensional environment; and/or displaying one or more vertical indicators above the boundary of the tray corresponding to the second location within the environment.

19. An electronic device comprising:

one or more processors;

memory; and one or more programs stored in the memory and configured to be executed by the one or more processors, the one or more programs including instructions for performing a method comprising:

displaying, via a display, a three-dimensional environment including a three-dimensional preview, wherein the three-dimensional preview includes:

a first object; and one or more user interface elements;

while displaying the three-dimensional preview including the first object and the one or more user interface elements, receiving, via one or more input devices, a first input corresponding to a selection of the first object;

in accordance with a determination that the three-dimensional preview is operating in a first mode, causing the first object to perform a first action in accordance with a determination that the first object is configured to perform the first action in accordance with the selection, wherein the first action includes movement of the first object in the three-dimensional preview; and in accordance with a determination that the three-dimensional preview is operating in a second mode, different than the first mode, changing an appearance of the first object in the three-dimensional preview to indicate the selection of the first object;

wherein:

the electronic device is in further communication with a second electronic device;

the second electronic device is configured to display a content creation application including a two-dimensional representation of the first object; and the three-dimensional preview includes a tray, and the first object is disposed on a surface on the tray.

20. The electronic device of claim 19, wherein causing the first object to perform the first action comprises:

presenting a first animation of the first object including the movement in the three-dimensional environment; and in accordance with the determination that the three-dimensional preview is operating in the first mode, in accordance with the determination that the first object is configured to perform the first action, concurrently displaying the first animation of the two-dimensional representation of the first object at the second electronic device.

21. The electronic device of claim 19, wherein the method further comprises:

in accordance with a determination that the three-dimensional preview is operating in the second mode, changing the appearance of the two-dimensional representation of the first object displayed at the second electronic device to indicate the selection of the first object.

22. The electronic device of claim 21, wherein:

changing the appearance of the first object in the three-dimensional environment comprises highlighting the first object in the three-dimensional environment; and changing the appearance of the two-dimensional representation of the first object displayed at the second electronic device comprises highlighting the two-dimensional representation of the first object displayed at the second electronic device.

23. The electronic device of claim 22, wherein the method further comprises:

while concurrently highlighting the first object in the three-dimensional environment and the two-dimensional representation of the first object displayed at the second electronic device, receiving a second input at the second electronic device; and in accordance with the second input, updating a characteristic of the two-dimensional representation of the first object displayed at the second electronic device and updating the characteristic of the first object in the three-dimensional environment displayed at the electronic device.

24. A non-transitory computer readable storage medium storing one or more programs, the one or more programs comprising instructions, which when executed by one or more processors of a first electronic device, cause the first electronic device to perform a method comprising:

displaying, via a display, a three-dimensional environment including a three-dimensional preview, wherein the three-dimensional preview includes:

a first object; and one or more user interface elements;

while displaying the three-dimensional preview including the first object and the one or more user interface elements, receiving, via one or more input devices, a first input corresponding to a selection of the first object;

in accordance with a determination that the three-dimensional preview is operating in a first mode, causing the first object to perform a first action in accordance with a determination that the first object is configured to perform the first action in accordance with the selection, wherein the first action includes movement of the first object in the three-dimensional preview; and in accordance with a determination that the three-dimensional preview is operating in a second mode, different than the first mode, changing an appearance of the first object in the three-dimensional preview to indicate the selection of the first object;
wherein:
the first electronic device is in further communication with a second electronic device;
the second electronic device is configured to display a content creation application including a two-dimensional representation of the first object; and
the three-dimensional preview includes a tray, and the first object is disposed on a surface on the tray.

25. The non-transitory computer readable storage medium of claim 24, wherein the method further comprises:
capturing, via the one or more input devices, at least portions of a real-world environment including the second electronic device and the content creation application displayed on the second electronic device;
wherein the three-dimensional environment further includes a representation of the captured portions of the real-world environment, including:
a representation of the second electronic device; and
a representation of the content creation application.

26. The non-transitory computer readable storage medium of claim 24, wherein the method further comprises:
receiving, via the one or more input devices, a second input;
in accordance with a determination that the second input corresponds to a request to move the three-dimensional preview, moving the three-dimensional preview within the three-dimensional environment in accordance with the second input;
in accordance with a determination that the second input corresponds to a request to change a size of the tray, changing the size of the tray from a first size to a second size, different from the first size in accordance with the second input;
in accordance with a determination that the second input corresponds to a request to rotate the tray, rotating the tray and the first object disposed on the surface of the tray within the three-dimensional environment in accordance with the second input; and
in accordance with a determination that the second input corresponds to a request to elevate the tray, moving the first object from a first height to a second height, offset from an initial position of the tray within the three-dimensional environment in accordance with the second input.

27. The non-transitory computer readable storage medium of claim 26, wherein:
the determination that the second input corresponds to the request to rotate the tray is in accordance with a determination that the second input includes:
an interaction input provided by a predetermined portion of a user of the first electronic device for at least a threshold amount of time while a gaze of the user is directed toward the tray, wherein a representation of a pivot point is displayed at a respective location on the tray in response to detecting the interaction input; and
movement of the predetermined portion of the user of the first electronic device in a respective direction relative to the representation of the pivot point on the tray while maintaining the interaction input; and
rotating the tray and the first object disposed on the surface of the tray within the three-dimensional environment in accordance with the second input includes rotation of the tray and the first object disposed on the surface of the tray about an axis through the pivot point.

28. The non-transitory computer readable storage medium of claim 27, wherein the method further comprises:
ceasing displaying the representation of the pivot point on the tray in response to a release of the interaction input provided by the predetermined portion of the user.

29. The electronic device of claim 19, wherein the method further comprises:
receiving, via the one or more input devices, a second input corresponding to a request to manipulate the first object in the three-dimensional environment;
in accordance with a determination that the second input corresponds to a request to change a size of the first object, changing the size of the first object from a first size to a second size, different than the first size in accordance with the second input; and
in accordance with a determination that the second input corresponds to a request to reposition the first object on the tray, moving the first object from a first location to a second location, different than the first location, on the tray in accordance with the second input.

30. The electronic device of claim 29, wherein:
the determination that the second input corresponds to the request to change the size of the first object is in accordance with a determination that the second input includes:
an interaction input provided by a predetermined portion of a user of the electronic device for at least a threshold amount of time while a gaze of the user is directed toward the tray, wherein a representation of a pivot point is displayed at a respective location on the tray in response to detecting the interaction input;
movement of the predetermined portion of the user of the electronic device in a respective direction relative to the representation of the pivot point on the tray; and
changing the size of the tray from the first size to the second size, different from the first size in accordance with the second input is based on the amount of the movement of the predetermined portion of the user of the electronic device.

* * * * *